United States Patent [19]
Tada et al.

[11] Patent Number: 5,632,083
[45] Date of Patent: May 27, 1997

[54] LEAD FRAME FABRICATING METHOD AND LEAD FRAME FABRICATING APPARATUS

[75] Inventors: Nobuhiko Tada, Ushiku; Naoki Miyanagi, Ibaraki-ken; Yoshiaki Shimomura, Ibaraki-ken; Shigeyuki Sakurai, Ibaraki-ken; Yoshinari Nagano, Ibaraki-ken, all of Japan

[73] Assignee: Hitachi Construction Machinery Co., Ltd., Tokyo, Japan

[21] Appl. No.: 411,839

[22] PCT Filed: Aug. 4, 1994

[86] PCT No.: PCT/JP94/01292

§ 371 Date: Apr. 3, 1995

§ 102(e) Date: Apr. 3, 1995

[30] Foreign Application Priority Data

Aug. 5, 1993 [JP] Japan .................. 5-194925
Aug. 5, 1993 [JP] Japan .................. 5-194927

[51] Int. Cl.$^6$ .................. H01K 43/00; B23K 26/00
[52] U.S. Cl. .................. 29/827; 29/DIG. 16; 219/121.68; 219/121.78
[58] Field of Search .................. 29/827, 874, DIG. 16, 29/558, 762; 219/121.68, 121.69, 121.78, 121.85

[56] References Cited

U.S. PATENT DOCUMENTS

| | | | |
|---|---|---|---|
| 4,275,286 | 6/1981 | Hackett, Jr. | 219/121.69 |
| 4,332,999 | 6/1982 | Wittke | 219/121.69 |
| 4,391,519 | 7/1983 | Kuwabara et al. | 219/121.78 X |
| 4,640,382 | 2/1987 | Hartmann et al. | 219/121.78 X |
| 4,670,639 | 6/1987 | Behn | 219/121.69 |
| 4,681,656 | 7/1987 | Byrum | 29/827 X |
| 4,786,358 | 11/1988 | Yamazaki et al. | 219/121.85 X |
| 5,034,591 | 7/1991 | Fang | 219/121.69 X |
| 5,103,074 | 4/1992 | Watanabe et al. | 219/121.68 |

FOREIGN PATENT DOCUMENTS

| | | |
|---|---|---|
| 62-93095 | 4/1987 | Japan . |
| 2-247089 | 10/1990 | Japan . |
| 3-123063 | 5/1991 | Japan . |
| 4-28489 | 1/1992 | Japan . |

*Primary Examiner*—Peter Vo
*Assistant Examiner*—Khan Nguyen
*Attorney, Agent, or Firm*—Fay, Sharpe, Beall, Fagan, Minnich & McKee

[57] ABSTRACT

A lead frame fabricating method and a lead frame fabricating apparatus are provided which can easily fabricate lead frames of fine pattern at a high speed, can improve dimensional accuracy and quality of the lead frames after the fabrication, and can realize mass-production at a lower cost. To this end, when cutting a metal plate 1101 by irradiation of a laser beam, a laser beam 1011 emitted in the form of pulses and having a circular section is converted by a beam section transformer 1020 into a laser beam 1012 having an elongate elliptic section. The section of the laser beam 1012 is rotated on its optical axis by a beam rotating device 1030 so that the lengthwise direction of the section of the laser beam 1012 is coincident with the lengthwise direction of each of inner leads 1013. An optical axis of a laser beam 1015 is revolved along each of concentric paths 161 to 174 around the original optical axis given when the laser beam 1011 is emitted. Alternatively, a laser beam 3011 emitted in the form of pulses and having a circular section is converted by a beam section transformer 3020 into a laser beam 3012 having an elongate elliptic section. The section of the laser beam 3012 is rotated on its optical axis by a beam rotating device 3030 so that the lengthwise direction of the section of the laser beam 3012 is coincident with the lengthwise direction of each of the inner leads 1013.

31 Claims, 36 Drawing Sheets

| NUMBER OF TIMES OF REPEATING INTERMITTENT CONTROL OF BEAM MOVING DIRECTION | R-AXIS DIRECTION:N=300 <br> θ-AXIS DIRECTION:N=300 |
|---|---|
| NUMBER OF TIMES OF SUSPENDING LASER BEAM | N=300 |

| NUMBER OF TIMES OF REPEATING INTERMITTENT CONTROL OF BEAM MOVING DIRECTION | R-AXIS DIRECTION:M=10 |
|---|---|
| NUMBER OF TIMES OF SUSPENDING LASER BEAM | M=10 |

| NUMBER OF TIMES OF REPEATING INTERMITTENT CONTROL OF BEAM MOVING DIRECTIONS | X-AXIS DIRECTION:N=300 Y-AXIS DIRECTION:N=300 |

NUMBER OF TIMES OF SUSPENDING LASER BEAM    N=300

NUMBER OF TIMES OF REPEATING INTERMITTENT CONTROL OF BEAM MOVING DIRECTIONS    X-AXIS AND Y-AXIS DIRECTION:4M=40

NUMBER OF TIMES OF SUSPENDING LASER BEAM    4M=40

DIRECTION OF ADVANCE OF STRIP METAL

T:POSITION OF CONDENSING LENS
S:POSITION OF SENSOR

LEAD FRAME FABRICATING METHOD AND LEAD FRAME FABRICATING APPARATUS

TECHNICAL FIELD

The present invention relates to a lead frame fabricating method and a lead frame fabricating apparatus by which a thin metal plate is appropriately cut out using a laser beam to form a lead frame.

BACKGROUND ART

Lead frames are each formed of a metal plate in which fine patterns such as inner leads and outer leads are processed. After mounting a semiconductor chip on an inner portion of the lead frame, terminals of the semiconductor chip and the inner leads are electrically connected to each other.

Recently, there has been an even stronger demand for a higher packing density and higher integration of semiconductor chips. Corresponding to such a demand, lead frames for mounting semiconductor chips thereon have also been developed which are of fine shapes and highly accurate dimensions. In particular, great weight has been given to increasing the number of pins per lead frame. With an increase in the number of pins per lead frame, a processing technique is required which can form distal end portions of inner leads to be smaller in pitch and finer in shape.

Recent techniques for forming such lead frames or the like from metal plates have been primarily practiced by pressing or etching. By those processing techniques, lead frames can be easily manufactured with high efficiency. However, any of etching and pressing can only form gaps comparable to the thickness of a metal plate used, and cannot satisfactorily form gaps narrower and finer than the plate thickness.

Meanwhile, there is proposed a method of fabricating lead frames by a laser beam (hereinafter referred to also as laser cutting). This method makes it possible to form finer gaps beyond limitations in etching and pressing. Specifically, a laser beam used in the above method is generally circular in section, but because the laser beam can be condensed into a very small diameter, it is possible to achieve very fine processing. Regardless of the thickness of material plates employed, therefore, the pitch between inner leads can be made much smaller. (Hereinafter, the above method will be referred to as laser cutting using a circular beam).

Besides the laser cutting using a circular beam, there is also known a processing technique that employs a laser beam having an elongate elliptic section, as disclosed in JP, A, 1-306088 or JP, A, 62-93095, and a processing technique that employs a laser beam having an elongate section, i.e., a slab laser or the like, as reported in Electric Society of Japan, Photon Device Meeting (August, 1989).

Further, as another prior art technique using laser cutting, JP, A, 2-247089 discloses a method in which laser cutting is combined with pressing or etching. With this method, fine portions having a narrow pitch, such as distal end portions of inner leads of the lead frame, are formed by a laser beam, whereas relatively large portions not having a narrow pitch, such as outer leads, are formed by pressing or etching.

DISCLOSURE OF THE INVENTION

The above-mentioned laser cutting using a circular beam is performed by irradiating one shot of condensed laser beam to a position on a metal plate to be cut so that the metal plate is gradually molten from the plate surface to bore a through hole, and moving the irradiated position of the laser beam or the metal plate along a predetermined path successively. With this method, because cutting of the metal plate is progressed while melting it by the circular laser beam, the cutting speed is limited and hence a difficulty is encountered in cutting the metal plate at a high speed. Particularly, when the laser beam is more condensed to have a smaller diameter for narrowing the cut width in fabrication of a lead frame or the like which requires fine dimensions, the amount by which the metal plate is cut in the direction of path length is also shortened at the same time and hence the cutting speed becomes very slow.

On the other hand, when the laser beam having an elongate sectional shape is employed as shown in, e.g., JP, A, 1-306088 and JP, A, 62-93095, the cutting speed can be increased. Specifically, applying this method to fabrication of a lead frame enables an elongate gap to be cut by irradiation of one shot of pulse-like laser beam even when the lead frame of fine dimensions is fabricated. Therefore, by progressing the laser cutting while the lengthwise direction of section of the laser beam is kept aligned with the direction of advance of the laser beam (i.e., the direction in which the cutting is progressed), the lead frame can be fabricated at a speed much higher than the above case of using a circular beam.

When an elongate gap is formed by, as mentioned above, using the elongate laser beam while the lengthwise direction of section of the laser beam is kept aligned with the direction of advance of the laser beam (i.e., the direction in which the cutting is progressed), the laser cutting can be performed by successively moving an optical axis of the laser beam while discontinuously repeating a pulse laser. At each of lead ends, however, it is required to not only suspend the irradiation of the laser beam, but also make intermittent control for the direction of movement thereof (i.e., stop the laser beam and then start moving it again in the reversed direction). Thus, the operation of reversing the direction of movement of the laser beam optical axis is needed at that time. In order to form all the leads, therefore, the intermittent control of the beam moving direction must be repeated as many times as the number of leads. As the intermittent control of the beam moving direction is repeated so many times and the direction of movement of the laser beam is reversed so frequently, there is the risk that a clearance or looseness may be caused in a driving mechanism system, and a resultant error may be accumulated to increase a positioning error and produce a backlash. Correcting such an error requires a calibration step to be performed with respect to a predetermined position. As a result of accumulation of the time required for each calibration step, a lot of time is additionally consumed and the cutting speed is further reduced.

In any of the above laser cutting processes, a thermal deformation is caused due to the heat input upon irradiation of the laser beam. When applying the laser cutting to form inner leads which are fine and have a narrow pitch, in particular, quality of the formed inner leads is so affected by such a thermal deformation that a satisfactorily finished configuration and high dimensional accuracy cannot be realized.

Further, in the laser cutting process disclosed in JP, A, 2-247089, the viewpoint of solving the above-mentioned problems accompanied with laser cutting is not taken into account.

Additionally, even when the aforesaid elongate laser beam is employed, laser cutting requires a processing time much longer than pressing or etching and its processing speed is low. In the case of forming a number of lead frames having the same shape, therefore, the cost is too high to achieve by mass-production.

A first object of the present invention is to provide a lead frame fabricating method and a lead frame fabricating apparatus by which finely patterned lead frames can be easily fabricated at a high speed while improving dimensional accuracy and quality of the finished lead frames.

A second object of the present invention is to provide a lead frame fabricating method and a lead frame fabricating apparatus by which finely patterned lead frames can be easily fabricated at a high speed while improving dimensional accuracy and quality of the finished lead frames, and their mass-production can be realized at a low cost.

To achieve the above first object, according to the present invention, there is provided a lead frame fabricating method in which, when fabricating a lead frame having leads made up by a number of inner leads radially arranged and outer leads positioned outwardly of the inner leads in continuous relation, a pulse-like laser beam having an elongate section is irradiated to appropriately cut a thin metal plate to thereby form at least the inner leads, wherein the method comprises a first step of aligning the lengthwise direction of a spot of the laser beam irradiated to the metal plate with the lengthwise direction of each of the inner leads to be formed and moving an optical axis of the laser beam relatively in a direction crossing the inner leads, and a second step of moving the optical axis of the laser beam relatively in the lengthwise direction of each of the inner leads such that the spots of the laser beams are lined up in the radial direction, the inner leads being formed by repeating the motion of the first step and the motion of the second step.

When cutting a workpiece by utilization of a laser beam, since the pulse width of the laser beam, i.e., the time during which the laser beam is generated, is usually much shorter than the repetition period of the laser beam, i.e., the time from generation of one pulse to generation of the next, the laser cutting is momentarily completed. On the other hand, when moving an irradiated position of the laser beam, i.e., an optical axis thereof, the time required for such movement is sufficiently longer than the repetition period of the laser beam. Therefore, even when the irradiated position of the laser beam is continuously moved at a constant speed, an influence resulted from such continuous movement of the irradiated position, i.e., an error in the cut position, is small. In other words, a number of radial gaps can be easily formed by carrying out the first step of aligning the lengthwise direction of the spot of the laser beam with the lengthwise direction of each of the inner leads and moving the optical axis of the laser beam relatively in the direction crossing the inner leads, like the present invention arranged as described above. Further, by repeating the first step and the second step of moving the optical axis of the laser beam relatively in the lengthwise direction of each of the inner leads such that the spots of the laser beams are lined up in the radial direction, a number of inner leads extending radially can be formed in the metal plate.

Further, with the above method of repeating the first step and the second step, the operation of reversing the direction of movement of the optical axis of the laser beam is not needed, and the required number of times of repeating intermittent control of the beam moving direction (stop and restart of the laser beam) is reduced. Thus, controlling the smooth and moderate motion of the optical axis of the laser beam is only primarily required, and the number of times of repeating intermittent control of the beam moving direction is very small. Accordingly, position alignment of a driving mechanism system can be facilitated to improve a control ability, a positioning error due to clearance and looseness can be minimized, and very good results are obtained in accuracy, reliability and reproducibility of the cut position. In addition, since the laser cutting can be progressed successively for each of short repetition periods, the laser cutting is easily carried out and the cutting speed is increased, Moreover, with the present fabricating method, since the laser beam is irradiated in the form of pulses, i.e., intermittently, while moving the optical axis of the laser beam, the heat input with the laser cutting is apt to more easily disperse and an influence of the heat is suppressed. Accordingly, dimensional accuracy and quality after the laser cutting can be improved.

In the above lead frame fabricating method, preferably, the first step is a step of rotating the spot of the laser beam on its optical axis so that the lengthwise direction of the spot of the laser beam is aligned with the lengthwise direction of each of the inner leads, and revolving the optical axis of the laser beam along each of concentric or spiral paths around an optical axis given when the laser beam is emitted.

With this feature, when revolving the optical axis of the laser beam, the operation of abruptly turning the direction of the optical axis of the laser beam is not needed. When changing the radius of revolution from one to anther of the concentric paths, the optical axis of the laser beam is required to be somewhat turned in the direction, but even on this occasion, it is only required to smoothly move the optical axis of the laser beam in the radial direction. In the case of using the spiral paths, since the radius of revolution can be continuously changed to follow the paths, the need of turning the direction of the optical axis of the laser beam is completely eliminated. As a result, just by controlling smooth and moderate motion of the optical axis of the laser beam, a number of inner leads extending radially can be very easily formed and the laser cutting can be performed with very high accuracy.

The angular interval between radial gaps separating adjacent inner leads from each other is determined by the revolving speed and the emission period of the laser beam, and the cut position in the radial direction is determined by the radius of revolution. In the present invention, therefore, it is preferable that an angular speed at which the optical axis of the laser beam is revolving be kept substantially constant so as to make all the angular intervals between the adjacent gaps equal to one another.

In the above lead frame fabricating method, preferably, the optical axis given when the laser beam is emitted is positioned substantially at the center of the lead frame. With this feature, a number of inner leads extending radially from substantially the center of the lead frame are formed.

In the above lead frame fabricating method, preferably, an angle of rotation of the spot of the laser beam and an angle and a radius of revolution of the optical axis of the laser beam are detected, and whether to irradiate the laser beam or not is determined and controlled in accordance with detected values such that the metal plate is laser-cut only in a predetermined region.

Therefore, the lead frame fabricating method can be practiced while whether to irradiate the laser beam or not is controlled, for example, such that lines interconnecting inner distal ends of the gaps separating the inner leads from each other define a substantially rectangular shape. This enables inner distal ends of the inner leads to be in match with a rectangular die pad.

Preferably, the laser beam is generated in plural number at the timings shifted a predetermined delay time from each other, and the plurality of laser beams emitted with the predetermined delay time therebetween are condensed to lie in the same straight line on the metal plate, thereby forming the inner leads.

By so generating the plurality of laser beams at the timings shifted a predetermined delay time from each other, it is possible to prevent interference between the laser beams. Also, by condensing the laser beams to lie in the same straight line on the metal plate, this results in the same effect as that the laser beam is elongated in the lengthwise direction several times along the aforesaid straight line, and hence the cutting speed is increased in proportion to the number of laser generators.

In the above lead frame fabricating method, preferably, the first step is a step of rotating the spot of the laser beam on its optical axis so that the lengthwise direction of the spot of the laser beam is aligned with the lengthwise direction of each of the inner leads, and moving an optical axis of the laser beam along each of a multiplicity of rectangular paths whose diagonal lines intersect at a common point and whose corresponding sides are parallel to each other.

With this feature, in portions of each rectangular path other than its corners, the operation of abruptly turning the direction of the optical axis of the laser beam is not needed, and it is only required to control smooth and moderate motion of the optical axis of the laser beam. Only at the corners of the rectangular path, the operation of turning the direction of the optical axis of the laser beam is needed, but the operation stopping and moving again the optical axis of the laser beam for abrupt turning of its direction is not required as many times as the number of leads, and the required number of times of turning the beam moving direction is just the total number of corners of the rectangular paths. As a result, a number of inner leads extending radially can be easily formed and the laser cutting can be performed with high accuracy. In this respect, the rectangular paths are determined in consideration of shapes of the inner leads in their inner end portions or in their portions connected to the outer leads. The spacing and angular interval between irradiation areas covered by the adjacent spots of the laser beams on the same rectangular path are determined by controlling the rotating speed and the emission period of the laser beam.

If the size of the laser beam spot in the lengthwise direction is varied depending on the position to be laser-cut, necessary control would be very complicated because it would be required not only to control a sectional shape of the laser beam, but also to control output power of the laser beam whose distribution is also varied depending on change in the sectional shape of the laser beam. In the present invention, by keeping constant the size of the laser beam spot in the lengthwise direction, the laser cutting can be easily performed with no need for complicated control for the sectional shape and output power of the laser beam.

In the case of performing the laser cutting under the above conditions, because the laser beam spot is rotated on its optical axis such that the irradiation areas covered by the laser beam spots are radially arranged along the rectangular paths, the lengthwise direction of the irradiation area is different between central portions and corner portions of each side of the rectangular path. In the present invention, the size of the laser beam spot in the lengthwise direction is kept fixed and set to have such a length that the inner and outer irradiation areas covered by the laser beam spots along adjacent twos of the rectangular paths can be overlapped with each other regardless of angles by which the spots are rotated on their optical axes. Therefore, an lengthwise overlapped portion between the adjacent irradiation areas covered by the laser beam spots becomes small in corner portions of each rectangular path and large in central portions of sides of each rectangular path. In that overlapped portion between the adjacent irradiation areas, the laser pulse is repeatedly irradiated to the same place. From the above conditions, therefore, the overlapped portion to which the laser pulse is repeatedly irradiated becomes larger in the central portions of sides of each rectangular path than in the corner portions thereof. However, even if the laser beam is repeatedly irradiated to the gap which has been already penetrated by the preceding laser cutting step, it only passes through the penetrated gap and takes no longer part in cutting the metal plate. Consequently, while the overlapped portion between the adjacent irradiation areas is different in size as mentioned above, the cut shape of the leads will not be affected and its dimensional accuracy and quality are maintained.

Also, when the laser cutting is performed under the above conditions, the length of the rectangular paths parallel to each other on the inner and outer sides, i.e., the length of their corresponding sides, is increased as the laser beam advances radially outward from a central portion of the lead frame. In the above lead frame fabricating method, it is therefore preferable that an repetition period of the pulse-like laser beam is set to be constant, and a moving speed of the optical axis of the laser beam on the rectangular paths is controlled to be proportional to lengths of sides of the rectangular paths which are positioned parallel to each other on the inner and outer sides. With this feature, the moving speed of the laser beam is increased in proportion to the length of sides of the rectangular paths as the laser beam advances radially outward from a central portion of the lead frame, whereby the spacing between the adjacent irradiation areas on the same path is also increased in proportion to the length of sides of the rectangular paths. Consequently, the irradiation areas are radially joined with each other in the linear form, and angular intervals between the gaps extending radially and linearly all become the same.

As an alternative, preferably, the moving speed of the optical axis of the laser beam on the rectangular paths is set to be constant, and the repetition period of the laser beam is controlled to be proportional to lengths of sides of the rectangular paths which are positioned parallel to each other on the inner and outer sides. This feature can also provide the similar result to above.

A usual lead frame has such a radial configuration that its lead pitch is narrower in a central portion than in an outer portion, i.e., that leads in the central portion have a narrower width than those in the outer portion and hence are more apt to thermally deform. On the contrary, since the gap size formed by the irradiation of the laser beam is substantially the same in any of the central and outer portions of the lead frame, the amount of heat input to the lead frame per unit area is several times greater in the central portion than in the outer portion. Stated otherwise, distal end portions of inner leads are more likely to thermally deform than outer portions of the inner leads and outer leads. In the above lead frame fabricating method, therefore, the motion of the second step is preferably progressed from inner portions to outer portions of the inner leads.

With this feature, the laser cutting is progressed from the central portion of the metal plate outward successively, and the distal end portions of the inner leads are cut in a beginning period of the laser cutting process where the input heat is still small. As a result, thermal deformations of the distal end portions of the inner leads can be suppressed so as to ensure good dimensional accuracy. On the other hand, at the time when portions near the outer leads are subject to the laser cutting, a substantial amount of heat is accumulated, but those portions are less apt to thermally deform because of having a large lead width, and hence are hardly affected by the heat. Additionally, since the outer portions of the inner leads have a relatively large margin for cutting errors as compared with the distal end portions and thereabout, cutting quality is less impaired.

In this connection, preferably, an assist gas is ejected near an irradiated position of the laser beam in a direction outward from the optical axis given when the laser beam is emitted. With the feature, drosses produced upon the irradiation of the laser beam are collected to the outer side in which the lead width is relatively large. Accordingly, any dross will not remain in the side of the inner leads which are fine in shape and narrow in pitch and require high dimensional accuracy.

When the inner leads are formed by the laser cutting progressed successively from the inner side to the outer side according to the lead frame fabricating method described above, cutting error due to a thermal deformation or a distortion, etc. are gradually accumulated. Meanwhile, the gaps formed by pressing or etching are wider than the gaps formed by laser cutting.

In the present invention, it is therefore preferable that the outer leads are formed by pressing or etching beforehand, and the inner leads are formed successively from the inner portions to the outer portions by repeating the first step and the second step such that gaps separating the inner leads from each other are joined with gaps separating the outer leads from each other.

With this feature, cutting error due to the thermal deformation or the distortion, etc. accumulated during the laser cutting are all absorbed and released at the time when the gaps separating the inner leads from each other are joined with gaps separating the outer leads from each other.

To achieve the above second object, in the above lead frame fabricating method, preferably, one laser beam is branched into a plurality of laser beams having the same elongate section and the same output power, the branched laser beams are condensed to respective positions on the metal plate, spots of the laser beams condensed onto the metal plate are simultaneously rotated on their optical axes on the metal plate, and the optical axes of the laser beams are simultaneously moved on the metal plate, whereby a plurality of lead frames having the same configuration are laser-cut at the same time. With this feature, since one set of control information such as the rotation angle and the moving speed is only required for the plurality of lead frames having the same configuration, the control is facilitated. Also, in the case of forming a number of lead frames having the same configuration, it is possible to manufacture the lead frames at a lower cost in a shorter period of time, and hence to realize mass-production.

In a lead frame having multiple pins and a narrow pitch, inner leads, in particular, have a very narrow pitch that is often less than the plate thickness. This gives rise to a fear that if laser cutting is continued on adjacent portions under a condition where the heat input upon irradiation of a pulse-like laser beam still remains there, the material of the metal plate may be ruptured by melting due to the excessive input heat after the laser cutting. In the above lead frame fabricating method, it is therefore preferable that during the motion of the first step, the laser beam is irradiated to such positions as defining gaps which separate the inner leads from each other at least alternately. With this feature, the heat input upon irradiation of the laser beam will not be concentrated in the material of the metal plate to prevent the material of the metal plate from being ruptured by melting due to the excessive input heat. Uncut portions left after on cycle of the first step in the above process can be cut when the optical axis of the laser beam is moved in a next cycle of the first step, and the heat abates by thermal conduction to other material portions of the metal plate and thermal dissipation into air until the next cycle of the first step.

Further, preferably, an assist gas is ejected near an irradiated position of the laser beam and, simultaneously, a coolant is supplied to flow in surrounding relation to the assist gas. With this feature, most of the heat input to the material of the metal plate during the laser cutting can be quickly removed immediately after the laser cutting so as to forcibly lower the plate temperature. Additionally, the coolant after cooling the material of the metal plate is blown away and removed by the assist gas ejected near the irradiated position of the laser beam.

In the above lead frame fabricating method, preferably, the first step and the second step are repeated to form through holes discontinuously in line in the metal plate, and the above method further comprises a third step of coating resist films for etching on both sides of the metal plate before or after forming the through holes discontinuously in line in the metal plate, and a fourth step of supplying an etchant to the metal plate to remove uncut portions between the adjacent through holes thereby coupling the adjacent through holes to each other.

With this feature, the laser cutting is not required to form a workpiece into the final desired configuration, but fulfills its role sufficiently if the workpiece is laser-cut into the discontinuous broken-line form, for example. As compared with the case in which a metal plate is cut into the final configuration by laser cutting only, therefore, the amount to be cut by the laser beam can be reduced. It is thus possible to make very small the area suffering an influence of the input heat and to reduce resultant thermal deformations. Further, a thermal deformations caused by irradiation of the laser beam will not be accumulatively increased to eventually cause a substantial dimensional error. In addition, the presence of uncut portions between the adjacent through holes discontinuously present in line keeps the metal plate in a relatively rigid state, allowing the metal plate to be easily handled. This is also effective to prevent deformations and manufacturing errors occurred during the process.

In a subsequent etching step, the interior of each through hole formed by the laser cutting is sufficiently supplied with the etchant, and etching is progressed in the widthwise direction of the through hole as well by side etching to thereby etch its side walls. As a result, the uncut portions between the adjacent through holes in line are removed and the through holes in each line are interconnected to finally define the gaps in a predetermined configuration. At this time, the drosses and oxide coatings produced near the laser-cut portions are also simultaneously removed so that the cut portions of the metal plate have clear wall surfaces.

To achieve the above first object, according to the present invention, there is provided a lead frame fabricating apparatus in which, when fabricating a lead frame having leads made up by a number of inner leads radially arranged and outer leads positioned outwardly of the inner leads in continuous relation, a laser beam is irradiated to appropriately cut a thin metal plate to thereby form at least the inner leads, wherein the apparatus comprises laser beam generating means for generating a pulse-like laser beam having an elongate section, rotating means for rotating a spot of the laser beam on an optical axis given when the laser beam is emitted, revolving means for revolving an optical axis of the laser beam around the optical axis given when the laser beam is emitted, revolution radius changing means for changing a radius of revolution of the optical axis of the laser beam, and condensing means for condensing the laser beam from the revolution radius changing means onto the metal plate.

With this apparatus, it is possible to carry out the above first step of rotating the spot of the laser beam on its optical axis so that the lengthwise direction of the spot of the laser beam is aligned with the lengthwise direction of each of the inner leads, and revolving the optical axis of the laser beam along each of concentric or spiral paths around an optical axis given when the laser beam is emitted.

In the above lead frame fabricating apparatus, preferably, the apparatus further comprises first detection means for detecting an angle of rotation of the rotating means, second detection means for detecting an angle of rotation of the revolving means, third detection means for detecting the radius of revolution of the revolution radius changing means, and control means for determining and controlling, based on detected values of the detection means, whether the laser beam should be emitted or not from the laser beam generating means, so as to laser-cut the metal plate in a predetermined region.

With this feature, it is possible to carry out the lead frame fabricating method of the present invention in which the angle of rotation of the spot of the laser beam and the angle and the radius of revolution of the optical axis of the laser beam are detected, and whether to irradiate the laser beam or not is determined and controlled in accordance with detected values such that the metal plate is laser-cut only in a predetermined region.

In the above lead frame fabricating apparatus, preferably, a plurality of laser beam generating means are provided as the above laser beam generating means, focus position changing means for causing laser beams from the plurality of laser beam generating means to enter the rotating means parallel to each other is disposed between the laser beam generating means and the rotating means, and the plurality of laser beam generating means emit the laser beams at the timings shifted a predetermined delay time from each other and are arranged such that the laser beams are condensed to lie in the same straight line on the metal plate.

With this feature, it is possible to carry out the lead frame fabricating method of the present invention in which the laser beam is generated in plural number at the timings shifted a predetermined delay time from each other, and the plurality of laser beams emitted with the predetermined delay time therebetween are condensed to lie in the same straight line on the metal plate, thereby forming the inner leads.

To achieve the above first object, according to the present invention, there is provided a lead frame fabricating apparatus in which, when fabricating a lead frame having leads made up by a number of inner leads radially arranged and outer leads positioned outwardly of the inner leads in continuous relation, a laser beam is irradiated to appropriately cut a thin metal plate to thereby form at least the inner leads, wherein the apparatus comprises laser beam generating means for generating a pulse-like laser beam having an elongate section, rotating means for rotating a spot of the laser beam on an optical axis given when the laser beam is emitted, condensing means for condensing the laser beam from the rotating means onto the metal plate, and moving means for moving, on the metal plate, an optical axis of the laser beam condensed onto the metal plate.

With this apparatus, it is possible to carry out the above first step of rotating the spot of the laser beam on its optical axis so that the lengthwise direction of the spot of the laser beam is aligned with the lengthwise direction of each of the inner leads, and moving an optical axis of the laser beam along each of a multiplicity of rectangular paths whose diagonal lines intersect at a common point and whose corresponding sides are parallel to each other. In this respect, when moving the optical axis of the laser beam along each of the rectangular paths, this is performed by the above moving means.

To achieve the above second object, according to the present invention, there is provided a lead frame fabricating apparatus in which, when fabricating a lead frame having leads made up by a number of inner leads radially arranged and outer leads positioned outwardly of the inner leads in continuous relation, a laser beam is irradiated to appropriately cut a thin metal plate to thereby form at least the inner leads, wherein the apparatus comprises one laser beam generating means for generating a pulse-like laser beam having an elongate section, rotating means for rotating a spot of the laser beam on an optical axis given when the laser beam is emitted, branching means for branching the laser beam from the rotating means into a plurality of laser beams having the same sectional shape and the same output power, a plurality of condensing means for condensing the laser beams from the branching means onto the metal plate, and moving means for simultaneously moving, on the metal plate, optical axes of the laser beams condensed onto the metal plate.

With this apparatus, it is possible to carry out the lead frame fabricating method of the present invention in which a plurality of lead frames having the same configuration are simultaneously laser-cut.

In the above lead frame fabricating apparatus, preferably, the moving means includes a carriage mounting the condensing means thereon and moving the metal plate in directions of two axes orthogonal to each other. With this feature, the relative positions of the condensing lenses are surely maintained. Also, since the carriage is moved in the directions of the two axes orthogonal to each other on the metal plate, the condensing lenses are all simultaneously moved on the metal plate and hence the irradiated positions of the laser beams are also simultaneously moved on the metal plate. As a result, the lead frames having the same configuration can be accurately formed without any position offset.

In the above lead frame fabricating apparatus, preferably, sensor means for monitoring laser-cut portions of the metal plate are mounted on the carriage. With this feature, the laser-cut portions of the metal plate can be easily monitored in parallel to the progress of laser cutting. On this occasion, by properly selecting mount positions of the sensor means on the carriage, the metal plate can be monitored immediately before or after the laser cutting.

In the above lead frame fabricating apparatus, preferably, the laser beam generating means includes beam section changing means for changing a ratio of lengthwise size to widthwise size of the section of the laser beam. With this feature, it is possible to change the ratio of lengthwise size to widthwise size of the section of the laser beam which section has an elongate shape.

In the above lead frame fabricating apparatus, preferably, the laser beam generating means includes a resonator for generating a laser beam of which section is substantially circular, and beam section extending/contracting means for extending and contracting the section of the laser beam in at least one direction, the beam section extending/-contracting means doubling as the rotating means. With this feature, the laser beam emitted from the resonator and having a substantially circular section is extended and contracted in its section at least in one direction and is also rotated on its original optical axis. Accordingly, it is possible to simultaneously change the sectional shape of the laser beam and rotate the laser beam on its optical axis, resulting in simplification of the apparatus construction.

BEST MODE FOR CARRYING OUT THE INVENTION

Hereinafter, embodiments of a lead frame fabricating method and a lead frame fabricating apparatus of the present invention will be described with reference to the drawings.

First Embodiment

A first embodiment of the present invention will be described with reference to FIGS. 1 to 15.

Figure 1:
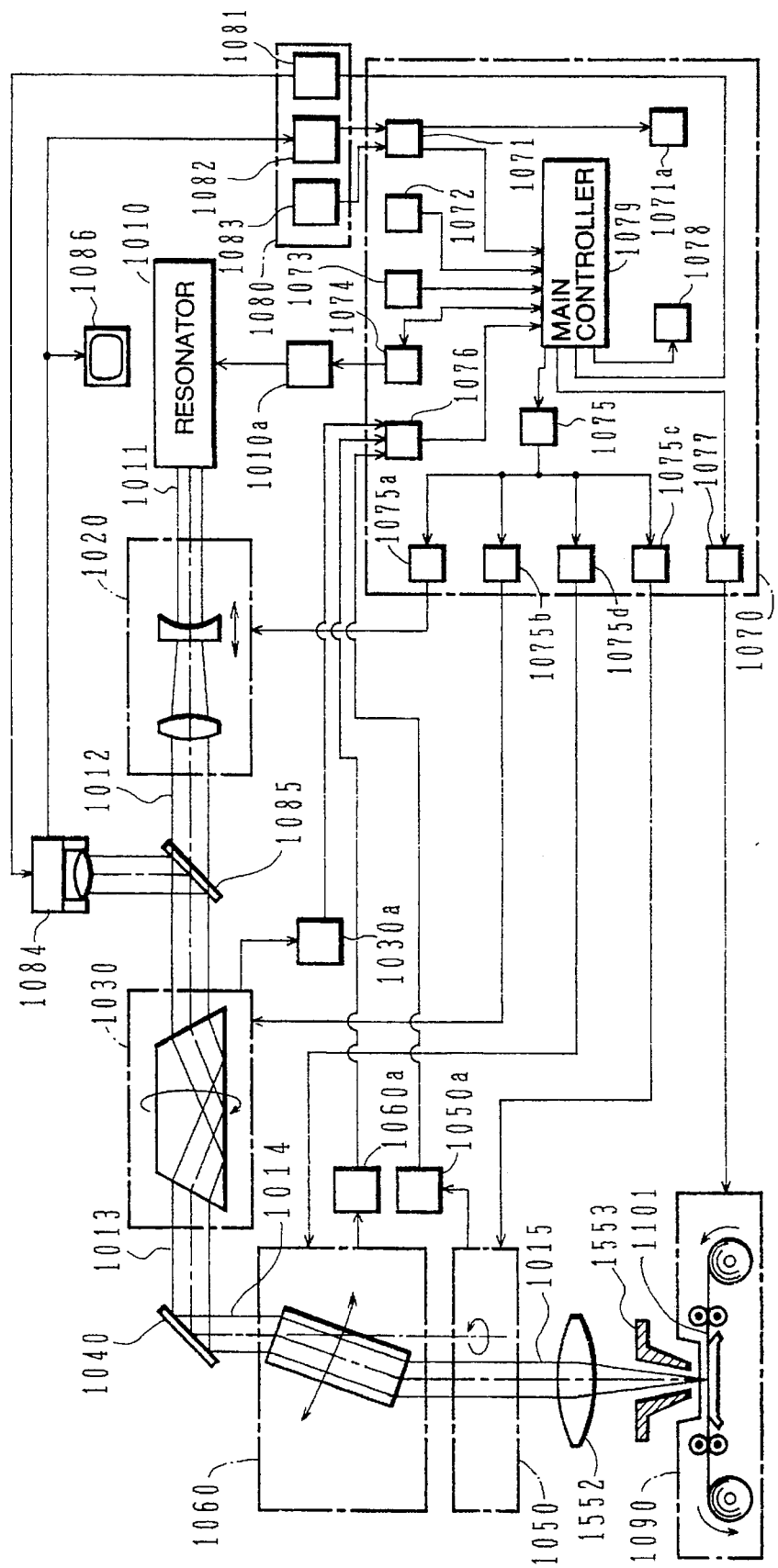
FIG. 1 is a block diagram showing a configuration of a lead frame fabricating apparatus according to a first embodiment of the present invention.

A description will be first made of a general configuration of a lead frame fabricating apparatus of this embodiment. As shown in FIG. 1, the lead frame fabricating apparatus of this embodiment comprises a resonator 1010 for emitting a pulse-like laser beam 1011 being substantially circular in section, a beam section transformer 1020 for elongating a sectional shape of the laser beam 1011, emitted from the resonator 1010, in one direction for transformation into an elliptic sectional shape, a beam rotating device 1030 for rotating a laser beam 1012 from the beam section transformer 1020 on its optical axis, a bending mirror 1040 for changing the direction of a laser beam 1013 from the beam rotating device 1030, a beam revolving device 1050 for revolving a laser beam 1014 from the bending mirror 1040 around a predetermined center, a revolution radius changing device 1060 for changing the radius of a circle along which the laser beam 1014 is revolved by the beam revolving device 1050, a control device 1070 for performing control of the entire apparatus, a cut portion monitoring device 1080 for monitoring a cut portion, and a feeder 1090 for feeding a metal plate to be cut. The resonator 1010 and the beam section transformer 1020 cooperatively make up laser beam generating means.

A laser power supply 1010a is connected to the resonator 1010, a rotation angle sensor 1030a is connected to the beam rotating device 1030, a revolution angle sensor 1050a is connected to the beam revolving device 1050, and a revolution radius sensor 1060a is connected to the revolution radius changing device 1060, respectively. The beam revolving device 1050 includes a condensing lens and a nozzle (described later) provided at its lower end. The cut portion monitoring device 1080 includes a camera controller 1081, an image recording unit 1082, and a storage unit 1083, the camera controller 1081 being connected to a CCD camera 1084 for picking up an image of the cut portion.

The control device 1070 includes an image determining unit 1071 for determining an image from the cut portion monitoring device 1080, an alarm issuing unit 1071a for issuing an alarm when any abnormality is found based on the determination in the unit 1071, an input unit 1072 for entering cutting conditions from the outside therethrough, a storage unit 1073 for storing the cutting conditions beforehand which can be read out therefrom as needed, a laser controller 1074 for controlling the laser power supply 1010a, a beam controller 1075 for controlling the shape and movement of the laser beam, a calculator 1076 for calculating the direction of the laser beam and the position thereof along the revolution circle based on signals from the rotation angle sensor 1030a, the revolution angle sensor 1050a and the revolution radius sensor 1060a, a feeder controller 1077 for controlling the feeder 1090, a recording unit 1078 for recording results of laser cutting, and a main controller 1079 for supervising control of the above components. In the control device 1070, a beam section transformer controller 1075a, a beam rotating device controller 1075b, a beam revolving device controller 1075c, and a revolution radius changing device controller 1075d are connected to the beam controller 1075 for respectively controlling the beam section transformer 1020, the beam rotating device 1030, the beam revolving device 1050, and the revolution radius changing device 1060.

Figure 2:
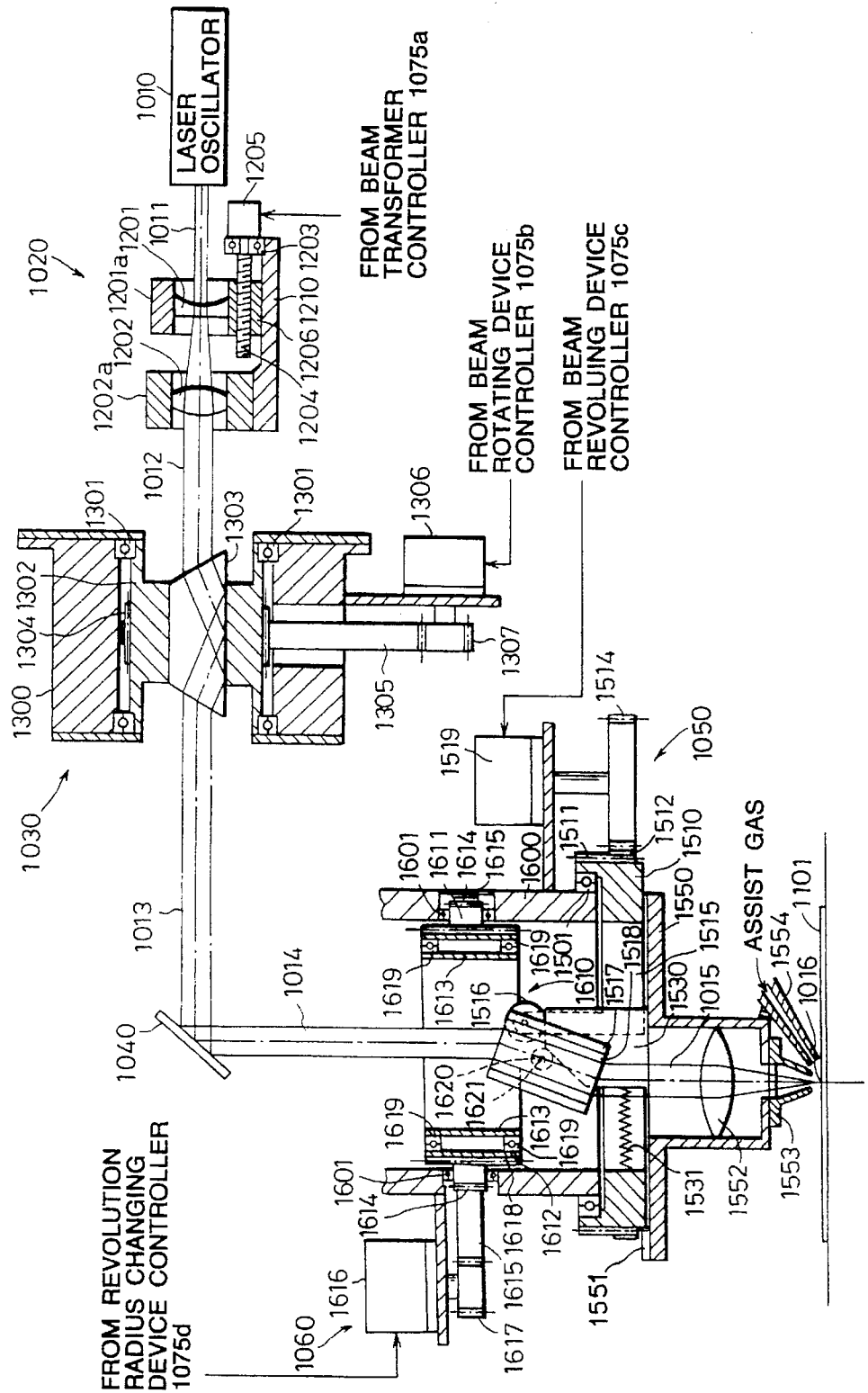
FIG. 2 is a view showing constructions of a beam section transformer, a beam rotating device, a beam revolving device, and a revolution radius changing device in the lead frame fabricating apparatus of FIG. 1.

Constructions of the beam section transformer 1020, the beam rotating device 1030, the beam revolving device 1050, and the revolution radius changing device 1060 will now be described with reference to FIGS. 2 to 4. Note that, in FIG. 2, only primary parts are shown in detail and other parts such as optical paths are schematically shown.

A description will be first made of the construction of the beam section transformer 1020. In FIG. 2, the beam section transformer 1020 comprises a concave cylindrical lens 1201 and a convex cylindrical lens 1202. The convex cylindrical lens 1202 is supported by a holder 1202a which is in turn fixed to a stand 1210. A ball screw 1204 is mounted on the stand 1210 through a bearing 1203 so that it is rotatable by a motor 1205. The motor 1205 is controlled by the beam section transformer controller 1075a. Upon rotation of the ball screw 1204, a nut 1206 held in mesh with the ball screw 1204 slides over the stand 1210. Since the nut 1206 is in one united body with a holder 1201a, the concave cylindrical lens 1201 supported by the holder 1201a also slides over the stand together with the nut 1206.

Figure 3:
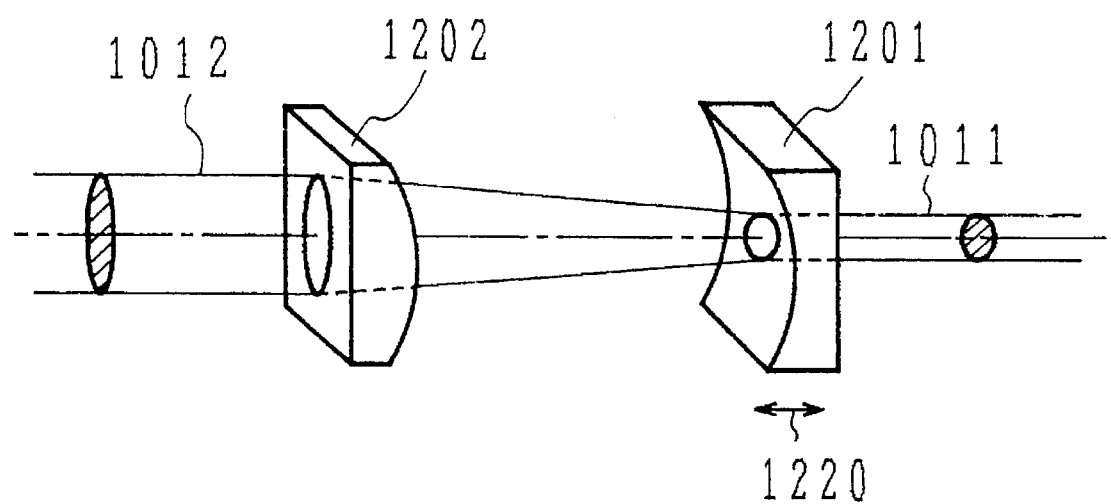
FIG. 3 is a view for explaining a function of the beam section transformer in FIG. 2.

As shown in FIG. 3, the concave cylindrical lens 1201 and the convex cylindrical lens 1202 are each of a lens whose cylindrical surface has a curvature only in planes parallel to the drawing sheet, both the lenses cooperating to elongate a sectional shape of the laser beam 1012 in one direction into an elliptic shape. Then, by moving the concave cylindrical lens 1201 in either direction of an arrow 1220 through the construction of FIG. 2 so as to vary the distance between both the lenses, the ratio of major axis to minor axis of the elliptic sectional shape of the laser beam can be changed.

Returning to FIG. 2, the construction of the beam rotating device 1030 will now be described. The beam rotating device 1030 comprises a fixed outer tube 1300, a prism holder 1302 rotatably supported in the fixed tube 1300 by bearings 1301, and a Dove prism 1303 attached to the prism holder 1302. The prism holder 1302 is provided with a gear portion 1304 on its outer circumference, and a timing belt 1305 having grooves cut therein to be meshed with gears is stretched such that it runs over the gear portion 1304 on one end and a gear 1307 driven by a motor 1306 on the other end. Further, the rotation angle sensor 1030a (see FIG. 1) is attached to the prism holder 1302, and the motor 1306 is controlled by the beam rotating device controller 1075b.

Figure 4A:
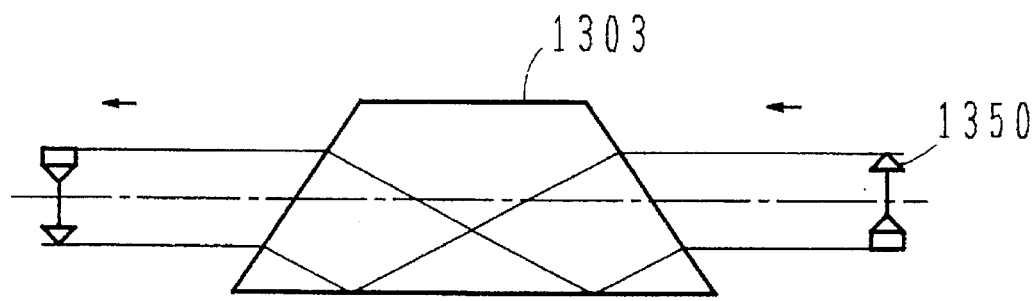
FIGS. 4A to 4C are views showing a function of a Dove prism provided in the beam rotating device in FIG. 2.
Figure 4B:
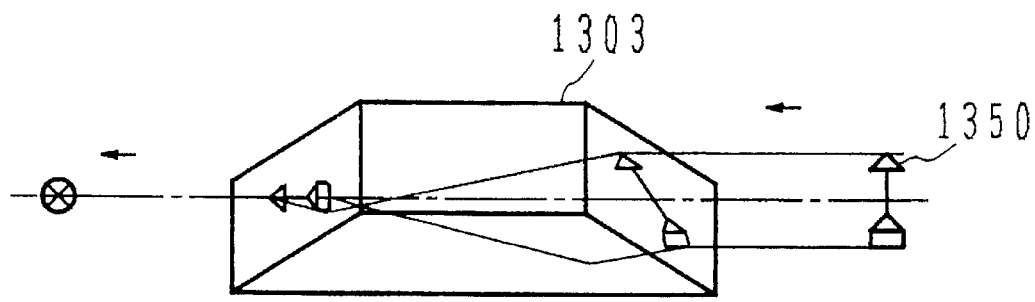
Figure 4C:
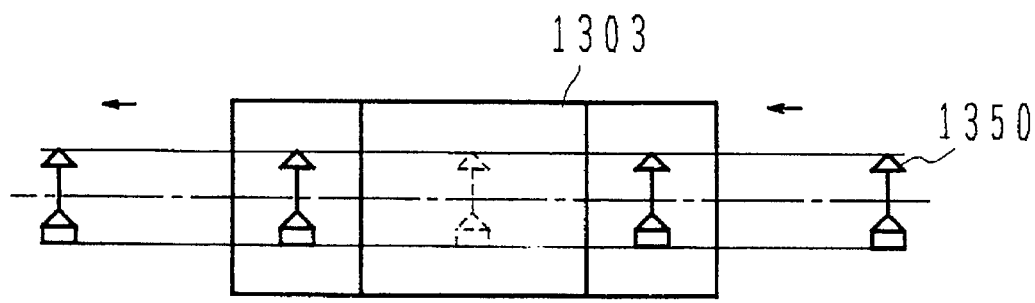

As shown in FIG. 4, the Dove prism 1303 is formed by obliquely cutting opposite ends of a quadrangular prism such that its section is an isoscels trapezoid. A light transmitting through the Dove prism 1303 exits therefrom after once inverted in posture. For example, when an arrow 1350 pointing as shown in FIG. 4A enters the Dove prism 1303, an image of the arrow 1350 is turned upside down to become an inverted image. Also, when the Dove prism 1303 is rotated 45° as shown in FIG. 4B, the image of the arrow 1350 is rotated 90° to become an image which is pointing from the front side to the rear side of the drawing sheet. When the Dove prism 1303 is further rotated 45° as shown in FIG. 4C, the image of the arrow 1350 is rotated another 90° to become an erect image. Thus, when the Dove prism is rotated a certain angle about the optical axis of an incident light, an emergent light is rotated twice the above angle about the optical axis. Accordingly, the laser beam 1013 is rotated on its optical axis by an angle twice as large as the angle through which the Dove prism 1303 is rotated, and then exits from the Dove prism 1303 with the optical axis remaining the same.

Returning to FIG. 2 again, the constructions of the beam revolving device 1050 and the revolution radius changing device 1060 will now be described. In addition, the condensing lens and the nozzle will be also described concurrently. In FIG. 2, the revolution radius changing device 1060 comprises a fixed outer tube 1600 and a vertically sliding mechanism unit 1610 rotatably supported inside the fixed outer tube 1600 by bearings 1601. The beam revolving device 1050 has a rotary head 1510 rotatably supported by bearings 1501 to a lower end of the fixed outer tube 1600 on its outer side. The beam revolving device 1050 also has a working head 1550 which is disposed under the rotary head 1510 and is slidably supported by a slide bearing 1551.

The vertically sliding mechanism unit 1610 comprises a nut 1611 on its outermost circumference, a lifting outer tube 1612 inwardly of the nut 1611, and a rotary inner tube 1613 inwardly of the lifting outer tube 1612, the nut 1611 being supported in a wall of the fixed outer tube 1600 by bearings 1601. The nut 1611 is provided with a gear portion 1614 on its outer circumference, and a timing belt 1615 having grooves cut therein to be meshed with gears is stretched such that it runs over the gear portion 1614 on one end and a gear 1617 driven by a motor 1616 on the other end. Helicoid threads are tapped in an inner circumferential surface of the nut 1611 and are meshed with helicoid threads 1618 formed in an outer circumferential surface of the lifting outer tube 1612. Further, the rotary inner tube 1613 is rotatably supported inside the lifting outer tube 1612 by bearings 1619, and a roller 1621 for rotating a tapered surface of a shift rack 1530 (described later) is rotatably attached to a roller attachment portion 1620 projecting downwardly of the rotary inner tube 1613. The motor 1616 is controlled by the revolution radius changing device controller 1075d.

The rotary head 1510 is provided with a gear portion 1511 on its outer circumference, and a timing belt 1512 having grooves cut therein to be meshed with gears is stretched such that it runs over the gear portion 1511 on one end and a gear 1514 driven by a motor 1519 on the other end. A shift pinion 1516 is rotatably attached to a shift pinion attachment portion 1515 disposed in the rotary head 1510 so as to project above the same, and is meshed with a groove cut in an upper portion of the later-described shift rack 1530. Further, a prism holder 1517 is fixed to the shift pinion 1516 so that the prism holder 1517 is rotatable together with the shift pinion 1516. A parallel prism 1518 is attached to the prism holder 1517. The motor 1519 is controlled by the beam revolving device controller 1075c. Additionally, the revolution angle sensor 1050a is connected to the rotary head 1510 and the revolution radius sensor 1060a is connected to the working head 1550.

The working head 1550 is supported to the underside of the rotary head 1510 through the slide bearing 1551 comprising a plurality of balls arrayed in a linear groove, so that it is slidable under the rotary head 1510. The shift rack 1530 is fixed to an upper surface of the working head 1550 and is normally pulled by a shift spring 1531 attached to an inner surface of the rotary head 1510. Accordingly, the aforesaid roller 1621 is held against the tapered surface of the shift rack 1530 in its upper portion. Further, a condensing lens 1552 for condensing the laser beam and a nozzle 1553 for emitting the laser beam therethrough are attached in and to the working head 1550. An assist gas supply port 1554 is attached to be open closely to a tip end of the nozzle 1553.

In the beam revolving device 1050 and the revolution radius changing device 1060 constructed as described above, the laser beam enters the parallel prism 1518. Because the prism holder 1517 is fixed to the shift pinion 1516, rotation of the shift pinion 1516 causes the prism holder 1517 to be likewise rotated to incline as shown in FIG. 2. As a result of the prism holder 1517 and hence the parallel prism 1518 being thus inclined, the optical path of a laser beam exiting from the parallel prism 1518 is translated (shifted) by a predetermined distance from the optical axis thereof prior to entering the parallel prism 1518. The distance by which the laser beam is translated corresponds to the radius of revolution of the laser beam.

The prism holder 1517 is inclined as follows. When rotation of the gear 1617 driven by the motor 1616 is transmitted to the timing belt 1615, the nut 1611 on the outermost circumference of the vertically sliding mechanism unit 1610 is also rotated. Upon the nut 1611 being rotated, the helicoid threads in its inner circumferential surface are simultaneously rotated, whereby the helicoid threads 1618 held in mesh with the above helicoid threads are vertically moved and so is the lifting outer tube 1612. With vertical movement of the lifting outer tube 1612, the roller 1621 attached to the roller attachment portion 1620 is also vertically moved. At this time, since the roller 1621 is held against the shift rack 1530 by the tension of the shift spring 1531, the roller 1621 is vertically moved while rotating over the tapered surface of the shift rack 1530. Therefore, the shift rack 1530 in pressure contact with the roller 1621 is slid with respect to the working head 1550, and the shift pinion 1516 held in mesh with the groove cut in the upper portion of the shift rack 1530 is rotated. Consequently, the prism holder 1517 fixed to the shift pinion 1516 is inclined.

In the case of the roller 1621 being moved upward, for example, since the roller 1621 is rotated while contacting the tapered surface of the shift rack 1530, the shift rack 1530 is slid to the left on the drawing sheet by the tension of the shift spring 1531 and the shift pinion 1516 is rotated clockwise on the drawing sheet to increase an inclination angle of the prism holder 1517. Conversely, when the roller 1621 is moved downward, the shift rack 1530 is slid to the right on the drawing sheet against the tension of the shift spring 1531 and the shift pinion 1516 is rotated counterclockwise on the drawing sheet to reduce an inclination angle of the prism holder 1517.

Further, at the same time the shift rack 1530 is slid to the left and right, the working head 1550 fixed to the shift rack 1530 is slid with respect to the rotary head 1510 through the slide bearing 1551. Of course, amounts by which the shift rack 1530 and the working head 1550 slide are equal to each other. In addition, the angle of the tapered surface of the shift rack 1530 and the diameter and the number of teeth of the shift pinion 1516 are so set that the optical axis of the laser beam exiting from the parallel prism 1518 is always aligned with the axis of the condensing lens 1552 regardless of how much the optical axis is translated, inasmuch as the amount of translation is within an allowable limit which is determined by dimensions and arrangement of the apparatus.

When the rotary head 1510 is rotated, the working head 1550 including the shift pinion 1516, the shift rack 1550, the condensing lens 1552, the nozzle 1553 and the assist gas supply port 1554 is simultaneously rotated and, in addition, the roller 1621, the prism holder 1517, the parallel prism 1518 and the rotary inner tube 1613 of the vertically sliding mechanism unit 1610 are also simultaneously rotated. As a result, the laser beam prior to entering the parallel prism 1518 is revolved around the optical axis of the laser beam as given when originally emitted.

The basic operation of the lead frame fabricating apparatus constructed as above will now be described. When the type of lead frame to be fabricated is entered through the input unit 1072, the main controller 1079 reads the cutting information out of the storage unit 1073 and performs control of the associated parts. The cutting information read out of the storage unit 1073 includes the thickness, the cut shape and the cut path of a metal plate corresponding to the type of lead frame; the rotating speed, the revolving speed and the radius of revolution of the laser beam necessary for providing the cut path; laser beam generating conditions such as the repetition rate and excitation voltage of the resonator 1010 and selection of the optical system; whether or not to irradiate the laser beam and the number of times of irradiations, etc.

When the laser power supply 1010a is energized by the laser controller 1074 under control of the main controller 1079, the resonator 1010 starts generation. The laser beam 1011 emitted from the resonator 1010 horizontally and being substantially circular in section enters the beam section transformer 1020 where the beam section is elongated in one direction to become elliptic. At this time, the position of the concave cylindrical lens 1201 in the beam section transformer 1020 is controlled by the beach section transformer controller 1075a through the motor 1205. The laser beam 1012 emerging from the beam section transformer 1020 enters the Dove prism 1303 of the beam rotating device 1030, whereby it is rotated on its optical axis as mentioned above. The rotating operation (rotating speed and rotation angle) of the Dove prism 1303 is controlled by the beam rotating device controller 1075b through the motor 1306.

The laser beam 1013 emerging from the beam rotating device 1030 is reflected by the bending mirror 1040 to advance in the vertical direction. The laser beam 1014 reflected by the bending mirror 1040 enters the beach revolving device 1050 and the revolution radius changing device 1060 to be revolved around the original optical axis as described above. The revolving operation of the beam revolving device 1050, i.e., the rotating operation (rotating speed and rotation angle) of the rotary head 1510, at this time is controlled by the beam revolving device controller 1075c through the motor 1519, and the revolution radius changing operation of the revolution radius changing device 1060, i.e., the inclination of the parallel prism 1518, is controlled by the revolution radius changing device controller 1075d through the motor 1616.

The beam section transformer controller 1075a, the beam rotating device controller 1075b, the beam revolving device controller 1075c, and the revolution radius changing device controller 1075d are controlled by the beam controller 1075 at command from the main controller 1079.

The laser beam 1015 emerging from the beam revolving device 1050 and the revolution radius changing device 1060 is condensed by the condensing lens 1552 and is irradiated to the metal plate 1101 from the tip end of the nozzle 1553. At the same time, an assist gas is ejected through the assist gas supply port 1554 which is attached to be open closely to the tip end of the nozzle 1553. The assist gas supply port 1554 is attached in such a position and a direction as that, when the laser beam is revolved around the original optical axis in the process of fabricating the lead frame, the assist gas is always ejected outwardly of the lead frame from the original optical axis. Additionally, feeding of the metal plate 1101 is controlled by the feeder controller 1077 at command from the main controller 1079.

Further, the rotation angle sensor 1030a detects the angle by which the laser beam is rotated on its optical axis by the beam rotating device 1030, the revolution angle sensor 1050a detects the angle by which the laser beam is revolved around the original optical axis by the beam revolving device 1050, and the revolution radius sensor 1060a detects the radius of revolution of the laser beam which is set by the revolution radius changing device 1060. Then, respective values detected by those sensors are transmitted to the calculator 1076 in the control device 1070 where the direction of the laser beam and the position thereof on the revolution circle are calculated and fed back to the main controller 1079. The main controller 1079 transmits commands to the beam controller 1075 based on the calculation results by the calculator 1076, and changes the cutting conditions as needed.

At the timing when the laser beam is not emitted, image information (visible light) of the laser-cut portion is picked up by the CCD camera 1084 through a reflecting mirror 1085 which is inserted between the beam section transformer 1020 and the beam rotating device 1030. The picked-up information is displayed on a monitor 1086 and is recorded in the image recording unit 1082 of the cut portion monitoring device 1080. By using the reflecting mirror 1085 which is, for example, permeable to a beam emitted from a YAG laser (infrared ray with wavelength of 1064 Nm), but reflects a visible light (wavelength of 380 to 770 Nm), an image of only the visible light can be picked up by the CCD camera. The CCD camera 1084 is controlled by the camera controller 1081.

The image information recorded in the image recording unit 1082 is input to the image determining unit 1071 of the control device 1070, and is compared with the image information of the satisfactory laser-cut portion, that is stored in the storage unit 1083 beforehand, for determining whether the result of laser cutting is good or not. If the result of laser cutting is not good, the main controller 1079 changes the cutting conditions, as needed, in accordance with the evaluation result and the alarm issuing unit 1071a issues an alarm to inform an operator of the fact that the result of laser cutting is not good, thereby prompting the operator to take a proper action. Further, the type of lead frame, the result of laser cutting, the cutting conditions, etc. at this time are recorded in the recording unit 1078 to be utilized later as information for working out a measure to meet the situation.

Figure 5:
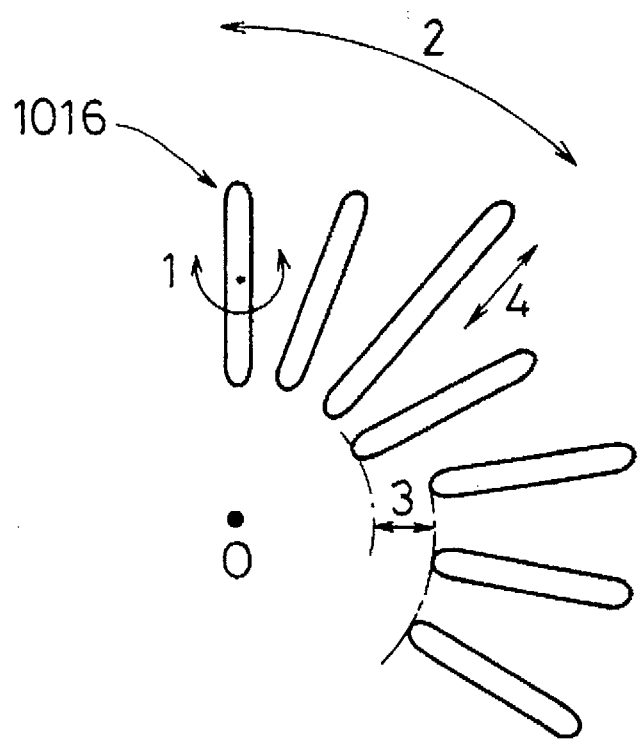
FIG. 5 is a view showing changes of a laser spot on a metal plate according to basic operation of the lead frame fabricating apparatus of FIG. 1.

FIG. 5 shows changes in an irradiation spot 1016 of the laser beam 1015 on the metal plate 1101 according to the above basic operation. The irradiation spot 1016 is rotated by the beam rotating device 1030 as indicated by an arrow 1, is revolved by the beam revolving device 1050 around a predetermined center O of rotation as indicated by an arrow 2, is changed in the radius of revolution by the revolution radius changing device 1060 as indicated by an arrow 3, and is extended and shortened in the lengthwise direction of its section by the beam section transformer 1020 as indicated by an arrow 4.

Figure 6:
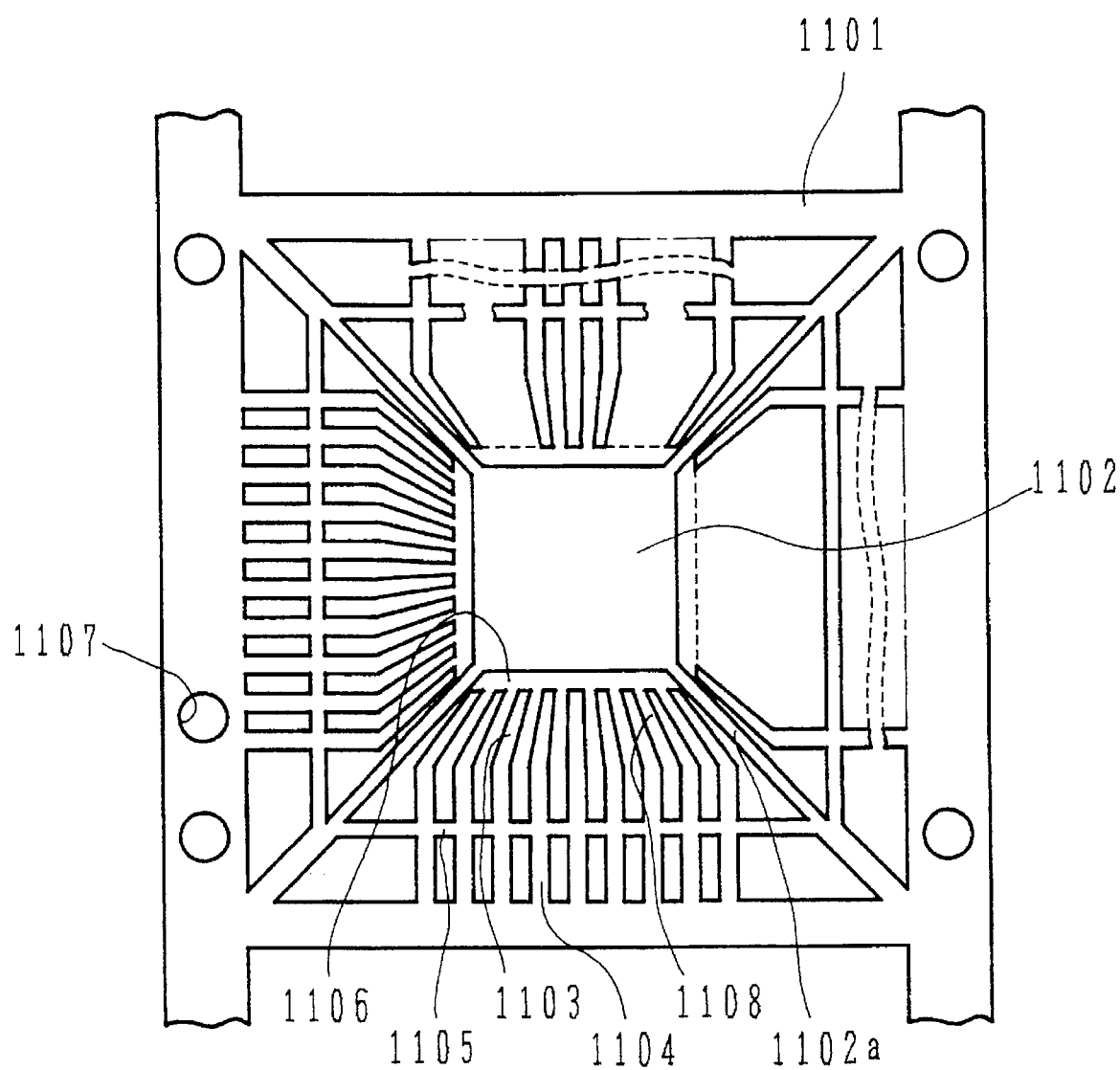
FIG. 6 is a view showing a configuration of a lead frame fabricated by the lead frame fabricating apparatus of FIG. 1.

A configuration of the lead frame to be fabricated by this embodiment will now be described with reference to FIG. 6. In FIG. 6, a die pad 1102 for mounting a semiconductor chip (not shown) thereon is provided in a central portion of a metal plate 1101. A number of inner leads 1103 and outer leads 1104 extending in continuous relation to the inner leads 1103 are disposed to surround the die pad 1102. The inner leads 1103 and the outer leads 1104 adjacent to each other are interconnected and supported by dam bars 1105 respectively. Around the die pad 1102, cut-out portions 1106 are formed except for arms 1102a. With the presence of the cut-out portions 1106, the inner leads 1103 are disconnected from the die pad 1102 and every adjacent twos of the inner leads 1103 are separated from each other. In an outer peripheral portion of the metal plate 1101, there are defined positioning holes 1107 used for positioning the metal plate when terminals of the semiconductor chip are connected to the inner leads 1103. The dam bars 1105 serve to dam a resin flow when the semiconductor chip is molded and also to reinforce the inner leads 1103 and the outer leads 1104, and are removed after the molding.

The inner leads 1103 are extended in the form converging toward the die pad 1102 as a whole, and their distal ends each have a width enough to establish electrical connection, Such as wire bonding, after mounting a semiconductor chip (not shown) on the die pad 1102. Accordingly, gaps 1108 separating the inner leads 1103 from each other are particularly narrow and have a very fine structure in the vicinity of their inner ends. Further, processing of those inner portions is most demanding in terms of dimensional accuracy and cleanness in fabrication of the lead frame. In this embodiment, at least the gaps 1108 separating the inner leads 1103 from each other are formed by laser cutting, whereas other relatively large portions than the inner leads 1103, such as the outer leads 1104, are formed by pressing or etching. As a result, the gaps 1108 separating the inner leads 1103 from each other can be highly accurately formed by laser cutting which enables a workpiece to be finely cut as a non-contact process, and the portions other than the inner leads, which do not require so strict dimensional accuracy, can be formed with high efficiency. Note that, if there occur no special problems, relatively large portions such as the outer leads 1104 may be formed by laser cutting like this embodiment.

The lead frame fabricating method of this embodiment will be described below with reference to FIGS. 7 to 14.

Figure 7:
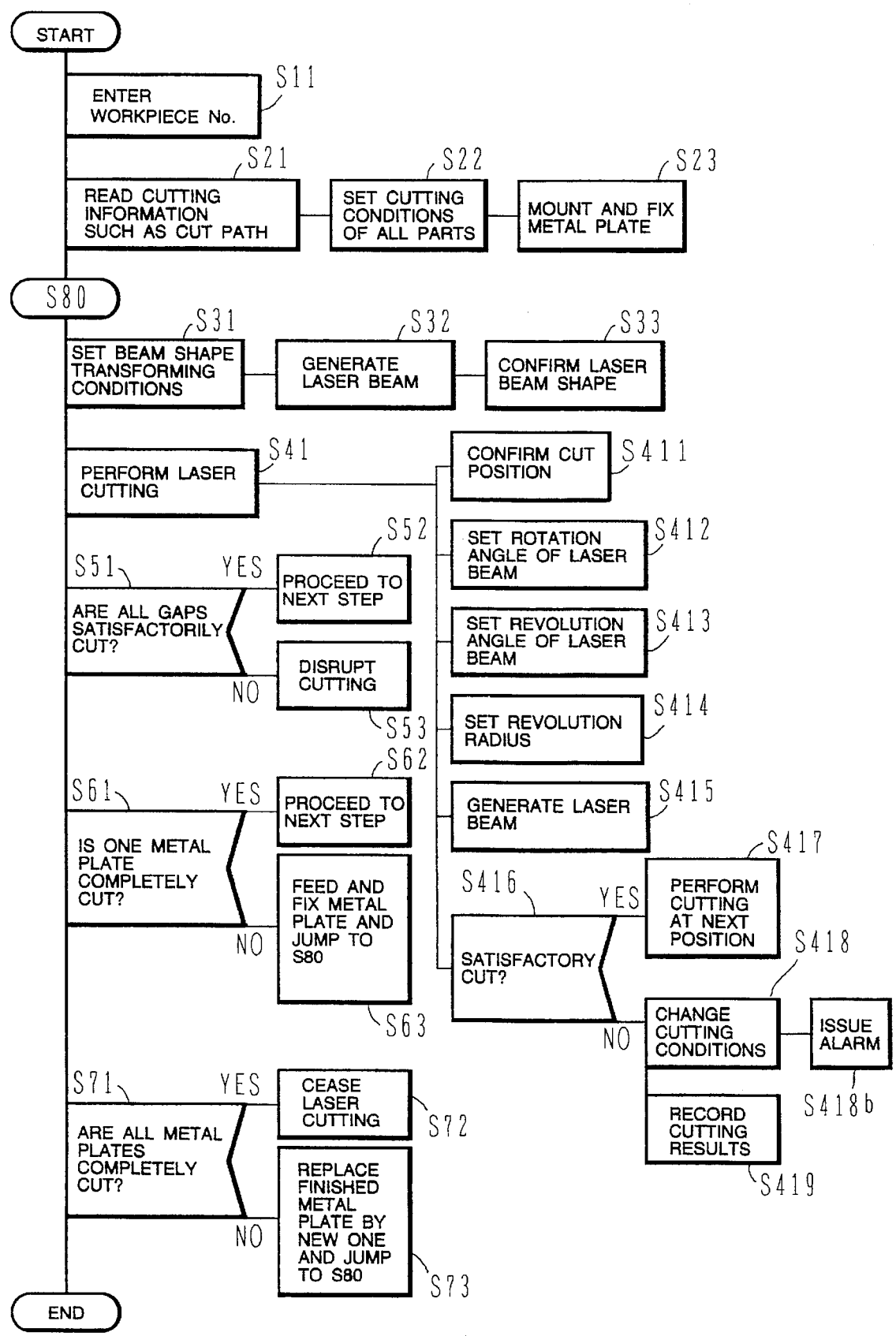
FIG. 7 is a flowchart for explaining steps of laser cutting in the lead frame fabricating apparatus of FIG. 1.

FIG. 7 is a flowchart for explaining steps of laser cutting performed by using the lead frame fabricating apparatus of FIG. 1. A group of control commands for executing the flowchart is stored in the main controller 1079. First, in step S11 of FIG. 7, the type of lead frame to be fabricated is entered through the input unit 1072. On this occasion, the workpiece number which is set for each type of lead frame beforehand may be entered. Then, in step S21, the aforesaid cutting information such as the cut path and the laser beam generating conditions are read out of the storage unit 1073. Based on the read-out cutting information, cutting conditions for all parts of the control device 1070 are set in step S22. The metal plate 1101 as a material is mounted and fixed to the feeder 1090 in step S23. A long strip metal rolled into the form of a coil is used as the metal plate 1101 and loaded on the feeder 1090.

Next, in step S31, a sectional shape (elliptic) of the laser beam is set by the beam section transformer 1020 beforehand. Note that, as a general rule, the sectional shape will not be changed during the cutting process. Under this condition, the laser beam is generated in step S32 to perform trial cutting, and a shape of the laser beam is confirmed by using the CCD camera 1084, the monitor 1086, etc in step S33. The process up to step S33 represents the operation for preparing laser cutting.

Next, in step S41, the lead frame is actually laser-cut. More specifically, in step S411, the cut position expressed by such parameters as the rotation angle and the revolving position of the laser beam calculated by the calculator 1076 is confirmed. In steps from S412 to S414, the rotation angle, the revolution angle and the radius of revolution of the laser beam are set respectively, following which the laser beam is generated in step S415 to carry out laser cutting. At this time, as described later, whether to generate the laser beam or not is determined based on the rotation angle and the revolving position of the laser beam which are confirmed in step S411.

Then, at the timing when the laser beam is not generated, it is judged in step S416 whether the laser-cut portion is satisfactorily cut or not. This judgment is made by, as described before, using the CCD camera 1084, the monitor 1086, the cut portion monitoring device 1080, and the image determining unit 1071. If the result of laser cutting is good, the control flow goes to step S417 for repeating the above steps subsequent to S41 to perform laser cutting at a next position. If the result of laser cutting is not good, the cutting conditions are changed in step S418a, an alarm is issued from the alarm issuing unit 1071a in step S418b, and the type of lead frame, the cutting result, the cutting conditions, etc. at this time are recorded in the recording unit 1078 in step S419. The above operations from step S411 to step S419 are repeated until all intended gaps of the lead frame are completely formed.

Procedures of forming the inner leads 1103 in the lead frame, which has a configuration as shown in FIG. 6, by the above steps of laser cutting will now be described with reference to FIGS. 8 to 12. Each of FIGS. 8 to 12 represents a path of the position irradiated by the laser beam on the metal plate 1101, and shows only a ¼ area of the lead frame in consideration of its symmetrical configuration. Also, in those drawings, the irradiation spot 1016 is indicated by an elongate ellipse. For simplification, it is assumed in FIGS. 8 to 12 that angular intervals between the gaps separating the leads from each other are all the same.

Figure 8:
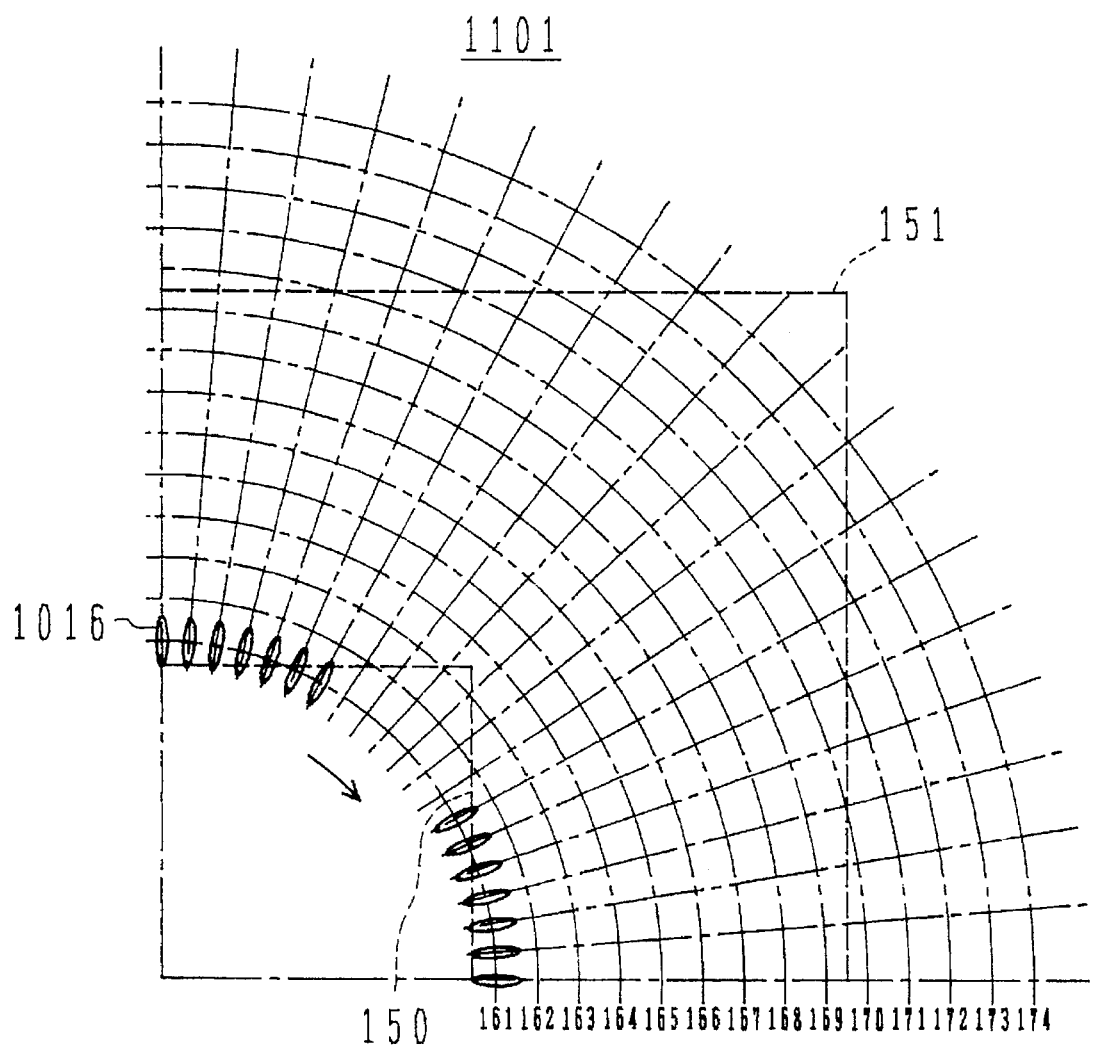
FIG. 8 is a view for explaining a procedure of forming inner leads according to a first embodiment.

In FIG. 8, the rectangular area inside a broken line 150 represents an area in which the die pad 1102 and the cut-out portions 1106 are formed, whereas the rectangular area outside a broken line 151 represents an area in which the outer leads 1104, the dam bars 1105, etc. are formed. Basically, the center of the lead frame to be fabricated is aligned with the center of revolution of the laser beam, the laser beam is revolved along each of concentric paths 161 to 174 one by one while generating the laser beam in the form of pulses, and the revolving motion and the rotating motion of the laser beam are synchronized with each other so that the lengthwise direction of the laser beam section is coincident with the direction pointing radially outward from the center of revolution. Then, the radius of revolution is successively changed from the innermost circular path 161 near the center of revolution to the outer concentric paths 162, 163, etc. At this time, the spacing between twos of the concentric paths 161 to 174 is set such that inner and outer irradiation areas covered by the irradiation spots 1016 are somewhat overlapped with each other in the lengthwise direction. As a result, a number of gaps extending radially from the center of revolution in the linear form are formed. The angular interval between the radial gaps adjacent to each other is uniquely determined by the revolving speed and the emission period of the pulse-like laser beam, and is set to be in match with the final configuration of the lead frame. In other words, the angular interval between the radial gap is determined in accordance with the pitch of the inner leads 1103. Note that an angular speed of the beam revolving device 1050 is here kept constant so as to make all the angular intervals between the adjacent gaps equal to one another.

Meanwhile, a usual lead frame has such a radial configuration that its lead pitch is narrower in a central portion than in an outer portion, i.e., that leads in the central portion have a narrower width than those in the outer portion and hence are more apt to thermally deform. However, since the gap size formed by the irradiation of the laser beam is substantially the same in any of the central and outer portions of the lead frame, the amount of heat input to the lead frame per unit area is several times greater in the central portion than in the outer portion. Stated otherwise, distal end portions of inner leads are more likely to thermally deform than outer portions of the inner leads and outer leads. In this embodiment, because the laser cutting is progressed from the central portion near the center of revolution outward successively along the concentric paths, the distal end portions of the inner leads 1103 are cut in a beginning period of the laser cutting process where the input heat is still small. Accordingly, thermal deformations of the distal end portions of the inner leads 1103 can be suppressed so as to ensure good dimensional accuracy. On the other hand, at the time when portions near the outer leads 1104 are subject to the laser cutting, the substantial amount of heat is accumulated, but those portions are less apt to thermally deform because of having a large lead width, and hence are hardly affected by the heat. Additionally, since the outer portions of the inner leads have a relatively large margin for cutting errors as compared with the distal end portions and thereabout, cutting quality is less impaired.

The description is now returned to the procedure of forming the inner leads 1103 by laser cutting. First, for the innermost circular path 161, the laser beam is generated not in an intermediate region (near the direction of the hour hand at the time 1:30) of the path 161, but only in regions thereof near the directions of the hour hand at the time 12:00 and 3:00, so that no gaps are formed inside the broken line 150. For that purpose, whether to generate the laser beam or not is determined, as explained above in connection with step S415 of FIG. 7, by the main controller 1079 based on the direction and the revolving position of the laser beam calculated by the calculator 1076. In response to the determination, a command is sent to the laser controller 1074 for controlling the laser supply 1010a and hence the resonator 1010. As an alternative, whether to irradiate the laser beam or not may be controlled by using a beam shutter (not shown) provided in the resonator.

Figure 9:
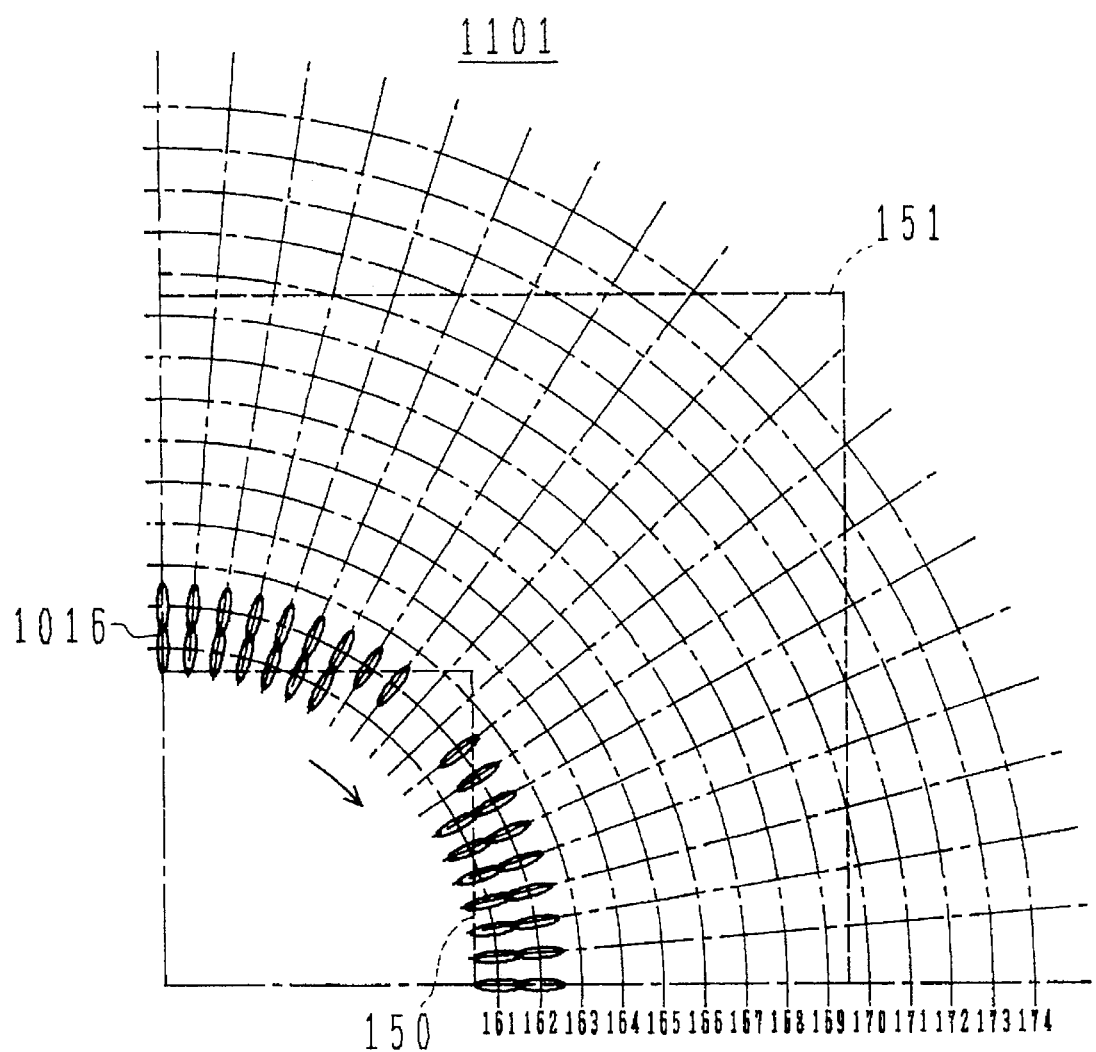
FIG. 9 is a view for explaining a procedure subsequent to that in FIG. 8.

Likewise, for the next path 162, the laser beam is generated except for the region inside the broken line 150 as shown in FIG. 9. Although the gaps are formed in FIGS. 8 and 9 such that they extend to the region inside the broken line 150 to some extent, that region and thereabout correspond to portions which are later severed together so as to become the cut-out portions 1106. With this severing, the inner leads 1103 are separated from each other and lines interconnecting the inner distal ends of the inner leads define a rectangular shape. This point will be described later with reference to FIG. 14.

Figure 10:
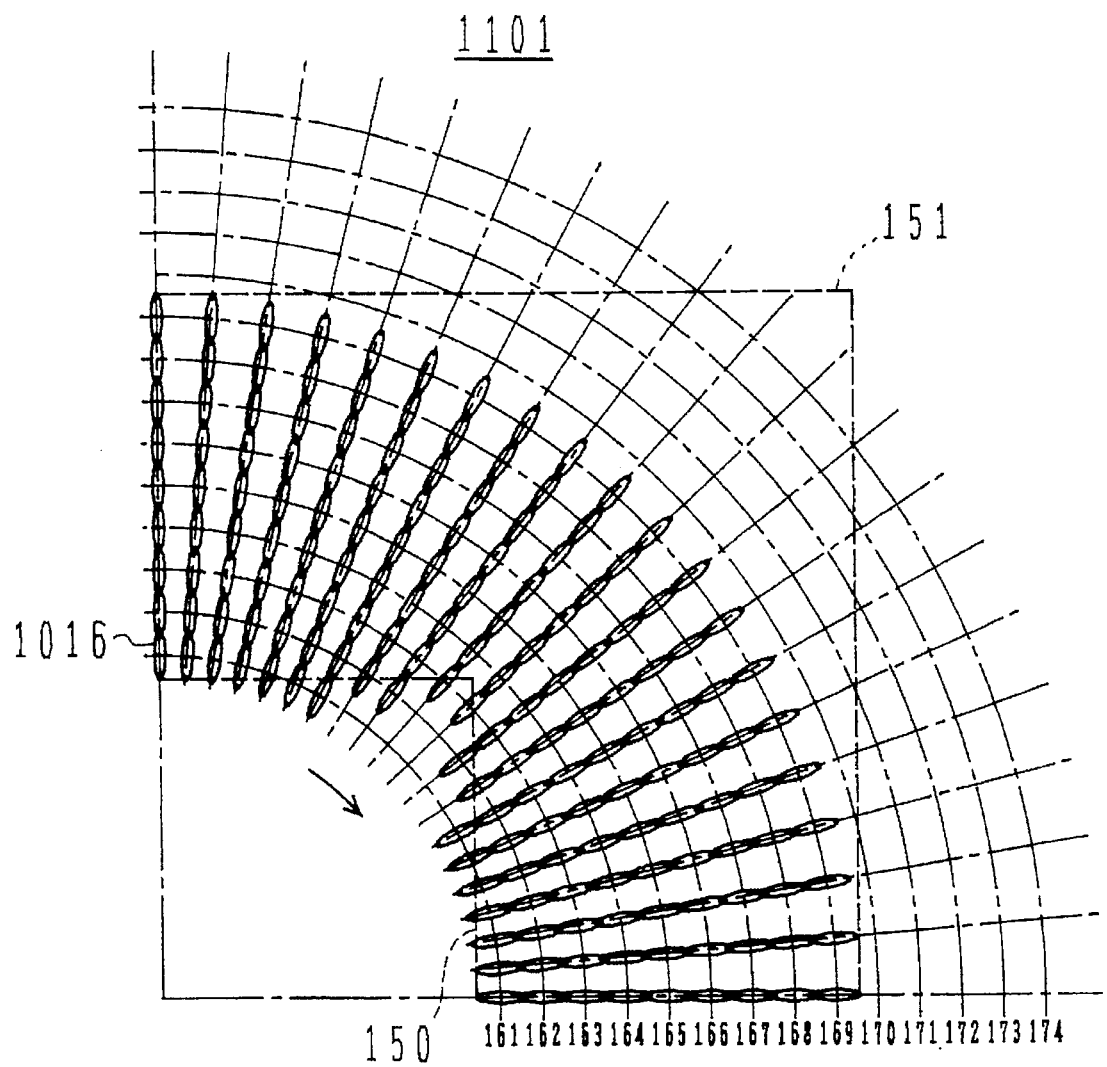
FIG. 10 is a view for explaining a procedure subsequent to that in FIG. 9.

For the next path 163 to the path 169, gaps are cut only in a region outside the broken line 150 and inside the broken line 151 and, therefore, the laser beam is generated along each of the entire concentric paths to carry out the laser cutting as shown in FIG. 10.

Figure 11:
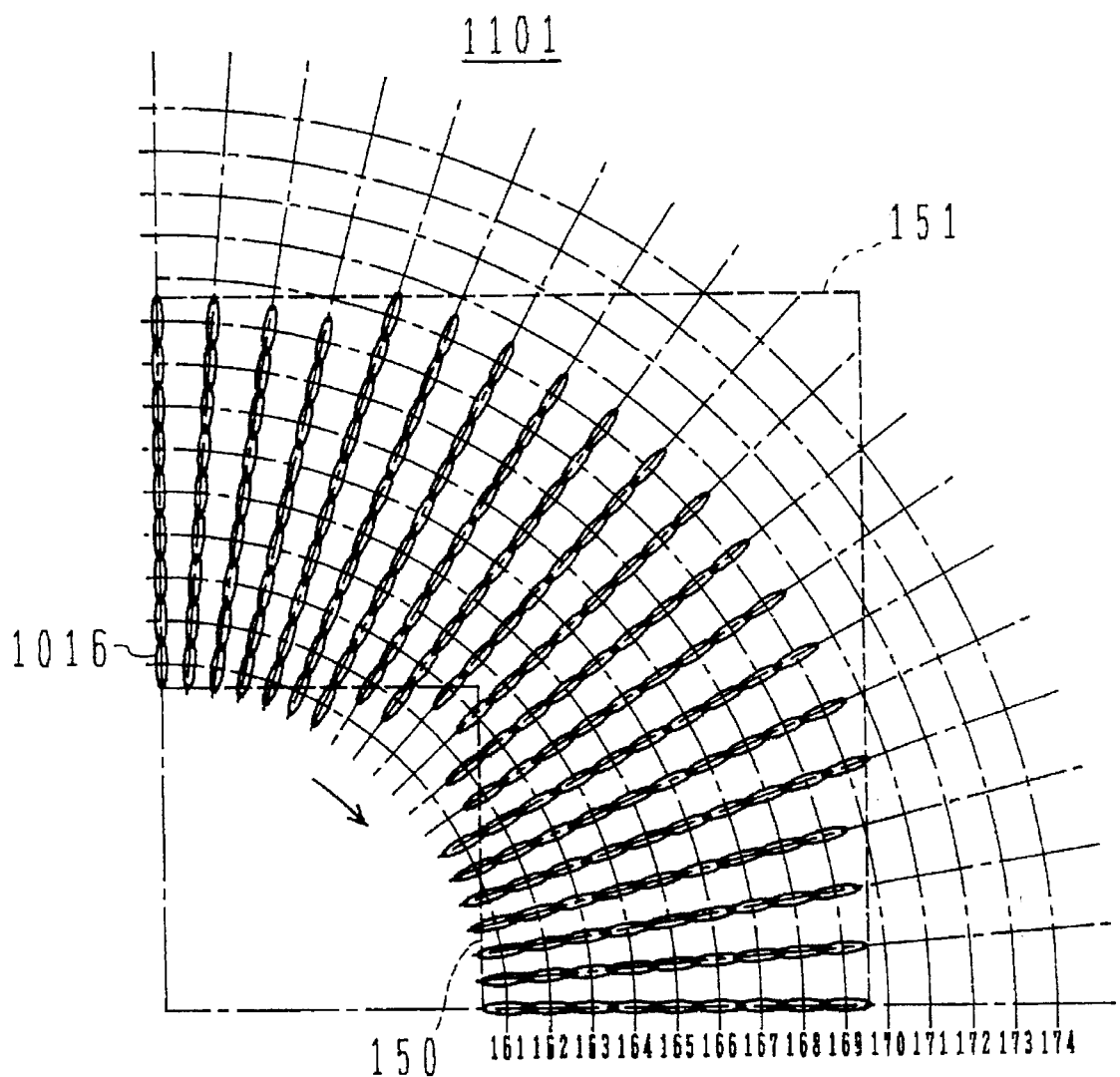
FIG. 11 is a view for explaining a procedure subsequent to that in FIG. 10.
Figure 12:
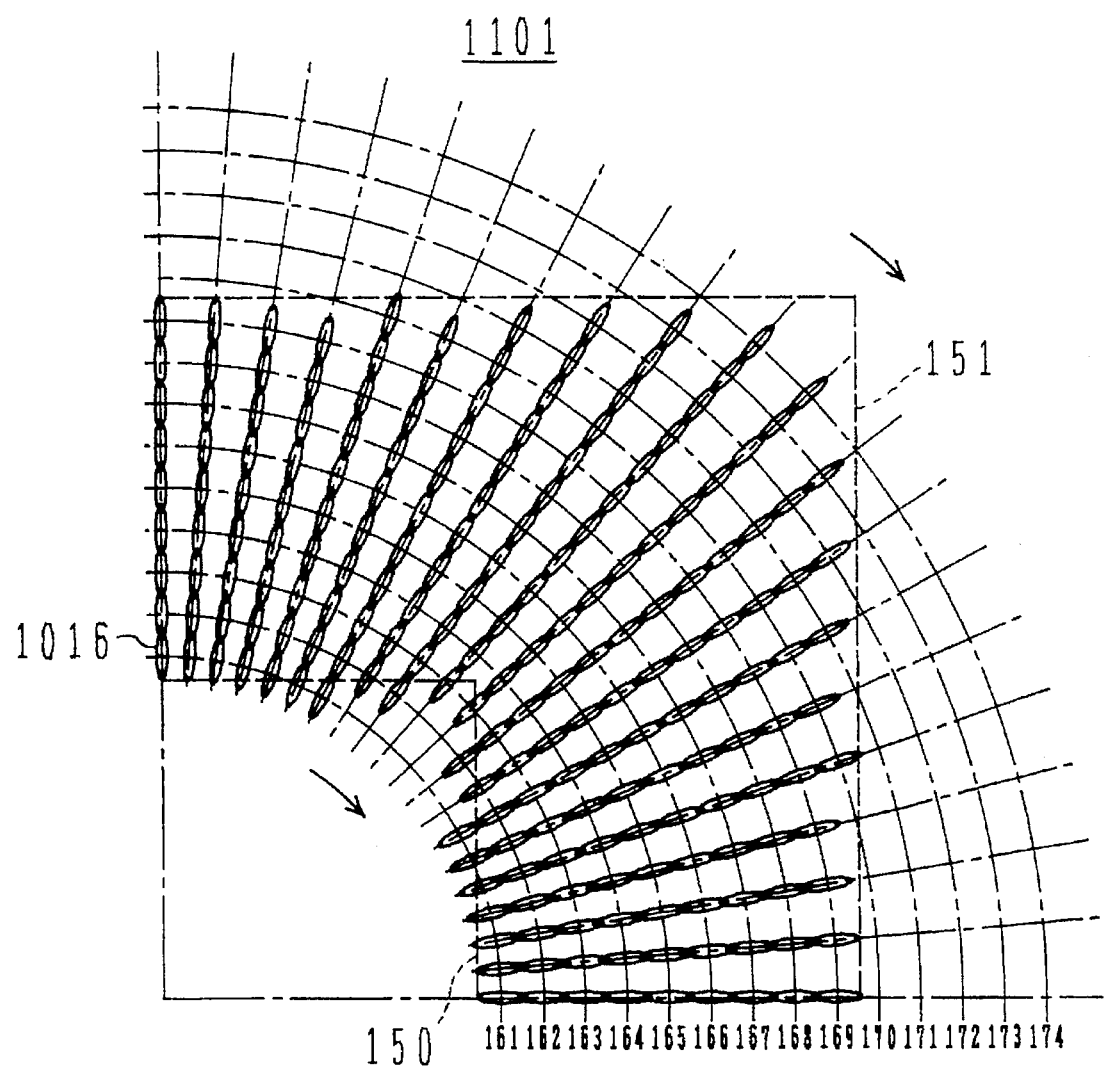
FIG. 12 is a view for explaining a procedure subsequent to that in FIG. 11.

For the next path 170, in order to avoid gaps from being formed outside the broken line 151, the laser beam is generated not in regions of the path 170 near the directions of the hour hand at the time 12:00 and 3:00, but only in an intermediate region (near the direction of the hour hand at the time 1:30) thereof, as shown in FIG. 11. For the further paths 171 to 174, as shown in FIG. 12, the laser beam is likewise irradiated except for regions outside the broken line 151. As a result of the above procedures, the gaps 1108 separating the inner leads 1103 are formed by the laser cutting.

In the above laser cutting process, since the pulse width of the laser beam, i.e., the time during which the laser beam is generated, is much shorter than the repetition period of the laser beam, i.e., the time from generation of one pulse to generation of the next, the laser cutting is momentarily completed. On the other hand, the time required for the revolving means to move the irradiated position of the laser beam along any path is sufficiently longer than the repetition period. Therefore, even when the irradiated position of the laser beam is continuously moved at a constant speed, an influence resulted from such continuous movement of the irradiated position, i.e., an error in the cut position, is small. In other words, a number of radial gaps can be easily formed in the metal plate just by moving the irradiated position of the laser beam by the revolving means and the revolution radius changing means while generating the laser beam in the form of pulses.

The difference between a comparative example, in which the inner leads 1103 are formed with combination of linear movement and rotating motion of a laser beam optical axis by using the prior art as disclosed in JP, A, 1-806088, JP, A, 60-93095, etc. and this embodiment will now be described with reference to FIG. 13 from the viewpoint of intermittent control of the moving direction of the laser beam optical axis. Note that FIG. 13 is illustrated in the schematic form, and an R-axis as a radial axis and a θ-axis as a circumferential axis are defined as shown.

It is here assumed that the maximum length of one inner lead 1103 to be formed by laser cutting is 10 mm, the number (N) of the inner leads 1103 to be formed is 300, and the length which can be cut by one shot of laser beam is 1.0 mm. This assumption of setting the cut length by one shot of laser beam to be 1.0 mm is made in consideration of experimental results that the metal plate 1101 with a thickness in the range of about 0.1 to 0.2 mm can be cut over an area, which is about 0.03 to 0.05 mm wide and about 0.5 to 1.0 mm long, by one shot of laser beam having an elongate sectional shape.

Figure 13A:
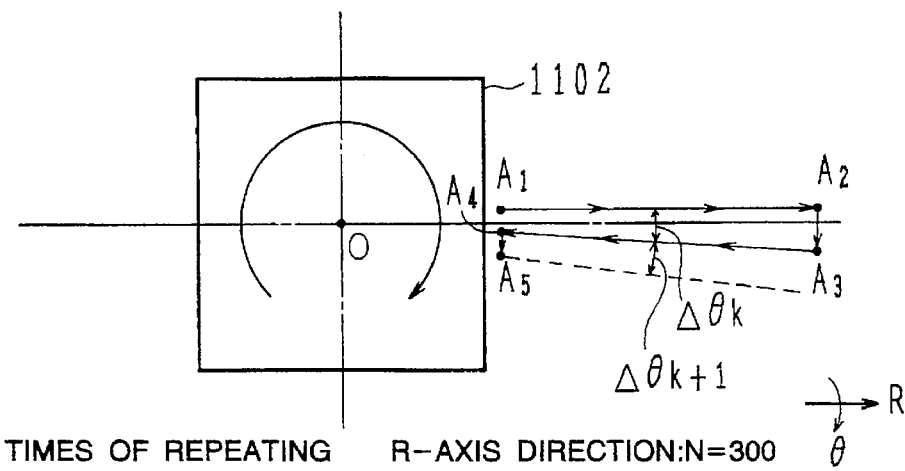
FIG. 13A is a view showing a comparative example in which inner leads are formed with combination of linear movement and rotating motion of a laser beam optical axis by using the prior art.

To form the inner leads 1103 radially around the die pad 1102 by the comparative example, the laser beam is irradiated while repeating operation of moving the optical axis of the laser beam only in the direction of one axis and operation of rotating it about the other axis as shown in FIG. 13A, on condition that the lengthwise direction of the laser beam section is kept aligned with the R-axis direction. More specifically:

(1) The laser beam is irradiated in the form of pulses while moving the optical axis of the laser beam outward in the R-axis direction, thereby cutting the metal plate along a linear line $A_1A_2$.

(2) The irradiation of the laser beam is suspended and the optical axis of the laser beam is rotated (revolved) a small angle $\Delta\theta_k$ around the center O of rotation. The optical axis of the laser beam is thereby moved to $A_3$.

(3) The laser beam is irradiated in the form of pulses while moving the optical axis of the laser beam inward in the R-axis direction, thereby cutting the metal plate along a linear line $A_3A_4$.

(4) The irradiation of the laser beam is suspended and the optical axis of the laser beam is rotated (revolved) a small angle $\Delta\theta_{k+1}$ around the center O of rotation. The optical axis of the laser beam is thereby moved to $A_5$.

By repeating the above steps (1) to (4), all the inner leads 1103 are formed. In the foregoing process, it is required to suspend the irradiation of the laser beam and make intermittent control of the moving direction thereof when the optical axis of the laser beam is moved from $A_2$ to $A_3$ and $A_4$ to $A_5$. Additionally, the operation of reversing the beam moving direction is also required then.

Assuming here that the number of pulse laser shots necessary for forming one inner lead 1103 is M, M is given by:

$M = 10/1.0 = 10$

In other words, to form one inner lead 1103, the optical axis of the laser beam can be continuously moved while irradiating the pulse laser M times successively.

On the other hand, the number of times that the intermittent control of the beam moving direction is required to be repeated to form all the inner leads 1103 is given by:

R-axis direction: N=300

θ-axis direction: N=300

Thus, the intermittent control of the beam moving direction must be repeated as many times as the number of the inner leads 1103. As the intermittent control of the beam moving direction is repeated so many times and the beam moving direction is reversed so frequently, there gives rise to a risk that a clearance or looseness may be caused in a driving mechanism system, and a resultant error may be accumulated to increase a positioning error and produce a backlash. Correcting such an error requires a calibration step to be performed with respect to a predetermined position. As a result of accumulation of the time required for each calibration step, a lot of time is additionally consumed and the cutting speed is reduced correspondingly.

Figure 13B:
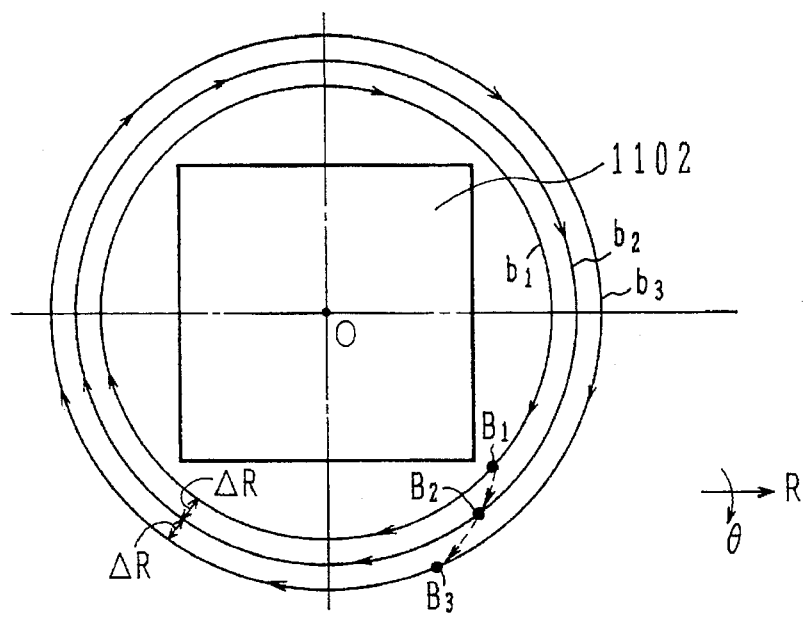
FIG. 13B is a view showing a manner in which inner leads are formed according to a lead frame fabricating method of the first embodiment.

In contrast with the above comparative example, the inner leads 1103 are formed according to this embodiment by irradiating the laser beam in the form of pulses while moving the optical axis of the laser beam concentrically around the center O of rotation, as shown in FIG. 13B. More specifically:

(1) The laser beam is irradiated in the form of pulses while moving the optical axis of the laser beam from $B_1$ along a circular path $b_1$, thereby cutting the metal plate one round.

(2) The irradiation of the laser beam is suspended and the optical axis of the laser beam is moved from $B_1$ to $B_2$ on a next circular path $b_2$.

(3) The laser beam is irradiated in the form of pulses while moving the optical axis of the laser beam from $B_2$ along the circular path $b_2$, thereby cutting the metal plate another round.

(4) The irradiation of the laser beam is suspended and the optical axis of the laser beam is moved from $B_2$ to $B_3$ on a next circular path $b_3$.

By repeating the above steps (1) to (4), all the inner leads 1103 are formed. On each of the circular paths, the optical axis of the laser beam is moved in the same circumferential direction at all times and by a substantially regular distance for each shot, which results in stable operation and good reliability.

In the foregoing process, the number of times that the intermittent control of the beam moving direction is required to be repeated to form all the inner leads 1103 is given only by the number of times of moving the optical axis of the laser beam in the R-axis direction from one to another of the concentric paths $b_1$ to $b_3$, namely:

$M = 10$

Stated otherwise, the number of times of repeating the intermittent control of the beam moving direction is just equal to the number of pulse laser shots required to form one inner lead 1103 and is much smaller, i.e., only 1/30, than that required in the comparative example. Additionally, when the intermittent control of the beam moving direction is performed, the operation of reversing the beam moving direction is not needed and the optical axis of the laser beam is only required to be radially moved by a short distance indicated by ΔR without stopping the movement of the laser beam (see broken lines $B_1B_2$ and $B_2B_3$), as shown in FIG. 13B. Therefore, the movement of the laser beam can be controlled smoothly and moderately. If the concentric paths are changed into spiral paths, all the inner leads 1103 can be formed by making the intermittent control of the beam moving direction and suspending the irradiation of the laser beam at no time in theory. Consequently, position alignment of the driving mechanism system can be facilitated to improve a control ability, the system can be easily balanced to eliminate such inaccuracy as clearance, loose and backlash, and a positioning error can be minimized. It is thus possible to obtain very good results in accuracy, reliability and reproducibility of the cut position.

In addition, even if the laser beam is revolved by the beam revolving device 1050 at a relatively low speed, the radial gaps can be easily cut at a high speed only by controlling the smooth and moderate motion of the laser beam in its rotation, revolution and so on while the laser beam is continuously revolved at a constant revolving speed. Assuming, for example, that the length of the portion cut by irradiating one shot of elongate laser beam is about 0.5 to 1.0 mm as mentioned above and the repetition rate of the laser beam is 300 Hz (=300 pulses/s), the product of these two parameters:

$$300 \text{ pulses/s} \times 0.5 \text{ to } 1.0 \text{ mm} = 150 \text{ to } 300 \text{ mm/s}$$
$$= 9 \text{ to } 18 \text{ m/min}$$

represents the total cutting length per second and minute. These values can be considered as a laser cutting speed in this embodiment, and the resultant total cutting length per second is much longer than that obtained by the prior art laser cutting process. Thus, according to this embodiment, the laser cutting can be performed at a very high speed.

Furthermore, since the laser beam is irradiated in the form of pulses, i.e., intermittently, along each of the concentric paths 161 to 174, the heat input with the laser cutting is rather apt to more easily disperse and an influence of the heat is alleviated. Accordingly, dimensional accuracy and quality after the laser cutting can be improved. Moreover, since the gaps are formed radially and linearly, deformation characteristics of all the leads, i.e., the directions and magnitudes of deformations, become almost analogous to one another and also uniform. Accordingly, if any deformation is caused, the adjacent leads are less likely to contact each other. Hence, a possibility of contact troubles between the adjacent leads is reduced even with the leads having a finer shape and a narrower pitch.

Returning to FIG. 7, a description will be made of steps after carrying out the laser cutting in accordance with the procedures shown in FIGS. 8 to 12. First, it is judged in step S51 whether all the gaps are satisfactorily cut or not. This judgment is also made by using the CCD camera 1084, the monitor 1086, the cut portion monitoring device 1080, and the image determining unit 1071. If the result of laser cutting is good, the control flow goes to a next step (step S52). If the result of laser cutting is not good, the control flow goes to step S53 where the cutting is disrupted and the cutting conditions are reconsidered and set anew.

Next, it is judged in step S61 whether one metal plate is completely cut or not. If completed, the control flow goes to a next step (step S62) and, if not so, the metal plate is fed and fixed in place, followed by jumping to step S80 (in step S63). This operation of feeding and fixing the metal plate is performed by the feeder 1090 in accordance with a command from the feeder controller 1077. It is then judged in step S71 whether all the metal plates are completely cut or not. If completed, the laser cutting is totally ceased (in step S72) and, if not so, the metal plate is replaced by new one, followed by jumping to step S80 (in step S73).

Figure 14A:
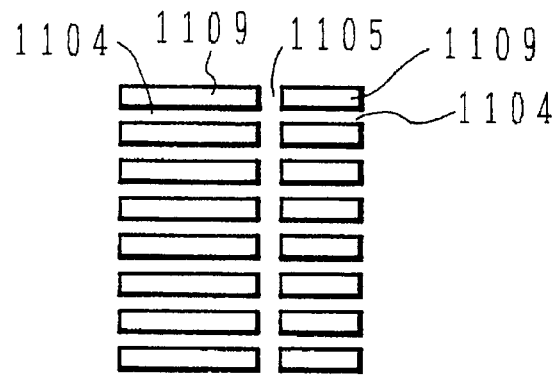
FIG. 14A is a view showing gaps separating outer leads from each other.
Figure 14B:
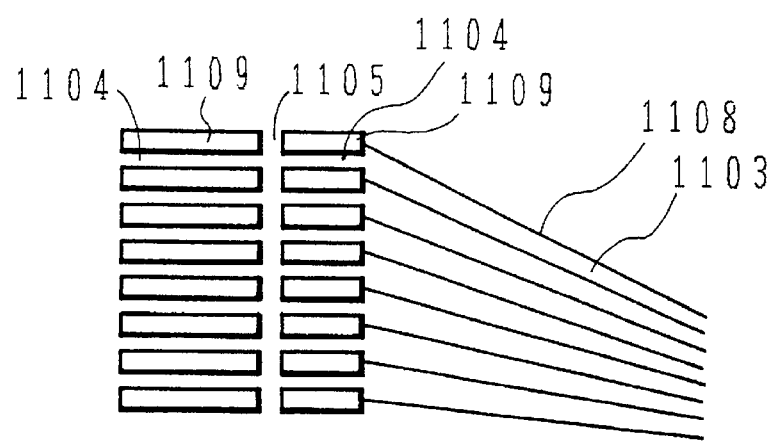
FIG. 14B is a view showing gaps separating inner leads formed by cutting using a laser beam from each other.
Figure 14C:
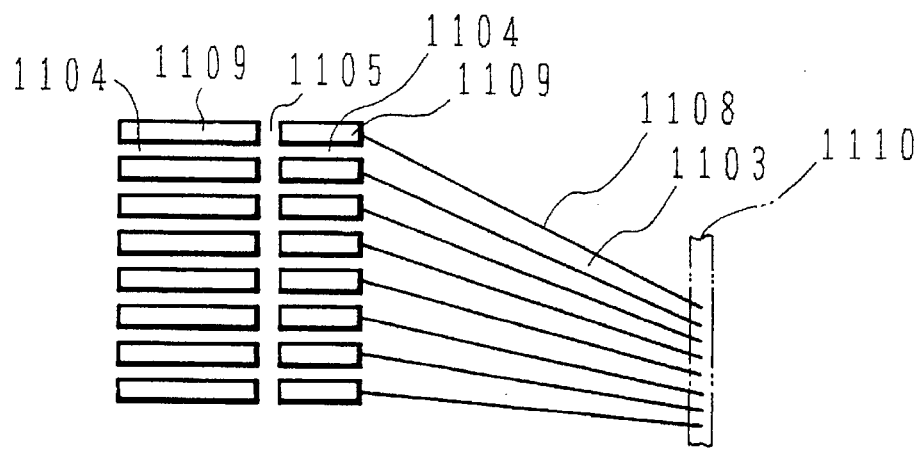
FIG. 14C is a view for explaining cutting distal ends of inner leads.

A method of forming the outer leads and cutting off the distal ends of the inner leads will be described below. In this embodiment, prior to starting the laser cutting, rectangular gaps 1109 separating the outer leads 1104 from each other are formed beforehand as shown in FIG. 14A. The gaps 1109 are formed by the conventional processing method, i.e., pressing or etching. At the same time, cut-out portions such as the positioning holes 1107 may be formed. After that, the inner leads 1103 are formed successively as described above in connection with FIGS. 7 to 12, and the gaps 1108 separating the inner leads 1103 from each other are joined respectively with the gaps 1109 separating the outer leads 1104 from each other as shown in FIG. 14B. The inner leads 1103 and the outer leads 1104 are thereby coupled to each other.

In the laser cutting process described above in connection with FIGS. 7 to 12, as the gaps 1108 are formed from the inner side to the outer side, cutting errors due to a thermal deformation or a distortion, etc. are accumulated. However, the accumulated cutting errors due to thermal deformation or the distortion, etc. are all released when the gaps 1108 are joined with the gaps 1109 as shown in FIG. 14B. This is because the gaps 1109 formed by pressing or etching are generally wider than the gaps 1108 formed by laser cutting so that, at the time when the gaps 1108 are joined with the wider gaps 1109, the thermal deformation and cutting errors both accumulated during the formation of the gaps 1108 are all absorbed by the gaps 1109.

In the state of FIG. 14B, the gaps 1108 separating the inner leads 1103 from each other remain interconnected at their inner distal end portions. A cut-off portion 1110 (indicated by two-dot-lines in FIG. 14B) inwardly of the gaps 1108 near the inner distal ends of the inner leads 1103 remained not yet disconnected but still coupled to each other is finally severed at a time by, e.g., pressing (see FIG. 14C). By so severing the cut-off portion 1110, the die pad 1102 and the cut-out portion 1106 are formed and, simultaneously, the inner leads 1103 are separated from each other such that lines connecting the inner distal ends of the inner leads 1103 define a rectangle in conformity with the shape of the die pad 1102. Thus, since the inner distal end portions inwardly of the gaps 1108 are left coupled to each other and the cut-off portion 1110 is finally severed at a time, the cut shape of the inner leads 1103 is good in not only their intermediate portions but also their distal end portions. Also, although the inner distal end portions of the inner leads 1103 are extremely fine in shape and narrow in pitch and hence are so weak as to relatively easily deform in the cutting work, they can be prevented from deforming by employing the above process, i.e., by keeping those inner distal end portions interconnected and finally separating them from each other.

One example of a method of manufacturing a semiconductor device using the above-mentioned lead frame will be described below with reference to FIG. 15.

Figure 15:
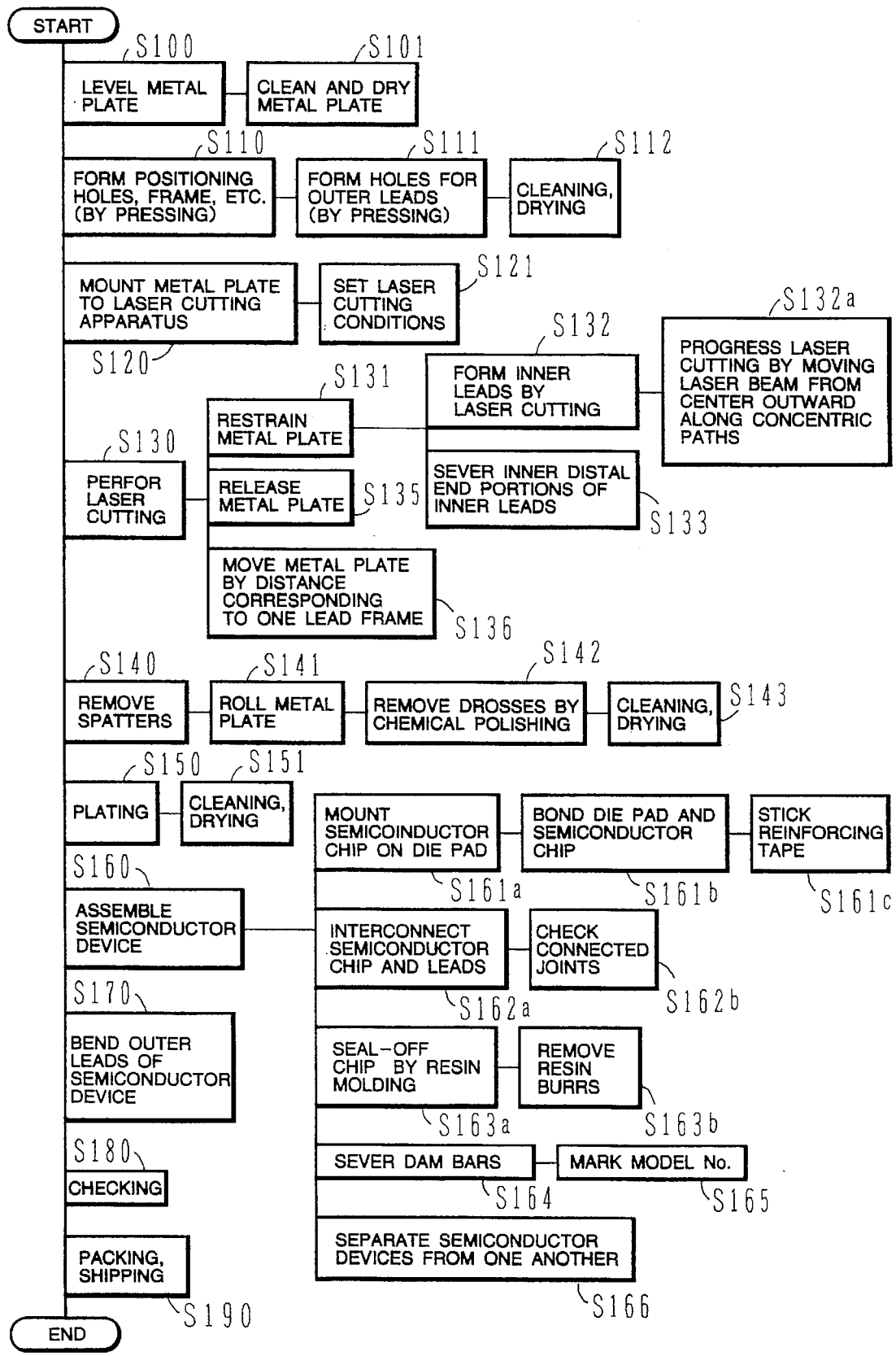
FIG. 15 is a flowchart showing one exemplified method of manufacturing a semiconductor device using the lead frame shown in FIG. 6.

First, in step S100 of FIG. 15, a strip material, for example, a metal plate made of steel, copper alloy, 42 Alloy or Kovar, is leveled by being passed through a leveler to eliminate a tendency of the plate to curve. Then, the surfaces of the metal plate are cleaned to remove dirt, oil and so on in step S101, followed by drying.

Subsequently, the positioning holes and the frame are formed by pressing in step S110, and the gaps 1109 (see FIG. 14) separating the outer leads 1104 from each other are formed by pressing in step S111. The surfaces of the metal plate are cleaned to remove dirt, oil and so on in step S112, followed by drying. Then, the metal plate is mounted to the laser cutting apparatus in step S120, and the laser cutting conditions are set in step S121.

Next, in step S130, the laser cutting is carried out in the same manner as described above in connection with FIGS. 7 to 12. More specifically, the metal plate is restrained in place in step S131, and the inner leads are formed by the laser cutting in step S132. At this time, as mentioned before, the laser cutting is progressed by moving the laser beam from the center of the metal plate outward along concentric paths successively (step S132a). Subsequently, in step S133, the inner distal end portions of the inner leads (i.e., the cut-off portion 1110) are severed as described above in connection with FIG. 14C. After the laser cutting, the metal plate is released from its restrained state in step S135, and is moved by a distance corresponding to one lead frame in step S136. The above operation subsequent to step S130 is repeated until the strip of metal plate is laser-cut all over its length.

Thereafter, a post-process for the laser cutting is carried out. Specifically, spatters scattered onto the surfaces of the metal plate during the laser cutting are mechanically removed in step S140, and the metal plate is rolled to improve surface accuracy in step S141. Then, drosses produced during the laser cutting are removed by chemical polishing in step S142, and the surfaces of the metal plate are cleaned and dried in step S143.

Subsequently, the metal plate is subject to plating such as soldering in step S150, and the plated surface is cleaned and dried in step S151. This plating step is to facilitate subsequent electrical connection between the lead frame and a semiconductor chip or the like.

Next, a semiconductor device is assembled in step S160. More specifically, a semiconductor chip is mounted on the die pad 1102 (see FIG. 6) in step S161a, the semiconductor chip and the die pad are bonded to each other in step S161b, and a reinforcing tape is stuck to the lead frame in step S161c so that the leads will not be disordered or deformed. Then, terminals of the semiconductor chip are connected to the leads in step S162a, and the connected joints therebetween are checked in step S162b. Subsequently, the semiconductor chip and the inner leads are sealed off together by resin molding in step S163a, and burrs caused by excessive molding resin are removed in step S163b. After that, the dam bars 1105 (see FIG. 6) are cut off in step S164, and the product model number is marked in step S165. Since a number of semiconductor devices are formed on the coiled strip of metal plate at this point of time, the semiconductor devices are separated from each other in next step S166.

Then, the outer leads 1104 of each of the semiconductor devices separated from each other are bent in step S170, final check is made in step S180, and the semiconductor devices are finally packed and shipped as products in step S190.

With this embodiment as described above, since the laser beam generated in the form of pulses and having a circular section is converted by the beam section transformer 1020 into a laser beam having an elongate elliptic section, the resultant laser beam is revolved around the center by the beam revolving device 1050 while it is rotated on its optical axis by the beam rotating device 1030 so that the lengthwise direction of the laser beam is aligned with the direction pointing radially outward from the center of revolution, and the laser beam is irradiated to the metal plate 1101 while changing the radius of revolution of the laser beam successively along concentric paths by the revolution radius changing device 1060, it is possible to form a number of gaps which are extended radially and linearly from the center of revolution. Then, by so forming the radial gaps by the above laser cutting process, inner leads of a lead frame can be formed.

Furthermore, the operation of reversing the direction of movement of the laser beam optical axis is not needed, controlling the smooth and moderate motion of the optical axis of the laser beam is only primarily required, and the required number of times of repeating intermittent control of the beam moving direction (stop and restart of the laser beam) is very small. Accordingly, position alignment of the driving mechanism system can be facilitated to improve a control ability, a positioning error due to clearance and loose can be minimized, and very good results are obtained in accuracy, reliability and reproducibility of the cut position. In addition, since the laser cutting can be progressed successively for each of short repetition periods, it is easily carried out and the cutting speed is increased.

Also, since the laser beam is irradiated in the form of pulses, i.e., intermittently, along each of the concentric paths 161 to 174, the heat input with the laser cutting is apt to more easily disperse and an influence of the heat is alleviated. Accordingly, dimensional accuracy and quality after the laser cutting can be improved. Moreover, since the gaps are formed radially and linearly, deformation characteristics of all the leads, i.e., the directions and magnitudes of deformations, become almost analogous to one another and also uniform. Accordingly, if any deformation is caused, the adjacent leads are less likely to contact each other. Hence, a possibility of contact troubles between the adjacent leads is reduced even with the leads having a finer shape and a narrower pitch.

Since the angular speed of the beam revolving device 1050 is kept substantially constant, all the angles between the adjacent radial gaps can be equal to one another. Also, since the center of revolution is positioned at the center of the lead frame, a number of gaps extending radially from the center of the lead frame can be formed.

Since the laser cutting is progressed from the central portion near the center of revolution outward successively, the distal end portions of the inner leads 1103 are cut in a beginning period of the laser cutting process where the input heat is still small. Accordingly, thermal deformations of the distal end portions of the inner leads 1103 are suppressed so as to ensure good dimensional accuracy. On the other hand, at the time when portions near the outer leads 1104 are subject to the laser cutting, the substantial amount of heat is accumulated, but those portions are less apt to thermally deform because of having a large lead width, and hence are hardly affected by the heat. Additionally, since the outer portions of the inner leads have a relatively large margin for cutting errors as compared with the distal end portions and thereabout, cutting quality is less impaired.

Since the assist gas is ejected near the irradiated position of the laser beam in the direction outward from the center of revolution, the produced drosses are collected to the outer side in which the lead width is relatively large, and will not remain in the side of the inner leads 1103 which are fine in shape and narrow in pitch and require high dimensional accuracy.

Since the gaps 1109 separating the outer leads 1104 from each other are formed by pressing or etching beforehand and the gaps 1108 separating the inner leads 1103 from each other are then joined respectively with the gaps 1109, cutting error due to the thermal deformation and the distortion, etc. both accumulated during the formation of the gaps 1108 by laser cutting are all absorbed by the gaps 1109 and hence released.

The beam revolving device 1050 and the revolution radius changing device 1060 are controlled in this embodiment such that the laser beam is moved following concentric paths, but they may be controlled so as to move the laser beam following spiral paths. In this case, the radius of revolution is continuously gradually increased by the revolution radius changing device 1060 while the laser beam is revolved by the beam revolving device 1050. Also, the laser cutting may be performed in a condition where the center of the lead frame under processing is offset from the center of revolution of the laser beam. This offset enables the lead frame to be fabricated in a wide variety of configurations.

Further, the above first embodiment has been described in connection with the case where the angular pitch of the lead frame is constant, i.e., where the angular intervals between the adjacent radial gaps are regular. However, the present invention is not limited to such an arrangement, and the angular pitch, i.e., the angular intervals between the adjacent radial gaps, may be varied so as to provide an equal distance with respect to each of four sides of the lead frame. This can be easily realized by properly increasing and decreasing the repetition period of the resonator.

After cutting the metal plate by the laser beam, it is preferable to cool the metal plate by spraying a cooling gas to it or pressing a cooling metal block against it. As a result of proper cooling, the metal plate after the laser cutting is positively cooled, and an adverse influence such as a thermal deformation can be suppressed.

Second Embodiment

A second embodiment of the present invention will be described below with reference to FIG. 16. In this embodiment, a revolution radius changing device 1065 formed by combination of four reflecting mirrors is provided instead of the revolution radius changing device 1060 in FIG. 1. The other construction is the same as in the first embodiment of FIG. 1. Note that, for simplification, only primary parts are schematically shown in FIG. 16.

Figure 16:
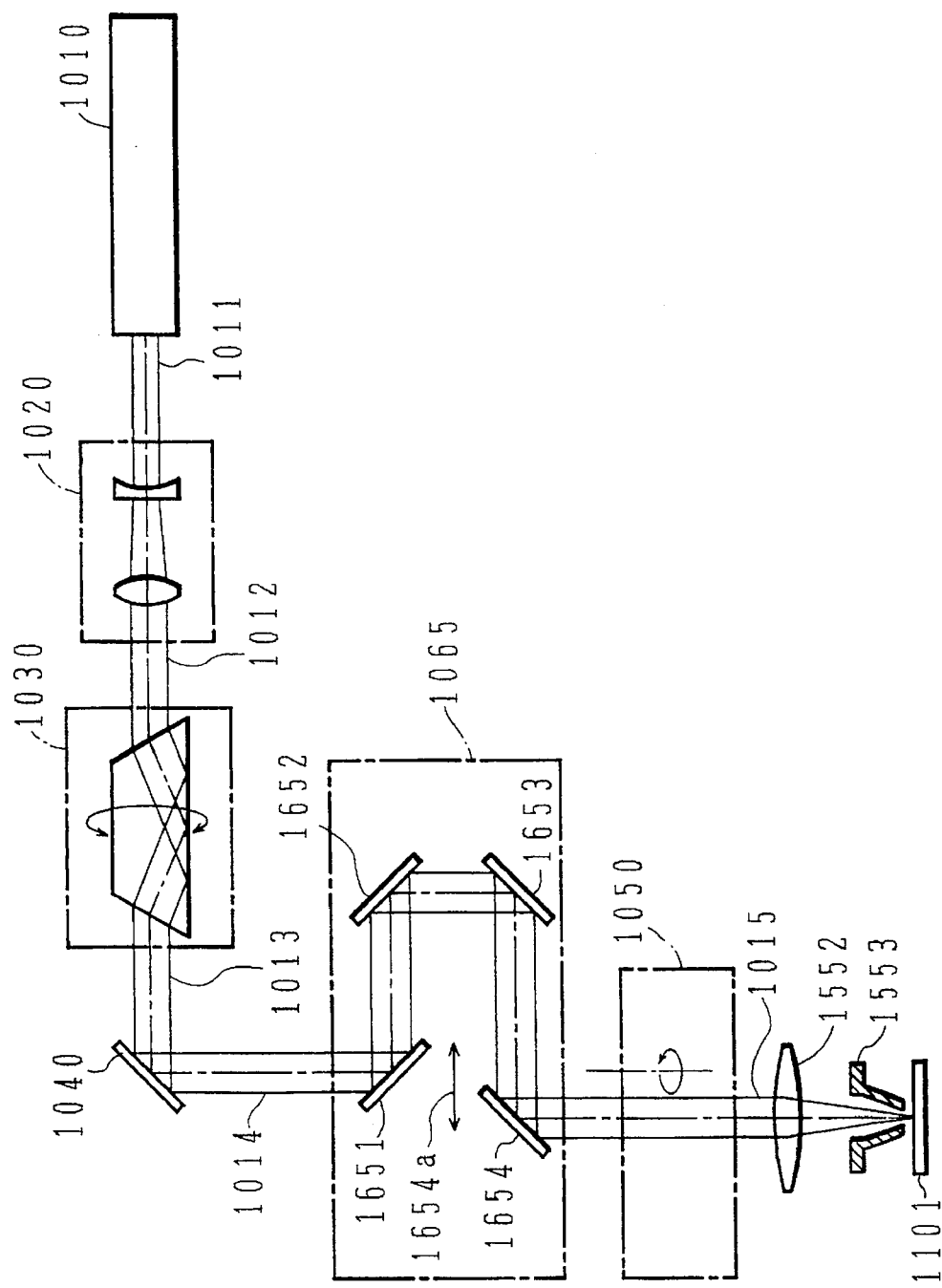
FIG. 16 is a block diagram showing a configuration of a lead frame fabricating apparatus according to a second embodiment of the present invention.

Referring to FIG. 16, the revolution radius changing device 1065 includes four reflecting mirrors 1651 to 1654. Of these mirrors, only the fourth reflecting mirror 1654 is movable in the radius direction of revolution as indicated by an arrow 1654*a* in the drawing. Corresponding to the movement of the reflecting mirror 1654, the condensing lens 1552 and the nozzle 1553 are also moved. The revolution radius changing device 1065 is revolved in its entirety by the beam revolving device 1050 around the center of revolution while keeping positions of the four reflecting mirrors 1651 to 1654 fixed relative to each other. Thus, the radius of revolution is changed upon the movement of the reflecting mirror 1654. Since the distance by which the reflecting mirror 1654 is movable can be increased, the radius of revolution has a larger varying range in this embodiment than in the above case where the radius of revolution is changed by utilizing an inclination of the parallel prism as shown in FIG. 2. As a result, this embodiment can fabricate lead frames of which size is too large for the lead frame fabricating apparatus of FIG. 2.

As described above, in addition to the similar advantages as in the first embodiment, this embodiment also makes it possible to increase the varying range of the radius of revolution, and to fabricate large-sized lead frames.

Third Embodiment

A third embodiment of the present invention will be described below with reference to FIGS. 17 to 20.

Figure 17:
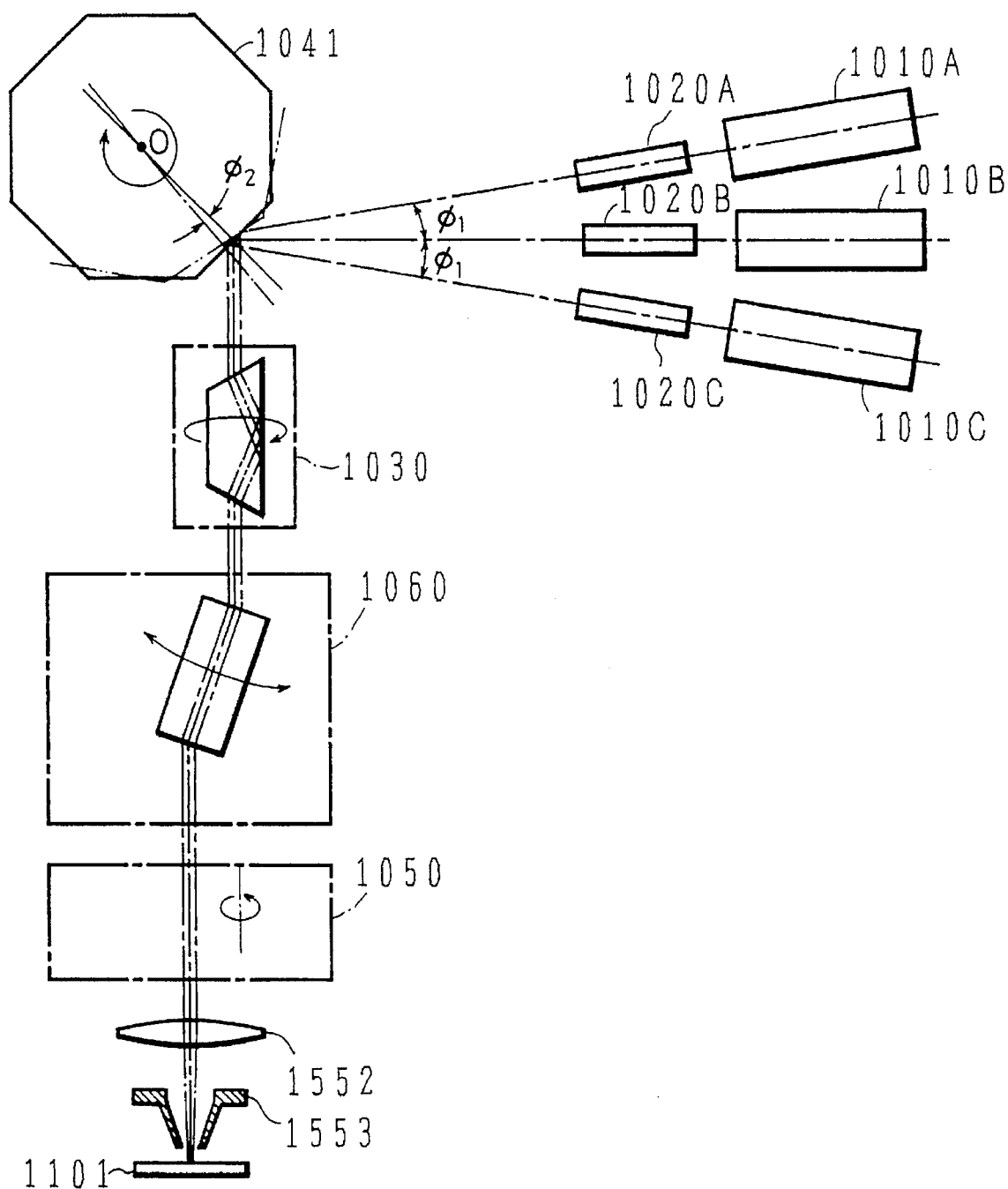
FIG. 17 is a block diagram showing a configuration of a lead frame fabricating apparatus according to a third embodiment of the present invention.

This embodiment includes, as shown in FIG. 17, three resonators 1010A, 1010B, 1010C and three beam section transformers 1020A, 1020B, 1020C for transforming circular sectional shapes of respective laser beams from the resonators into elliptic shapes. It is here assumed that the angle formed between optical axes of the adjacent laser beams from the resonators is $\phi_1$. The bending mirror 1040 in FIG. 1 is omitted, the beam rotating device 1030 is disposed close to the revolution radius changing device 1060 and the beam revolving device 1050, and a polygon mirror 1041 as focus position changing means is disposed between the beam section transformers 1020A, 1020B, 1020C and the beam rotating device 1030. The polygon mirror 1041 is a mirror being in the form of an equilateral polygon and able to totally reflect the laser beam, and is rotated clockwise at a constant angular speed (described later). Though not shown, the three resonators 1010A, 1010B, 1010C are connected respectively to separate laser power supplies which are controlled respectively by separate laser controllers. The other construction is the same as in the embodiments of FIGS. 1 and 2.

In the construction described above, if the laser beams emitted from the resonators 1010A, 1010B, 1010C are simply condensed as they are, the highly coherent laser beams would produce a multiplicity of interference fringes and laser cutting could not be satisfactorily performed. In this embodiment, therefore, the laser beams are emitted from the resonators with a certain delay time therebetween.

Figure 18:
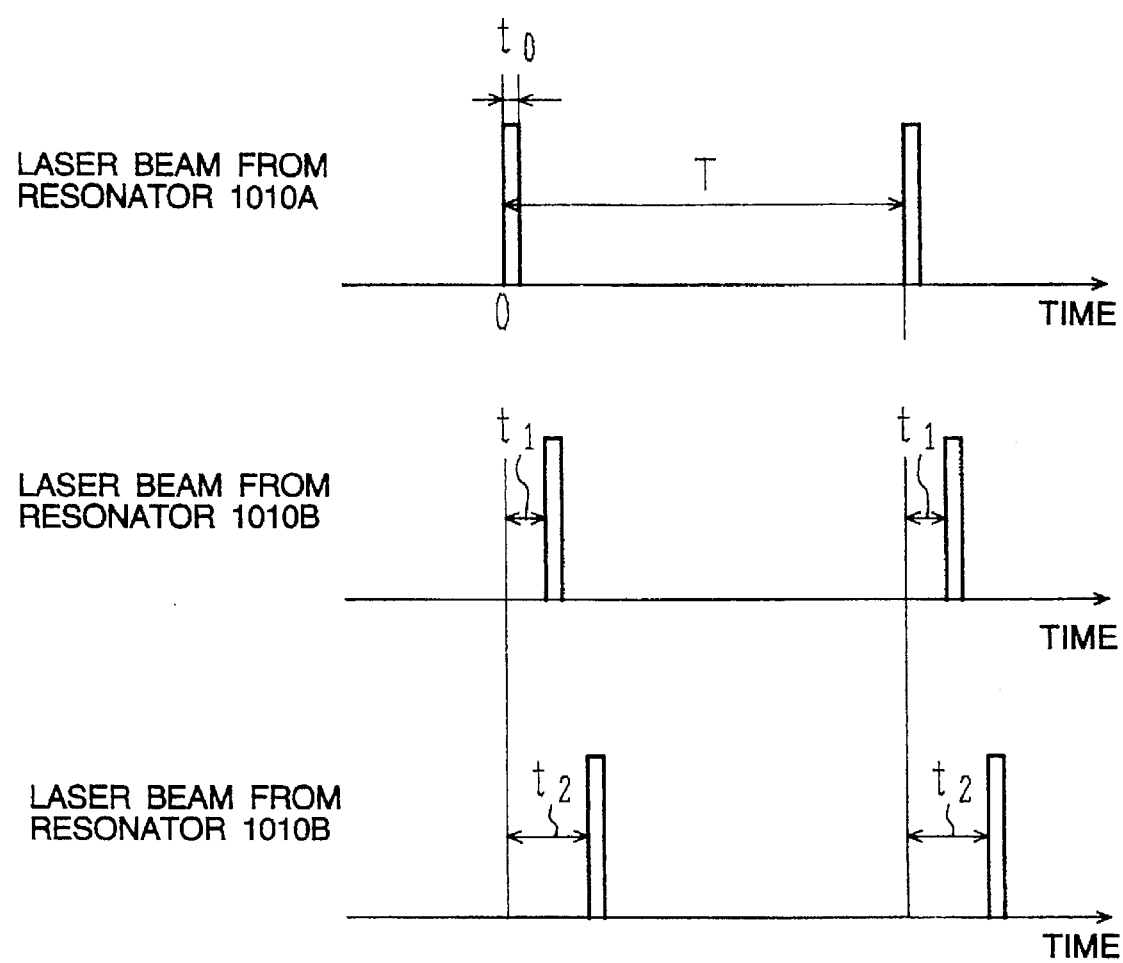
FIG. 18 is a time chart showing laser beams from a resonator 1010A, a resonator 1010B, and a resonator 1010C.

FIG. 18 is a time chart for explaining a manner of setting such a delay time. As shown in FIG. 18, assuming that the pulse width of the laser beam generated from the resonator 1010A, i.e., the time during which the laser beam is emitted, is $t_0$ and the repetition period, i.e., the time interval from emission of one pulse to emission of another, is T, the pulse width $t_0$ is about 0.1 to 1 ms, for example, but the repetition period T is longer than the pulse width (about 0.1 to 1 ms), i.e., about 3 to 10 ms. In view of such fact that the time during which the laser beam is not emitted is relatively long, by generating the laser beams with a delay time therebetween in the repetition period so as to prevent mutual interference, the laser beams can be each used as a single laser beam to perform laser cutting independently.

Specifically, emission of the laser beam from the resonator 1010B is delayed a delay time $t_1$ of about 0.5 ms with respect to the laser beam from the resonator 1010A, and emission of the laser beam from the resonator 1010C is delayed a delay time $t_2$ of about 1.0 ms with respect to the laser beam from the resonator 1010A. Here, $t_2=2t_1$ is supposed.

Assuming now that the angular speed of the polygon mirror 1041 is $\phi_2/t_1$, in the repetition period of one pulse, the angle at which the laser beam enters the polygon mirror 1041 is changed clockwise by $\phi_1$ for each delay time $t_1$ and the polygon mirror 1041 is rotated clockwise by $\phi_2$ for each delay time $t_1$. Then, $\phi_1$ and $\phi_2$ are determined so that the laser beams from the beam section transformers 1020A, 1020B, 1020C enter the beam rotating device 1030 parallel to each other.

Figure 19:
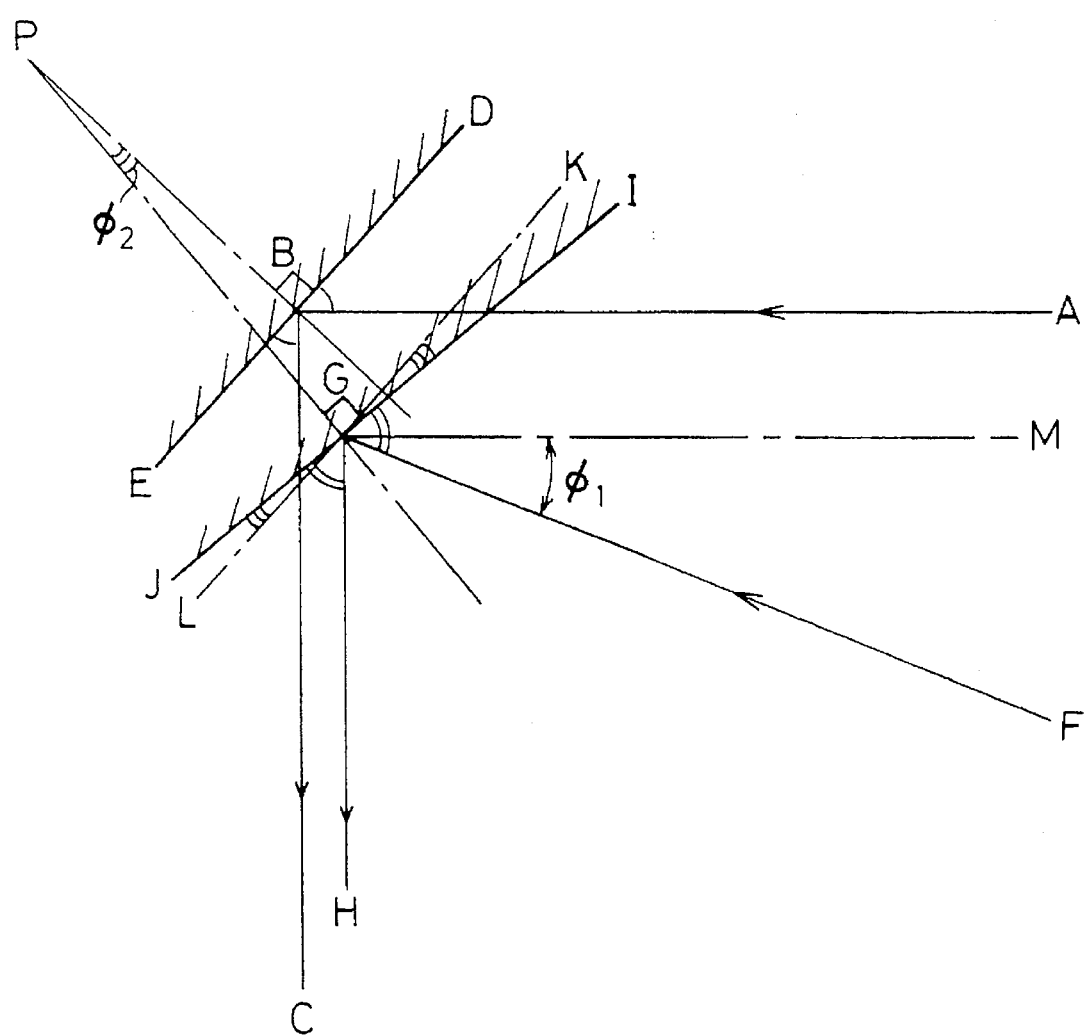
FIG. 19 is a view for explaining a manner of deriving the relationship of $\phi_1$ and $\phi_2$ in the lead frame fabricating apparatus of FIG. 17.

The relationship between $\phi_1$ and $\phi_2$ will be described below with reference to the laser beams from the resonators 1010B, 1010C. In FIG. 19, the optical axis of the laser beam entering the polygon mirror 1041 from the resonator 1010B and reflected by the polygon mirror 1041 is indicated by a straight line AB and a straight line BC. Also, the reflecting surface of the polygon mirror 1041 at this time is indicated by a straight line ED. Incidentally, a point P denotes the center of the polygon mirror 1041. When the delay time $t_1$ is elapsed from that point of time, the polygon mirror 1041 is rotated $\phi_2$. The optical axis of the laser beam entering the polygon mirror 1041 from the resonator 1010C and reflected by the polygon mirror 1041 at this time is indicated by a straight line FG and a straight line GH. Also, the reflecting surface of the polygon mirror 1041 at this time is indicated by a straight line IJ. Further, a straight line KL is one passing a point G and parallel to the straight line ED, and a straight line MG is one parallel to the straight line AB.

As will be seen from FIG. 19, $$\text{angle } PBD = \text{angle } PGI = 90° \tag{1}$$

results in:

$$\text{angle } BPG = \text{angle } KGI = \text{angle } JGL = \phi_2 \tag{2}$$

Also, from the drawing;

$$\text{angle } IGF = \text{angle } KGM - \text{angle } KGI + \text{angle } MGF \tag{3}$$

and this is modified below by utilizing Equation (2):

$$\text{angle } IGF = \text{angle } KGM - \text{angle } JGL + \text{angle } MGF \tag{4}$$

Further, from the reflecting conditions, there holds:

$$\text{angle } EBC = \text{angle } DBA = \text{angle } KGM \tag{5}$$

Putting Equation (5) into Equation (4) results in:

$$\text{angle } IGF = \text{angle } EBC - \text{angle } JGL + \text{angle } MGF \tag{6}$$

On the other hand, from the reflecting conditions, there holds:

$$\text{angle } IGF = \text{angle } JGL = \text{angle } LGH \tag{7}$$

In addition, since the straight line BC and the straight line GH are parallel to each other, there holds:

$$\text{angle } IGF = \text{angle } JGL + \text{angle } EBC \tag{8}$$

Then, from Equations (6) and (8);

$$\text{angle } MGF = 2 \times \text{angle } JGL \tag{9}$$

is resulted. Since the angle MGF is $\phi_1$, there holds:

$$\theta_1 = 2\phi_2 \tag{10}$$

It is thus seen that the desired relationship is achieved by setting $\phi_1$ to be twice $\phi_2$.

By so setting, the laser beams from the beam section transformers 1020A, 1020B, 1020C enter the beam rotating device 1030 parallel to each other. But those laser beams have their optical axes apart away a predetermined distance from each other and, therefore, the laser beams having passed the beam rotating device 1030, the revolution radius changing device 1060 and the beam revolving device 1050 are condensed by the condensing lens 1552 to different positions on the metal plate 1101. The condensed positions of the laser beams are determined by adjusting the respective positions of the resonators, i.e., the angle $\phi_1$ formed between the optical axes of the adjacent laser beams. Also, by fixedly setting ratios of the rotating speed of the polygon mirror 1041 to the rotating speeds of the beam rotating device 1030, the beam revolving device 1050 and the revolution radius changing device 1060, the condensed positions of the laser beams focusing onto the metal plate 1101 and the direction of each irradiation spot 1017 (see FIG. 20) can be uniquely determined.

Figure 20:
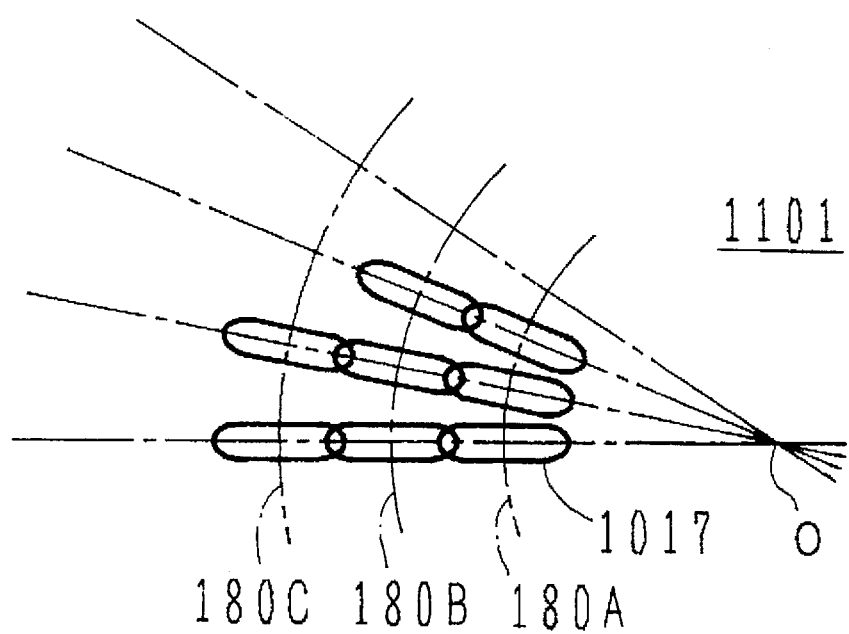
FIG. 20 is a view showing one example of a laser beam condensed position and area irradiated by the laser beam spot on a metal plate when the lead frame fabricating apparatus of FIG. 17 is employed.

In this embodiment, the angle $\phi_1$ is determined so as to provide the condensed positions of the laser beams and the direction of the irradiation spot 1017 thereof as shown in FIG. 20. More specifically, as shown in FIG. 20, the laser beams from the beam section transformers 1020A, 1020B, 1020C are condensed onto respective paths 180A, 180B, 180C which are concentric around the center O of revolution. The spacing between adjacent twos of the paths 180A, 180B, 180C is set such that inner and outer irradiation areas covered by the respective spots 1017 are somewhat overlapped with each other in the lengthwise direction. In other words, the laser beams from the resonators 1010A, 1010B, 1010C are successively condensed to lie in the same straight line on the metal plate 1101 to thereby cut it. Then, after revolving the devices 1030, 1050, 1060 by a predetermined angle around the center O of revolution, the laser beams from the resonators 1010A, 1010B, 1010C are successively condensed again to lie in the same straight line on the metal plate 1101 to thereby cut it. The laser cutting is progressed by repeating the above operation. This means the same effect as that the laser beam is elongated several times in the lengthwise direction and, therefore, the cutting speed is increased in proportion to the number of resonators.

During elapse of the delay time $t_1$, however, the beam rotating device 1030 and the beam revolving device 1050 are continuously rotated. If the resonators 1010A, 1010B, 1010C are disposed on the same plane and the laser beam sections are elongated in the same direction by the beam section transformers 1020A, 1020B, 1020C, the condensed positions and the irradiation areas of the laser beams would be offset from each other rather than lying linearly as shown in FIG. 20 because of rotation and revolution of the devices 1030, 1050 during elapse of the delay time $t_1$. To avoid such an offset, the resonators 1010A, 1010B, 1010C are inclined in a plane vertical to the drawing sheet of FIG. 17 differently from each other, and the beam section transformers 1020A, 1020B, 1020C are inclined at different angles about their optical axes. Through fine adjustment of the inclination angles of the resonators 1010A, 1010B, 1010C and the inclination angles of the beam section transformers 1020A, 1020B, 1020C, the laser beams can be centered with the correct condensed positions and irradiation areas as shown in FIG. 20.

With this embodiment as described above, since the laser beams are emitted from the plurality of resonators 1010A, 1010B, 1010C at the timings shifted a predetermined delay time from each other, it is possible to prevent interference between the laser beams. Further, since the laser beams are reflected by the polygon mirror 1041 so as to enter the beam rotating device 1030 parallel to each other while the relative inclination angles of the resonators 1010A, 1010B, 1010C and the inclination angles of the beam section transformers 1020A, 1020B, 1020C about their optical axes are finely adjusted, the laser beams are successively condensed to lie in the same straight line on the metal plate 1101 to thereby cut it. This means the same effect as that the laser beam is elongated several times in the lengthwise direction, and hence the cutting speed is increased in proportion to the number of laser generators.

While the resonators and the beam section transformers are each provided in groups of three in the above-described embodiment, the present invention is not limited to such an arrangement, and they may be each provided in groups of two or three or more. Also, while the above embodiment uses the polygon mirror as focus position changing means, any of other suitable reflecting optical systems, such as combination of prisms, combination of galvano-mirrors, and combination of a reflecting mirror and a rotating device, may be employed.

Fourth Embodiment

A fourth embodiment of the present invention will be described below with reference to FIGS. 21 to 22.

The inner leads 1103, in particular, of the lead frame have a very narrow pitch that is often less than the plate thickness. This gives rise to a fear that if laser cutting is continued on adjacent portions under a condition where the heat input upon irradiation of the pulse-like laser beam still remains there, the material of the metal plate may be ruptured by melting due to the excessive input heat after the laser cutting. This embodiment is intended to overcome such a drawback.

Figure 21:
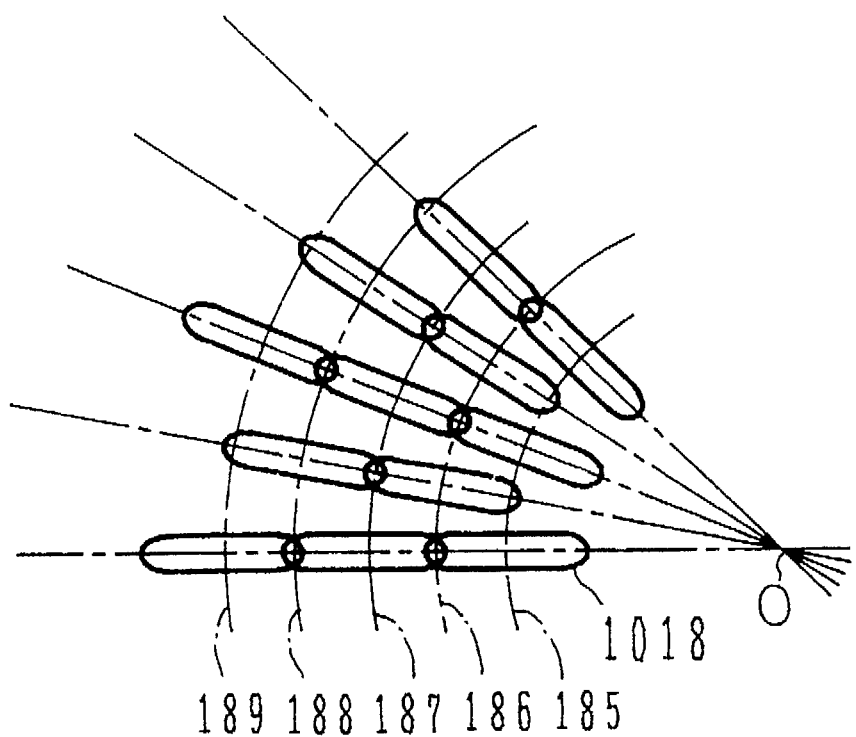
FIG. 21 is a conceptual view for explaining a procedure of forming inner leads according to a fourth embodiment of the present invention.

FIG. 21 is a conceptual view for explaining a procedure of forming the inner leads 1103 according to this embodiment, and corresponds to FIGS. 8 to 12. As shown in FIG. 21, the laser beam is irradiated from an innermost circular path 185 to outer circular paths 186, 187, 188, 189 successively along each of the paths. When irradiating the laser beam along each of the paths 185 to 189, the gaps separating the inner leads 1103 from each other are alternately formed and irradiation areas covered by irradiation spots 1018 are shifted from each other in the lengthwise direction between the gaps on both sides of each inner lead 1103. By then repeating the above-described irradiation, the inner leads 1103 are completely formed. As another method, the gaps separating the inner leads 1103 from each other may be formed every two or more radial lines rather than being alternately formed. The heat input upon irradiation of the laser beam along one path, e.g., the path 185, abates by thermal conduction to other material portions of the metal plate 1101 and thermal dissipation into air, before irradiating the laser beam along the next path 186.

Figure 22:
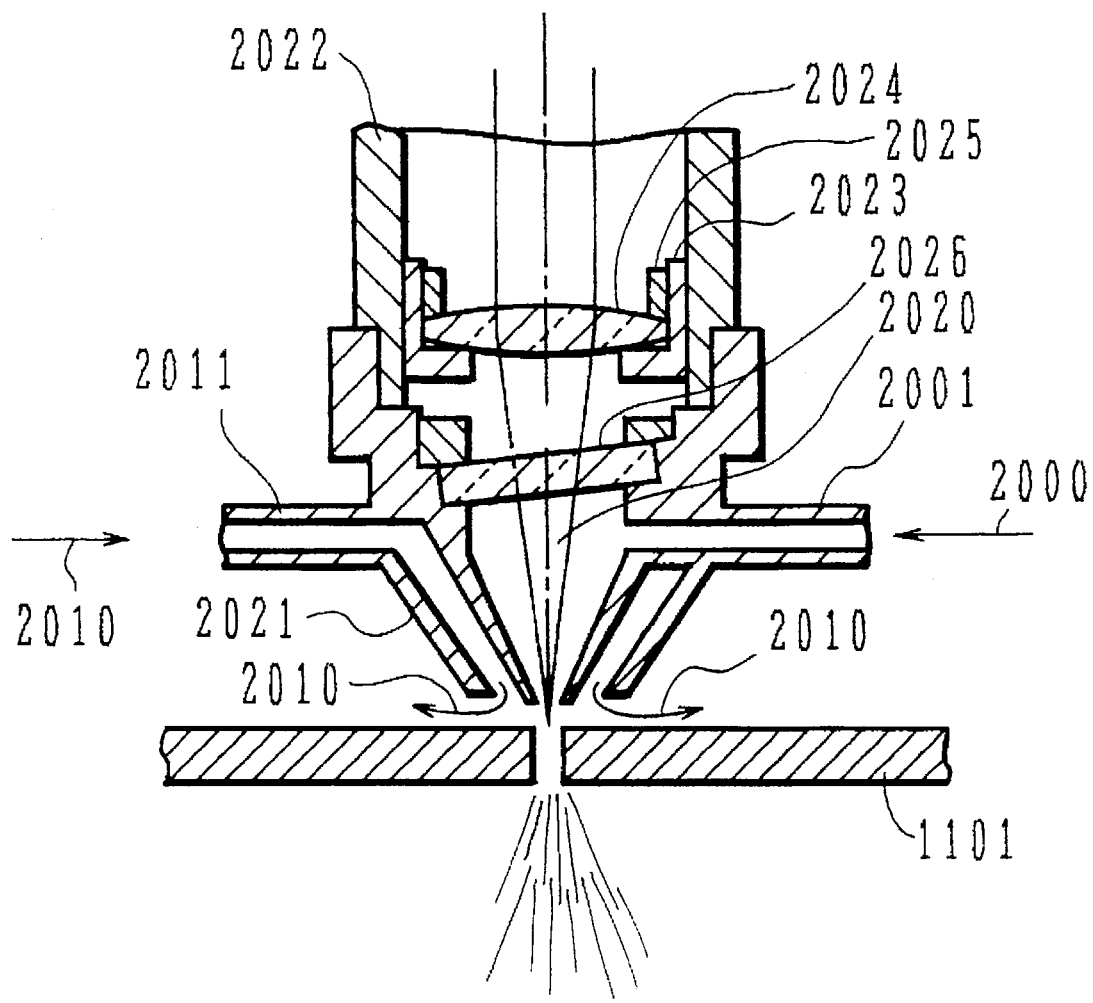
FIG. 22 is a view showing a construction for ejecting an assist gas from the nozzle center and, at the same time, a coolant in coaxial relation to the laser beam.

In addition, to remove the heat from the material of the metal plate 1101, an assist gas 2000 is ejected from the center of a nozzle 2021 coaxially with a laser beam 2020 and, at the same time, a coolant 2010 such as cooling water is supplied to flow in surrounding relation to the assist gas 2000, as shown in FIG. 22. Furthermore, in FIG. 22, a fixed outer tube 2022 and a fixed inner tube 2023 are attached to an upper portion of the nozzle 2021, and a condensing lens 2024 is mounted in the fixed inner tube 2023. A lens retainer 2025 serves to secure the condensing lens 2024 in place. Also, a protective glass 2026 for protecting various members of an optical system, including the condensing lens 2024, is mounted in the nozzle 2021.

The assist gas 2000 is supplied through an assist gas supply port 2001, and the coolant 2010 is supplied through a coolant supply port 2011. The coolant supply port 2011 has a ring-shaped opening formed along an outer circumference of the nozzle 2021, and the coolant 2010 is ejected through the ring-shaped opening in surrounding relation to the assist gas 2000. Of the coolant 2010 used for cooling the material of the metal plate 1101, one part remaining on the front surface of the metal plate 1101 flows away along the plate surface, and the other part reaching the rear surface of the metal plate 1101 is removed by being blown away from there by the assist gas 2000.

As described above, in addition to the similar advantages as in the first embodiment, this embodiment can also provide an advantage that since the gaps separating the radially extending inner leads 1103 from each other are formed at least alternately, the heat input upon irradiation of the laser beam will not be concentrated in the material of the metal plate 1101 to prevent the material of the metal plate 1101 from being ruptured by melting due to the excessive input heat. Also, since the irradiation areas covered by the irradiation spots 1018 are shifted from each other in the lengthwise direction between the gaps on both sides of each inner lead 1103, the heat is apt to more easily abate by thermal conduction to other material portions of the metal plate 1101 and thermal dissipation into air.

Further, since the coolant 2010 is supplied to flow in surrounding relation to the assist gas 2000, most of the heat input to the material of the metal plate 1101 during the laser cutting can be quickly removed immediately after the laser cutting so as to forcibly lower the plate temperature.

Fifth Embodiment

A fifth embodiment of the present invention will be described below with reference to FIGS. 23 and 24. FIGS. 23B to 23D are sectional views taken respectively along lines B—B, C—C and D—D in FIG. 23A.

A lead frame having multiple pins and a narrow pitch, particularly inner leads thereof, which is to be fabricated by the present invention, demands that a thin metal plate is finely and highly accurately processed. To this end, it is required to surely and positively fix and restrain a metal plate material during the process. However, if the inner leads are laser-cut into their final elongate shapes in successive steps, the workpiece would be difficult to maintain in the correct form and would be more liable to deform due to lack of rigidity midway the cutting process, resulting in reduced dimensional accuracy. This embodiment is intended to overcome such a drawback.

Figure 23A:
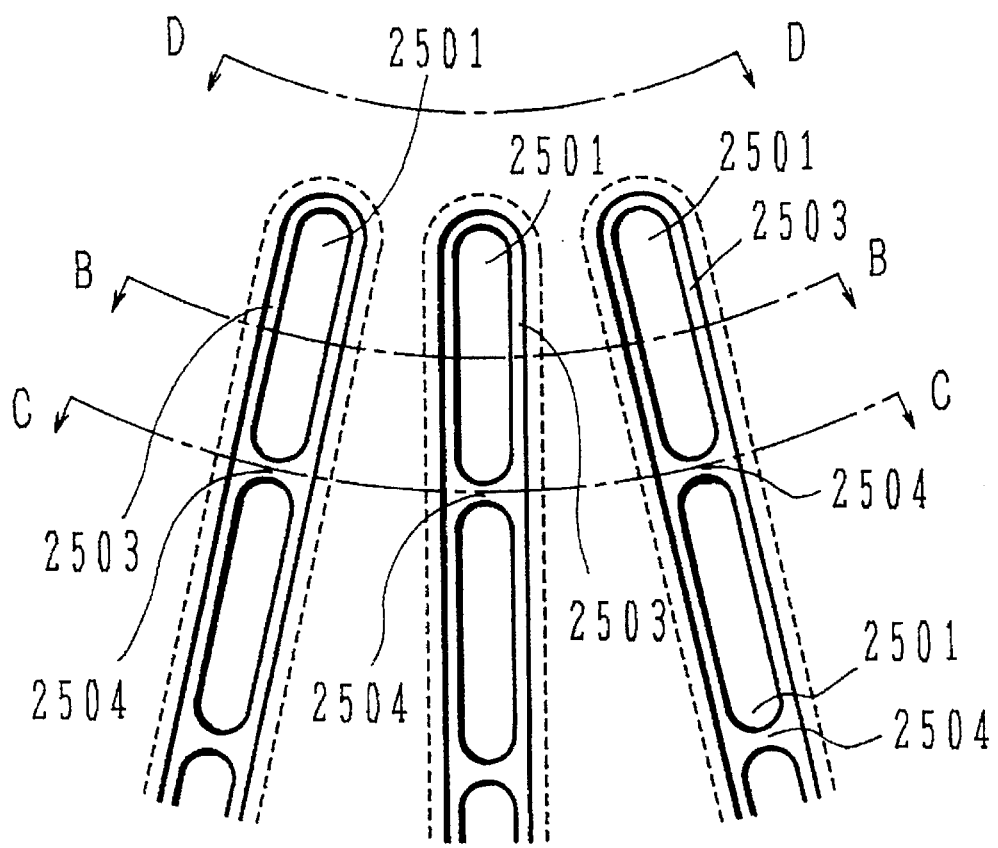
FIG. 23A is a view for explaining a lead frame fabricating method according to a fifth embodiment of the present invention.
Figure 23B:
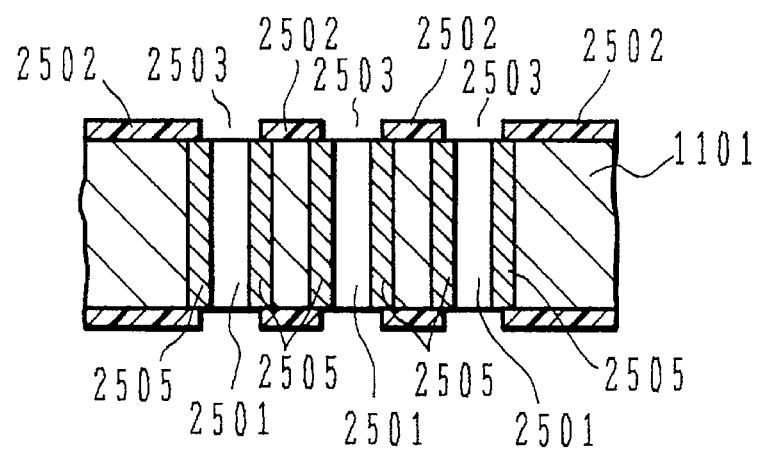
FIGS. 23B, 23C and 23D are respectively sectional views taken along lines B—B, C—C and D—D in FIG. 23A.
Figure 23C:
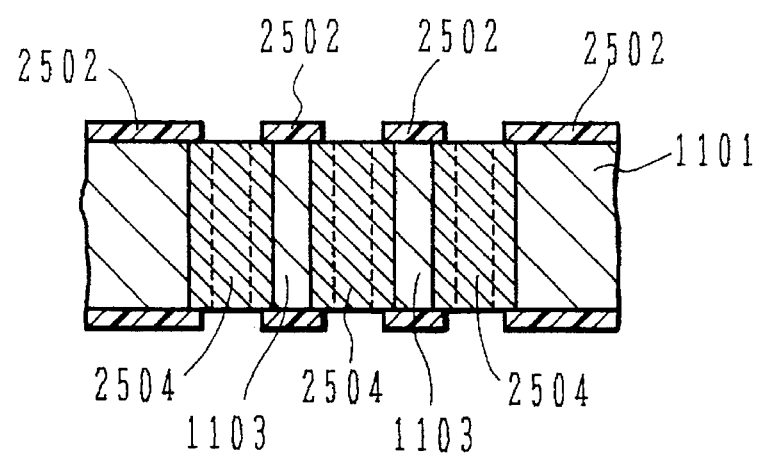
Figure 23D:
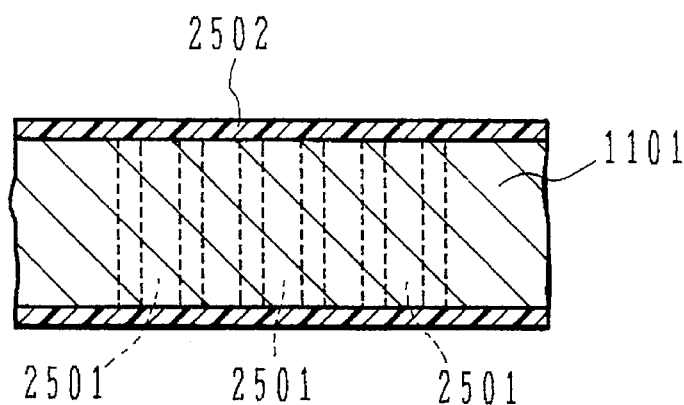

In the laser cutting process of this embodiment, the inner leads 1103 are not laser-cut into their final elongate shapes successively, but a multiplicity of through holes 2501 are discontinuously formed in line along each gap separating the inner leads 1103 from each other as shown in FIG. 23A. Also, prior to the laser cutting, resist films 2502 (see FIGS. 23B to 23D) are coated over both sides of the metal plate 1101 by applying and drying a resist resin as indicated at steps S201 and S202 of FIG. 24.

As seen from FIG. 23A, an opening 2503 formed by one shot of beam of laser cutting in the resist film 2502 has a little larger size than the through hole 2501 cut by the same shot in the metal plate 1101. Therefore, at the time when the through holes 2501 are formed in a line, the openings 2503 are almost straightly joined with each other as shown.

In this embodiment, the laser cutting is not required to form a workpiece into the final desired configuration, but fulfills its role sufficiently if the workpiece is laser-cut into the discontinuous broken-line form as shown in FIG. 23A. As compared with the prior art in which the inner leads are formed by using a laser beam only, therefore, the amount to be cut by the laser beam can be reduced. It is thus possible to make very small the area suffering an influence of the input heat and to reduce resultant thermal deformations.

Also, the method of forming the inner leads into the final desired configuration by using a laser beam only is disadvantageous in that a thermal deformation caused by irradiation of the laser beam may affect a next laser cutting step such that thermal deformations are accumulatively increased to eventually cause a substantial dimensional error. In contrast, such a disadvantage can be eliminated in the present invention.

Furthermore, since the multiplicity of through holes 2501 are discontinuously present in line during the process, the presence of uncut portions 2504 between the adjacent through holes 2501 keeps the metal plate 1101 in a relatively rigid state, allowing the metal plate 1101 to be easily handled. This condition is also effective to prevent deformations and manufacturing errors that occurred during the process. Thus, since the metal plate 1101 has a relatively high degree of rigidity and can be easily handled, for example, the process of mechanically removing drosses and spatters produced incidental to the laser cutting, or the post-process after the laser cutting, such as cleaning of the metal plate 1101, is simplified.

Figure 24:
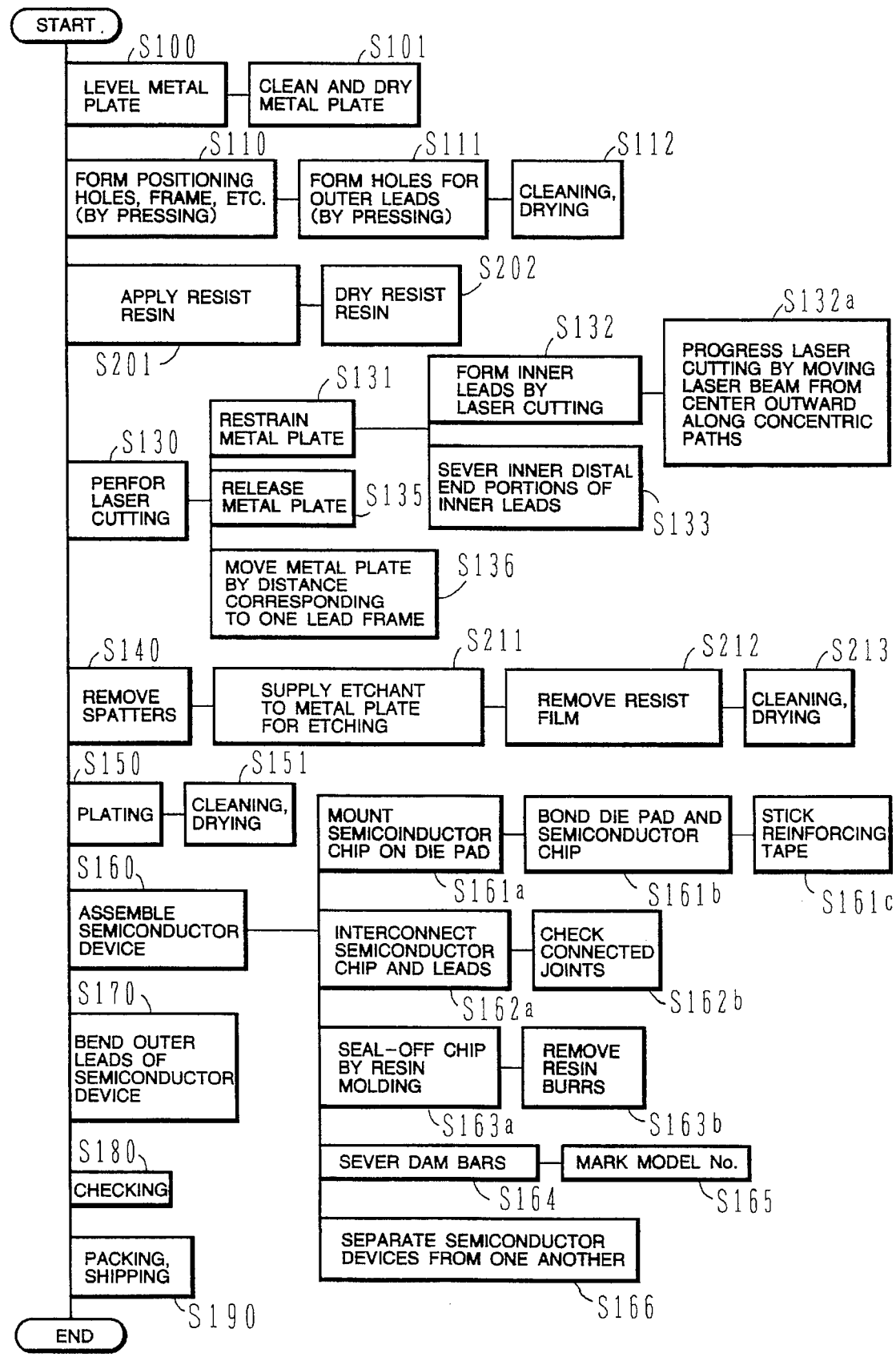
FIG. 24 is a flowchart showing one exemplified method of manufacturing a semiconductor device which employs the lead frame fabricated according to the fifth embodiment of the present invention.

After performing the laser cutting and removing the spatters, etching is carried out as indicated at step S211 of FIG. 24. The portions which are removed by this etching step are denoted by hatched areas in FIGS. 23B and 23C. When an etchant is supplied to the metal plate 1101, the interior of each through hole 2501 is also sufficiently supplied with the etchant, and side walls 2505, shown in FIG. 23B, defining the through hole 2501 are etched substantially evenly in the direction of plate thickness. As a result, the metal plate 1101 is etched such that even portions covered with the resist films 2502 are etched to some extent and portions a little larger than the openings 2508 are removed. Further, since the etching is an isotropic process, the uncut portions 2504 shown in FIG. 23C are also etched. In other words, the through holes 2501 are enlarged.

As a consequence, the uncut portions 2504 are removed and the through holes 2501 in each line are interconnected to finally define the gaps in a predetermined configuration, thereby forming the inner leads 1103. At this time, the drosses deposited to the rear surface of the metal plate and oxide coatings formed thereon are also removed by the etchant so that the inner leads 1103 have their smooth and clear cut surfaces being rectangular in section. Further, as shown in FIG. 23D, the portions of the metal plate which are sufficiently far from the through holes 2501 and the openings 2503 in the resist films 2502 are not affected by the etching. Additionally, since the chemical processing such as etching is usually carried out under temperature condition of room temperature or not higher than 100° C., the configuration after the laser cutting is rarely impaired.

After completion of the etching, the resist films 2502 are removed as indicated at step S212 of FIG. 24, followed by cleaning and drying as indicated at step S213. Since the etching is a non-thermal process, the metal plate 1101 can realize a satisfactory smooth finished configuration and a high degree of dimensional accuracy. Note that FIG. 24 referred to in the above description is a flowchart showing one example of a method of manufacturing a semiconductor device, and steps in FIG. 24 other than steps S201, S202, S211, S212 and S213 are the same as in FIG. 15.

With this embodiment described above, since the through holes 2501 are formed by the laser cutting discontinuously in line, e.g., in the broken-line form, the amount to be cut by the laser beam can be reduced and the area suffering an influence of the input heat can be made very small so as to reduce resultant thermal deformations, in comparison with the case where the inner leads are formed into the final desired configuration by using the laser beam only. Also, thermal deformations will not be accumulatively increased to eventually cause a substantial dimensional error. Further, since the multiplicity of through holes 2501 are discontinuously present in line during the process, the presence of the uncut portions 2504 between the adjacent through holes 2501 keeps the metal plate 1101 in a relatively rigid state, allowing the metal plate to be easily handled. This is also effective to prevent deformations and manufacturing errors occurred during the process.

Since the uncut portions 2504 are finally removed by etching as a non-thermal process, an influence of the heat is not produced and the drosses, the oxide coatings, etc. are removed, whereby the finally remained portions have a satisfactory finished configuration and higher dimensional accuracy. In other words, laser cutting and etching are combined with each other to positively utilize features of both the processing methods, making it possible to improve the dimensional accuracy. Furthermore, no post-process which may impair the dimensional accuracy after the processing is required and hence a condition of good dimensional accuracy can be maintained.

Sixth Embodiment

A sixth embodiment of the present invention will be described below with reference to FIGS. 25 to 31.

Figure 25:
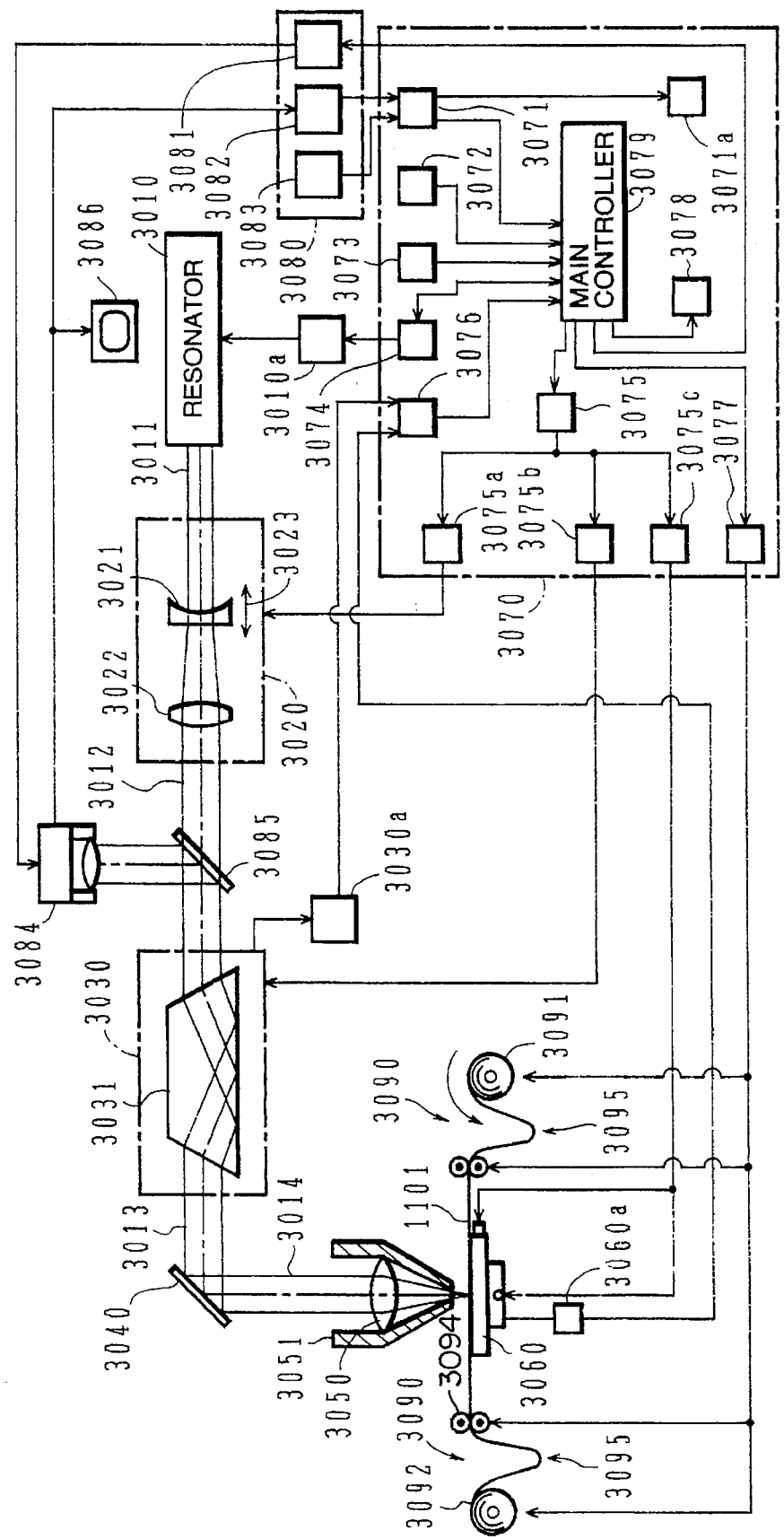
FIG. 25 is a block diagram showing a configuration of a lead frame fabricating apparatus according to a sixth embodiment of the present invention.

A description will be first made of a general configuration of a lead frame fabricating apparatus of this embodiment. As shown in FIG. 25, the lead frame fabricating apparatus of this embodiment comprises a resonator 3010 for emitting a pulse-like laser beam 3011 being substantially circular in section, a beam section transformer 3020 which includes a concave cylindrical lens 3021 and a convex cylindrical lens 3022 for elongating a sectional shape of the laser beam 3011, emitted from the resonator 3010, in one direction for transformation into an elliptic sectional shape, a beam rotating device 3030 which includes a Dove prism 3031 for rotating a laser beam 3012 from the beam section transformer 3020 on its optical axis, a bending mirror 3040 for changing the direction of a laser beam 3013 from the beam rotating device 3030, a condensing lens 3050 mounted in a nozzle 3051 for condensing a laser beam 3014 from the bending mirror 3040 onto a metal plate 1101, an XY-table 3060 for moving, on the metal plate 1101, an irradiated position of the laser beam 3014 condensed by the condensing lens 3050, a control device 3070 for performing control of the entire apparatus, a cut portion monitoring device 3080 for monitoring a cut portion, and a feeder 3090 for feeding a metal plate to be cut. The resonator 3010 and the beam section transformer 3020 cooperatively make up laser beam generating means.

A laser power supply 3010a is connected to the resonator 3010, a rotation angle sensor 3030a is connected to the beam rotating device 3030, and an irradiated position sensor 3060a for detecting the irradiated position of the laser beam 3014 is connected to the XY-table 3060, respectively. The cut portion monitoring device 3080 includes a camera controller 3081, an image recording unit 3082, and a storage unit 3083, the camera controller 3081 being connected to a CCD camera 3084 for picking up an image of the cut portion.

The control device 3070 includes an image determining unit 3071 for determining an image from the cut portion monitoring device 3080, an alarm issuing unit 3071a for issuing an alarm when any abnormality is found based on the determination in the unit 3071, an input unit 3072 for entering cutting conditions from the outside therethrough, a storage unit 3073 for storing the cutting conditions beforehand which can be read out therefrom as needed, a laser controller 3074 for controlling the laser power supply 3010a, a beam controller 3075 for controlling the shape and movement of the laser beam, a calculator 3076 for calculating the direction of the laser beam and the position of movement thereof based on signals from the rotation angle sensor 3030a and the irradiated position sensor 3060a, a feeder controller 3077 for controlling the feeder 3090, a recording unit 3078 for recording results of laser cutting, and a main controller 3079 for supervising control of the above components. In the control device 3070, a beam section transformer controller 3075a, a beam rotating device controller 3075b, and an XY-table controller 3075c are connected to the beam controller 3075 for respectively controlling the beam section transformer 3020, the beam rotating device 3030, and the XY-table device 3060.

The metal plate 1101 is fixedly mounted onto the XY-table 3060 through vacuum suction and, under this condition, the XY-table 3060 is translated to move the metal plate 1101 in the X- and Y-axis directions. Correspondingly, the irradiated position of the laser beam 3014 condensed by the condensing lens 3050 is moved on the metal plate 1101 in the X- and Y-axis directions. Here, X- and Y-axes are set so as to cross each other orthogonally, and the X-axis is set so as to agree with the direction of feed of the strip-like metal plate 1101. Further, the feeder 3090 comprises a reel-out device 3091 for reeling out the strip-like metal plate 1101 rolled into the form of a coil, a reel-up device 3092 for reeling up the strip-like metal plate 1101 which has been subject to laser cutting, and drive rolls 3093, 3094 disposed on opposite sides of the XY-table 3060 parallel to the Y-axis.

When the XY-table 3060 is moved in the X-axis direction, the drive rolls 3093, 3094 are rotated in unison with the movement of the XY-table 3060 to advance or back the metal plate 1101 by the same length as the distance by which the XY-table 3060 is moved in the X-axis direction. Also, when the XY-table 3060 is moved in the Y-axis direction, the drive rolls 3093, 3094 are moved in the direction of axis of their rotation, i.e., in the Y-axis direction, while keeping the metal plate 1101 fixedly held, in unison with the movement of the XY-table 3060 by the same length as the distance by which the XY-table 3060 is moved in the Y-axis direction. Further, the metal plate 1101 has loops 3095 between the reel-out device 3091 and the drive roll 3093 and between the reel-up device 3092 and the drive roll 3094, the loops 3095 serving to absorb a slack or a torsion of the metal plate 1101 produced when the drive rolls 3093, 3094 are rotated or moved in unison with the movement of the XY-table 3060 as explained above.

The basic operation of the lead frame fabricating apparatus constructed as above will now be described. When the type of lead frame to be fabricated is entered through the input unit 3072, the main controller 3079 reads the cutting information from the storage unit 3073 and performs control of the associated parts. The cutting information read out of the storage unit 3073 includes the thickness, the cut shape and the cut path of a metal plate corresponding to the type of lead frame; the rotating speed of the laser beam; laser beam generating conditions such as the repetition rate and excitation voltage of the resonator 3010 and selection of the optical system; whether or not to irradiate the laser beam and the number of times of irradiations, etc.

When the laser power supply 3010a is energized by the laser controller 3074 under control of the main controller 3079, the resonator 3010 starts generation. The laser beam 3011 emitted from the resonator 3010 horizontally and being substantially circular in section enters the beam section transformer 3020 where the beam section is elongated in one direction to become elliptic. At this time, the position of the concave cylindrical lens 3021 in the beam section transformer 3020 is controlled by the beam section transformer controller 3075a. The laser beam 3012 emerging from the beam section transformer 3020 enters the Dove prism 3031 of the beam rotating device 3030, whereby it is rotated on its optical axis as with the above first embodiment. The rotating operation (rotating speed and rotation angle) of the Dove prism 3031 is controlled by the beam rotating device controller 3075b.

The laser beam 3013 emerging from the beam rotating device 3030 is reflected by the bending mirror 3040 to advance in the vertical direction. The laser beam 3014 reflected by the bending mirror 3040 is condensed by the condensing lens 3050 and is irradiated to the metal plate 1101 from a tip end of the nozzle 3051. At the same time, an assist gas is ejected through an assist gas supply port (not shown) which is open below the nozzle 3051. The irradiated position of the laser beam 3014 on the metal plate 1101 is moved by the XY-table 3060 as mentioned above. The operation of moving the XY-table 3060 in the X- and Y-axis directions at this time is controlled by the XY-table controller 3075c.

The beam section transformer controller 3075a, the beam rotating device controller 3075b, and the XY-table controller 3075c are controlled by the beam controller 3075 at command from the main controller 3079. Further, feeding of the metal plate 1101 by the reel-out device 3091, the reel-up device 3092 and the drive rolls 3093, 3094 is controlled by the feeder controller 3077 at command from the main controller 3079, whereas the operation of the drive rolls 3093, 3094 in unison with the XY-table 3060 is controlled by the feeder controller 3077 based on control information at the XY-table controller 3075c.

The rotation angle sensor 3030a detects the angle by which the laser beam is rotated on its optical axis by the beam rotating device 3030, and the irradiated position sensor 3060a detects the irradiated position (X- and Y-coordinate values) of the laser beam 3014 determined by the XY-table 3060. Then, respective values detected by those sensors are transmitted to the calculator 3076 in the control device 3070 where the direction and irradiated position of the laser beam are calculated and fed back to the main controller 3079. The main controller 3079 transmits commands to the beam controller 3075 based on the calculation results by the calculator 3076, and changes the cutting conditions as needed.

At the timing when the laser beam is not emitted, image information (visible light) of the laser-cut portion is picked up by the CCD camera 3084 through a reflecting mirror 3085 which is inserted between the beam section transformer 3020 and the beam rotating device 3030. The picked-up information is displayed on a monitor 3086 and is recorded in the image recording unit 3082 of the cut portion monitoring device 3080. By using the reflecting mirror 3085 which is, for example, permeable to a beam emitted from a YAG laser (infrared ray with wavelength of 1064 Nm), but reflects a visible light (wavelength of 380 to 770 Nm), an image of only the visible light can be picked up by the CCD camera. The CCD camera 3084 is controlled by the camera controller 3081.

The image information recorded in the image recording unit 3082 is input to the image determining unit 3071 of the control device 3070, and is compared with the image information of the satisfactory laser-cut portion, that is stored in the storage unit 3083 beforehand, for determining whether the result of laser cutting is good or not. If the result of laser cutting is not good, the main controller 3079 changes the cutting conditions, as needed, in accordance with the evaluation result and the alarm issuing unit 3071a issues an alarm to inform an operator of the fact that the result of laser cutting is not good, thereby prompting the operator to take a proper action. Further, the type of lead frame, the result of laser cutting, the cutting conditions, etc. at this time are recorded in the recording unit 3078 to be utilized later as information for working out a measure to meet the situation.

The lead frame fabricating method of this embodiment will be described below with reference to FIGS. 26 to 30.

Figure 26:
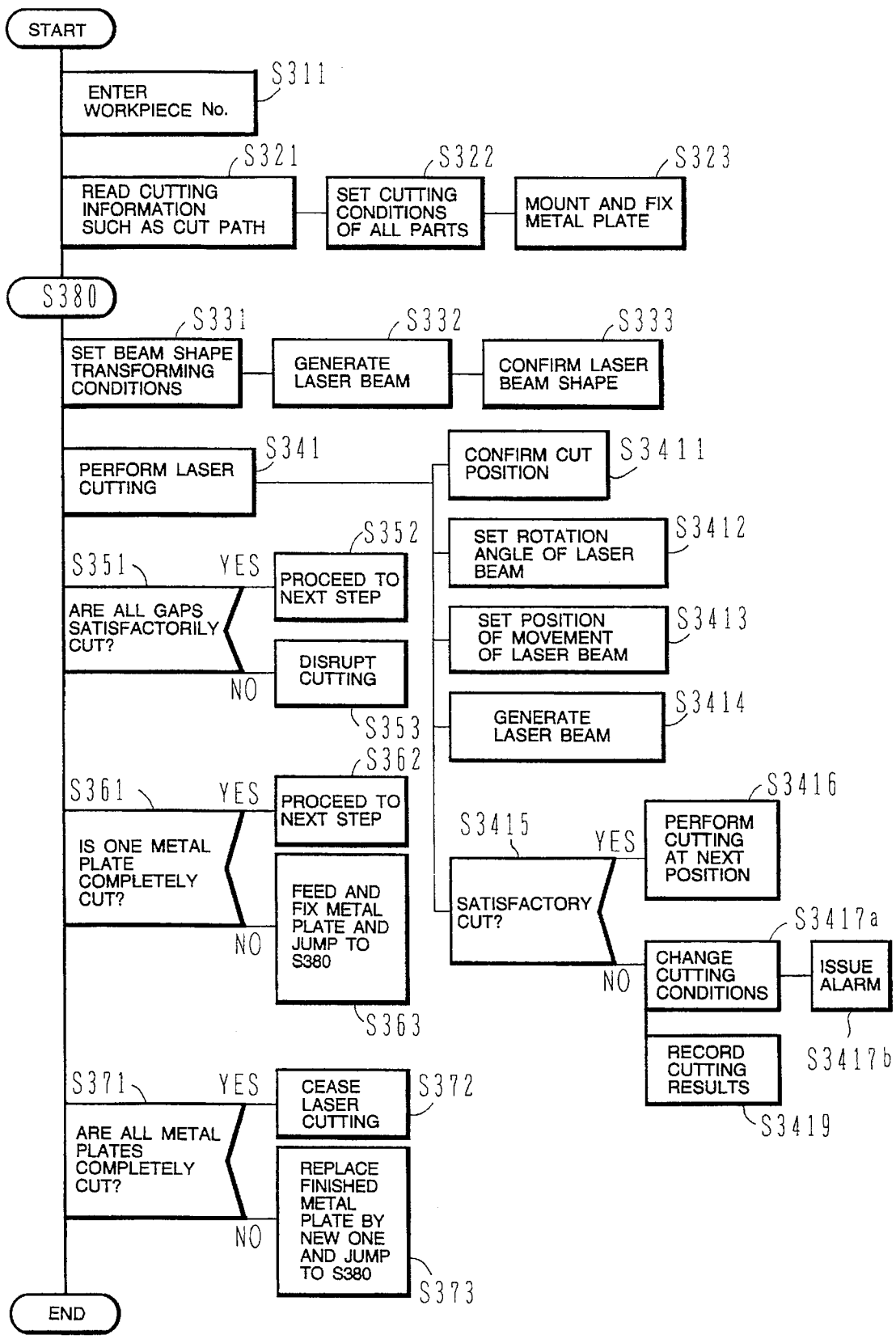
FIG. 26 is a flowchart for explaining steps of laser cutting in the lead frame fabricating apparatus of FIG. 25.

FIG. 26 is a flowchart for explaining steps of laser cutting performed by using the lead frame fabricating apparatus of FIG. 25. A group of control commands for executing the flowchart is stored in the main controller 3079. First, in step S311 of FIG. 26, the type of lead frame to be fabricated is entered through the input unit 3072. On this occasion, the workpiece number which is set for each type of lead frame beforehand may be entered. Then, in step S321, the aforesaid cutting information such as the cut path and the laser beam generating conditions are read out of the storage unit 3073. Based on the read-out cutting information, cutting conditions for all parts of the control device 3070 are set in step S322. The metal plate 1101 as a material is mounted and fixed to the feeder 3090 in step S323. A long strip metal rolled into the form of a coil is used as the metal plate 1101 and loaded on the feeder 3090.

Next, in step S331, a sectional shape (elliptic) of the laser beam is set by the beam section transformer 3020 beforehand. Note that the sectional shape will not be generally changed during the cutting process. Under this condition, the laser beam is generated in step S332 to perform trial cutting, and a shape of the laser beam is confirmed by using the CCD camera 3084, the monitor 3086, etc. The process up to step S333 represents the operation for preparing laser cutting.

Next, in step S341, the lead frame is actually laser-cut. More specifically, in step S3411, the cut position expressed by such parameters as the rotation angle and the position of movement of the laser beam calculated by the calculator 3076 is confirmed. In steps of S3412 and S3413, the rotation angle and the position of movement of the laser beam are set respectively, following which the laser beam is generated in step S3414 to carry out laser cutting. At this time, whether to generate the laser beam or not is determined based on the rotation angle and the position of movement of the laser beam which are confirmed in step S3411.

Then, at the timing when the laser beam is not generated, it is judged in step S3415 whether the laser-cut portion is satisfactorily cut or not. This judgment is made by, as described before, using the CCD camera 3084, the monitor 3086, the cut portion monitoring device 3080, and the image determining unit 3071. If the result of laser cutting is good, the control flow goes to step S3416 for repeating the above steps subsequent to S341 to perform laser cutting at a next position. If the result of laser cutting is not good, the cutting conditions are changed in step S3417a, an alarm is issued from the alarm issuing unit 3071a in step SS417b, and the type of lead frame, the cutting result, the cutting conditions, etc. at this time are recorded in the recording unit S078 in step S3418. The above operation subsequent to step S341 are repeated until all intended gaps of the lead frame are completely formed.

Figure 27:
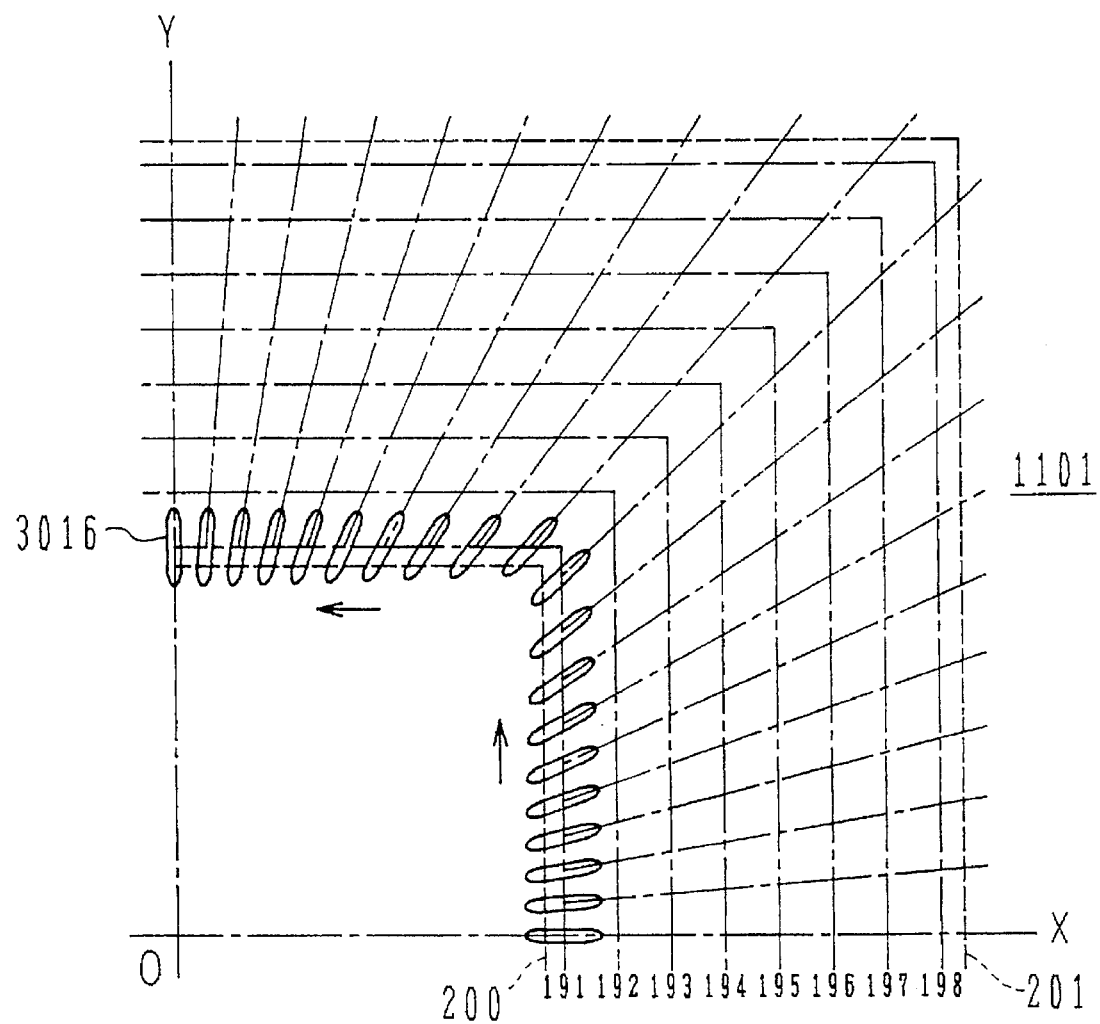
FIG. 27 is a view for explaining a procedure of forming inner leads according to the sixth embodiment.
Figure 28:
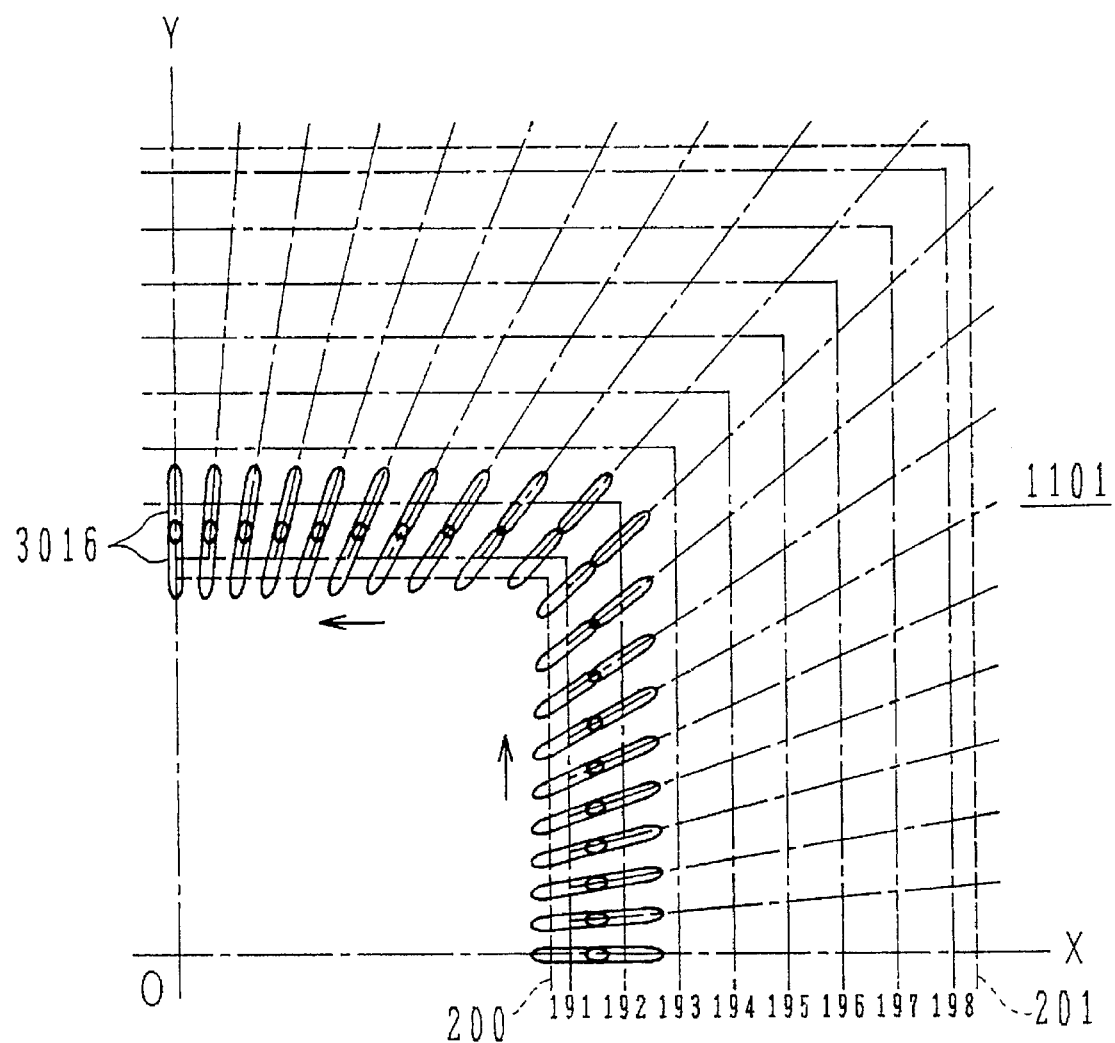
FIG. 28 is a view for explaining a procedure subsequent to that in FIG. 27.
Figure 29:
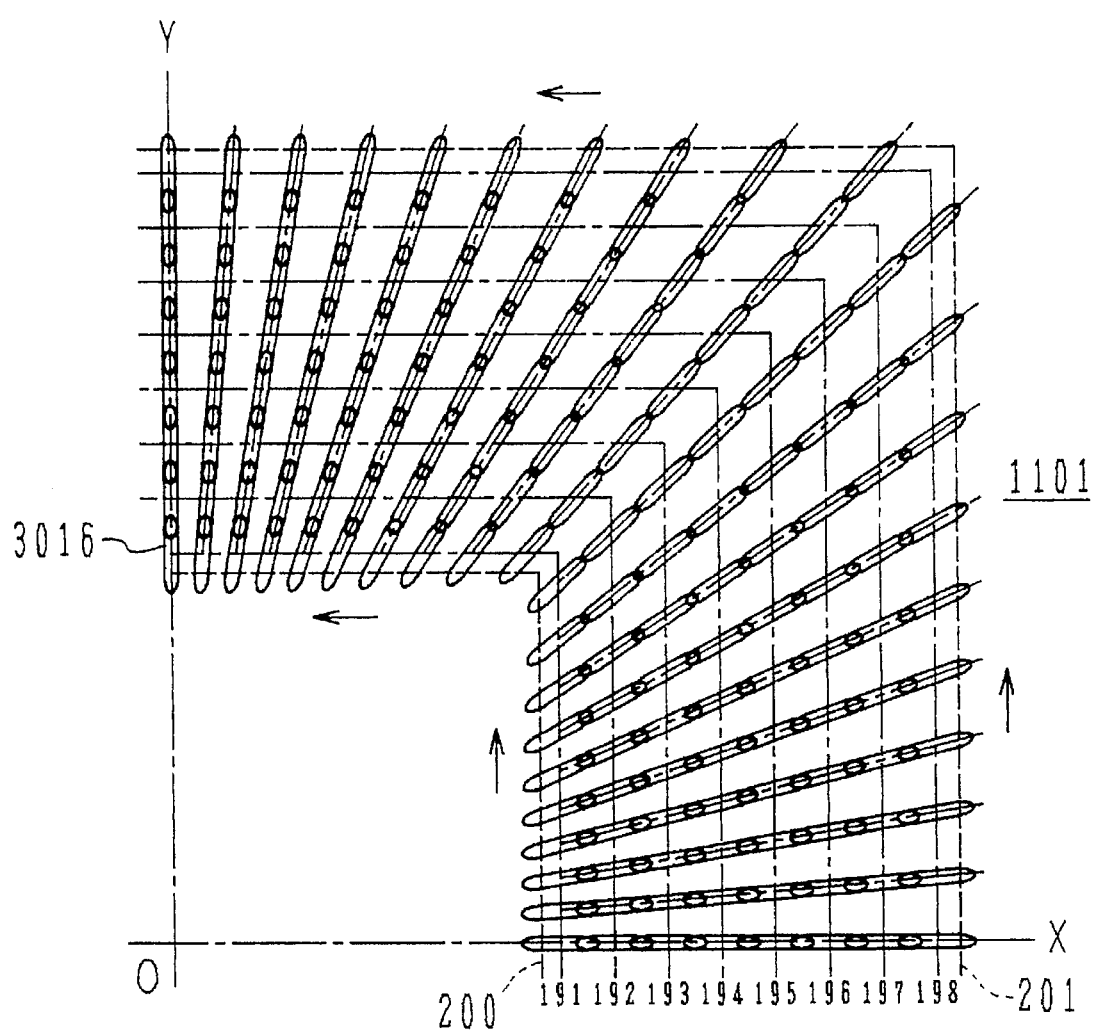
FIG. 29 is a view for explaining a procedure subsequent to that in FIG. 28.

Procedures of forming the inner leads 1103 of the lead frame, which has a configuration as shown in FIG. 6, by the above steps of laser cutting will now be described with reference to FIGS. 27 to 29. Each of FIGS. 27 to 29 represents a path of the position irradiated by the laser beam on the metal plate 1101, and shows only a ¼ area of the lead frame in consideration of its symmetrical configuration. Also, in those drawings, an irradiation spot 3016 of the laser beam 3014 is indicated by an elongate ellipse. For simplification, it is assumed in FIGS. 27 to 29 that angular intervals between the gaps separating the leads from each other are all the same.

In FIG. 27, the rectangular area inside a broken line 200 represents an area in which the die pad 1102 and the cut-out portions 1106 are formed, whereas the rectangular area outside a broken line 201 represents an area in which the outer leads 1104, the dam bars 1105, etc. are formed. Paths 191 to 198 are a multiplicity of rectangles whose diagonal lines have a common crossed point O and whose four sides are parallel to each other. The spacing between adjacent two inner and outer rectangular paths in parallel relation is the same, and the length of sides of the rectangular paths is gradually increased from the center of the metal plate outward. Shapes of the rectangular paths are determined in consideration of desired shapes of the inner leads 1103 in their end portions facing the die pad 1102 and in their portions connected to the outer leads 1104. Further, the center of the lead frame to be fabricated is aligned with the crossed point O of diagonal lines of the rectangular paths, the irradiation spot 3016 is moved along each of the plural rectangular paths 191 to 198 one by one as described later while generating the laser beam in the form of pulses, and the laser beam is rotated on its optical axis so that the lengthwise direction of the irradiation spot 3016 is coincident with the direction pointing radially outward from the center of the metal plate 1101. Then, the laser beam is irradiated along the paths successively from the innermost rectangular path 191 near the point O to the outer rectangular paths 192, 193, etc.

When the size of the irradiation spot 3016 in the lengthwise direction is previously determined, the spacing between twos of the rectangular paths 191 to 198 is set such that inner and outer irradiation areas covered by the irradiation spots 3016 of the laser beam 3014 are somewhat overlapped with each other in the lengthwise direction. Conversely, when the spacing between twos of the rectangular paths 191 to 198 is previously determined, the size of the irradiation spot 3016 in the lengthwise direction is set such that inner and outer irradiation areas covered by the irradiation spots 3016 along the adjacent rectangular paths are overlapped with each other regardless of the rotation angle of the laser beam on its optical axis. As a result, the irradiation areas covered by the irradiation spots 3016 are joined with each other radially outwardly from the central portion. In addition, by setting the laser beams, which are somewhat overlapped with each other as mentioned above, to have the same rotation angle on its optical axis, the irradiation areas covered by the irradiation spots 3016 on the successive paths are linearly joined with each other and, therefore, a number of gaps extending radially and linearly can be easily formed in the metal plate 1101.

Further, the repetition period of the laser beam is kept constant and the moving speed of the XY-table 3060 is controlled in proportion to the length of sides of the rectangular paths 191 to 198. By so controlling the moving speed of the XY-table 3060, the moving speed of the laser beam on each path is changed in proportion to the length of sides of the rectangular paths 191 to 198, whereby the spacing between the adjacent irradiation areas on the same path is also increased in proportion to the length of sides of the rectangular paths. Accordingly, the irradiations areas are radially joined with each other in the linear form, and the angular intervals between the gaps extending radially and linearly become all the same. The angular interval between the radial gaps adjacent to each other is uniquely determined by the moving speed and the repetition period of the pulse-like laser beams, and is set to be in match with the final configuration of the lead frame. In other words, the angular interval between the radial gaps is determined in accordance with the pitch of the inner leads 1103.

Under the above conditions, as shown in FIG. 27, laser cutting is successively carried out first along the innermost rectangular path 191 while generating the laser beam in the form of pulses. On this occasion, if the laser cutting is not required somewhere on the same path, whether to generate the laser beam or not must be determined. This determination on whether to generate the laser beam or not is made, as explained above in connection with step S3411 of FIG. 26, by the main controller 3079 based on the direction and the position of movement of the laser beam calculated by the calculator 3076. In response to the determination, a command is sent to the laser controller 3074 for controlling the laser power supply 3010a and hence the resonator 3010. As an alternative, whether to irradiate the laser beam or not may be controlled by using a beam shutter (not shown) provided in the resonator.

Next, as shown in FIG. 28, laser cutting is successively carried out along the rectangular path 192 while generating the laser beam in the form of pulses. At this time, as described above, the inner and outer irradiation areas covered by the irradiation spots 3016 are somewhat overlapped with each other in the lengthwise direction. Likewise, for the subsequent paths 193 to 198, laser cutting is successively carried out along each rectangular path while generating the laser beam in the form of pulses, as shown in FIG. 29, thereby forming a multiplicity of radial and linear gaps, i.e., the gaps 1108 separating the inner leads 1103 from each other, in the metal plate 1101.

In the above laser cutting process, if the size of the irradiation spot 3016 in the lengthwise direction is varied depending on the position to be laser-cut, necessary control would be very complicated because it would be required not only to control a sectional shape of the laser beam, but also to control output power of the laser beam whose distribution is also varied depending on change in the sectional shape of the laser beam. In this embodiment, by keeping constant the size of the irradiation spot 3016 in the lengthwise direction, the laser cutting can be easily performed with no need of complicated control for the sectional shape and output power of the laser beam.

In the case of performing the laser cutting under the above conditions, because the laser beam is rotated on its optical axis such that the irradiation areas covered by the irradiation spots 3016 are radially arranged along the rectangular paths, the lengthwise direction of the irradiation spot 3016 is different between central portions and corner portions of sides of the rectangular path. In this embodiment, since the size of the irradiation spot 3016 in the lengthwise direction is kept fixed, an overlapped portion between the adjacent irradiation areas becomes small in the corner portions of each rectangular path, i.e., in the direction of the hour hand at the time 1:30, and large in the central portions of sides of each rectangular path, i.e., in the directions of the hour hand at the time 12:00 and 3:00. In that overlapped portion between the adjacent irradiation areas, the laser pulse is repeatedly irradiated to the same place. From the above consideration, therefore, the overlapped portion to which the laser pulse is repeatedly irradiated becomes larger in the central portions of sides of each rectangular path than in the corner portions thereof. However, even if the laser beam is repeatedly irradiated to the gap which has been already penetrated by the preceding laser cutting step, it only passes through the penetrated gap and no longer takes part in cutting the metal plate. Consequently, while the overlapped portion between the adjacent irradiation areas is different in size as mentioned above, the cut shape of the leads will not be affected and its dimensional accuracy and quality are maintained.

Moreover, although the gaps formed by the laser cutting extend to the region inside the broken line 200 to some extent in FIG. 29, that region and thereabout correspond to portions which are later severed together so as to become the cut-out portions 1106 as with the case of FIG. 14. With this severing, the inner leads 1103 are separated from each other and lines interconnecting the inner distal ends of the inner leads define a rectangular shape. The gaps formed by the laser cutting also extend outwardly of the broken line 201, but such extensions provide no influence upon the finished shape of the lead frame because they are joined with the gaps separating the outer leads from each other.

In the above laser cutting process, since the pulse width of the laser beam, i.e., the time during which the laser beam is generated, is much shorter than the repetition period of the laser beam, i.e., the time from generation of one pulse to generation of the next, the laser cutting is momentarily completed. On the other hand, the time required for moving the irradiated position of the laser beam along any path is sufficiently longer than the repetition period. Therefore, even when the irradiated position of the laser beam is continuously moved at a constant speed, an influence resulting from such continuous movement of the irradiated position, i.e., an error in the cut position, is small. In other words, the irradiation areas covered by the irradiation spots 3016 are arranged in a radial pattern discontinuously along the aforesaid rectangular paths just by moving the irradiated position of the laser beam while generating the laser beam in the form of pulses and rotating the same on its optical axis. On this occasion, the spacing and angular interval between the adjacent irradiation areas on the same rectangular path are determined by the rotating speed and the emission period of the laser beam.

The difference between a comparative example, in which the inner leads 1103 are formed like the case of FIG. 13 with combination of linear movements of a laser beam optical axis in directions of two axes by using the prior art as disclosed in JP, A, 1-306088, JP, A, 60-93095, etc. and this embodiment will now be described with reference to FIG. 30 from the viewpoint of intermittent control of the moving direction of the laser beam optical axis. Note that FIG. 30 is illustrated in the schematic form, and X- and Y-axes orthogonal to each other are defined as shown. It is here also assumed that the maximum length of one inner lead 1103 to be formed by laser cutting is 10 mm, the number (N) of the inner leads 1103 to be formed is 300, and the length which can be cut by one shot of laser beam is 1.0 mm.

Figure 30A:
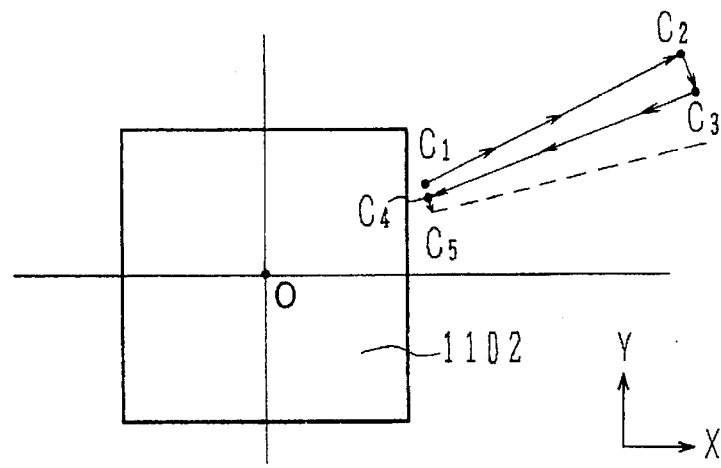
FIG. 30A is a view showing a comparative example in which inner leads are formed with combination of linear movements of a laser beam optical axis in two axial directions by using the prior art.

To form the inner leads 1103 radially around the die pad 1102 by the comparative example, the laser beam is irradiated while moving the optical axis of the laser beam with combination of linear movements in the X- and Y-axis directions as shown in FIG. 30A, on condition that the lengthwise direction of the irradiation spot 3016 is kept aligned with the direction in which the inner leads 1103 are extended. More specifically:

(1) The laser beam is irradiated in the form of pulses while moving the optical axis of the laser beam outward along a straight line $C_1C_2$, thereby cutting the metal plate. In this step, the optical axis of the laser beam is moved under combined control for the X- and Y-axis directions.

(2) The irradiation of the laser beam is suspended and the optical axis of the laser beam is moved from $C_2$ to $C_3$ under combined control for the X- and Y-axis directions.

(3) The laser beam is irradiated in the form of pulses while moving the optical axis of the laser beam inward along a straight line $C_3C_4$, thereby cutting the metal plate. In this step, the optical axis of the laser beam is moved under combined control for the X- and Y-axis directions.

(4) The irradiation of the laser beam is suspended and the optical axis of the laser beam is moved from $C_4$ to $C_5$ under combined control for the X- and Y-axis directions.

By repeating the above steps (1) to (4), all the inner leads 1103 are formed. In the foregoing process, it is required to suspend the irradiation of the laser beam and make intermittent control of the moving direction thereof when the optical axis of the laser beam is moved from $C_2$ to $C_3$ and $C_4$ to $C_5$. Additionally, the operation of reversing the beam moving direction is also required then.

In this prior art case, the number of times that the intermittent control of the beam moving direction is required to be repeated to form all the inner leads 1103 is given by:

X-axis direction: N=300
Y-axis direction: N=300

Thus, the intermittent control of the beam moving direction must be repeated as many times as the number of the inner leads 1103. Additionally, because the movement of the laser beam must be controlled in both the X- and Y-directions in a combined manner for each of the inner leads 1101, this case requires more complicated control than the case of FIG. 13A where the movement of the laser beam is controlled only in the R-direction while being fixed in the θ-axis direction. In conclusion, also in this comparative example of FIG. 30A, as the intermittent control of the beam moving direction is repeated so many times and the beam moving direction is reversed so frequently, there gives rise to a risk that a resultant error in the driving mechanism system may be accumulated to produce a backlash. Correcting such an error requires a lot of time and, as a result, the cutting speed is reduced.

Figure 30B:
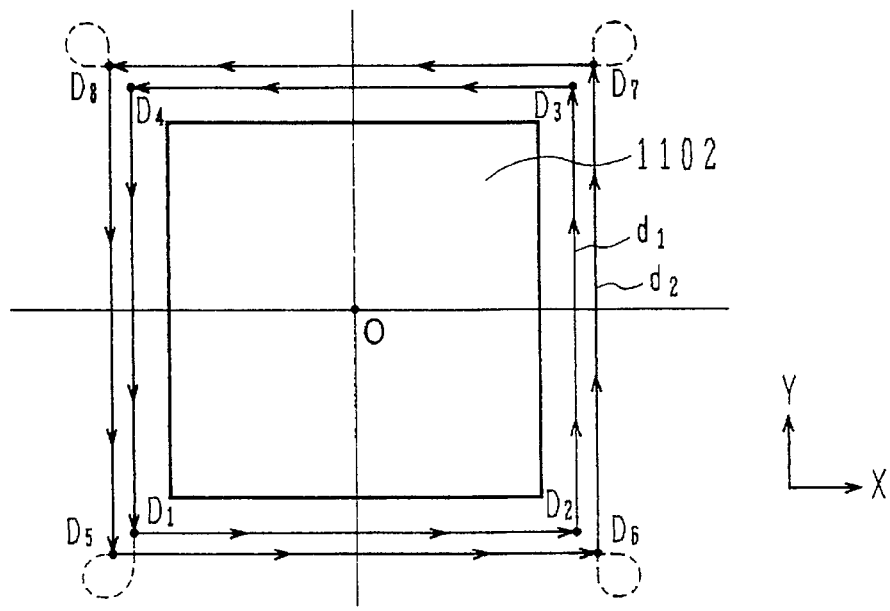
FIG. 30B is a view showing a manner in which inner leads are formed according to a lead frame fabricating method of the sixth embodiment.

In contrast with the above comparative example, the inner leads 1103 are formed according to this embodiment by irradiating the laser beam in the form of pulses while moving the optical axis of the laser beam along each of the rectangular paths in either the X- or Y-axis direction, as shown in FIG. 30B. More specifically:

(1) The laser beam is irradiated in the form of pulses while moving the optical axis of the laser beam from $D_1$ along a rectangular path $d_1$, thereby cutting the metal plate one round.

(2) The irradiation of the laser beam is suspended and the optical axis of the laser beam is moved from $D_1$ to $D_5$ on a next rectangular path $d_2$.

(3) The laser beam is irradiated in the form of pulses while moving the optical axis of the laser beam from $D_5$ along the rectangular path $d_2$, thereby cutting the metal plate another round.

By repeating the above steps (1) to (3), the entire lead frame is laser-cut. In the foregoing process, it is required to suspend the irradiation of the laser beam and to make the intermittent control of the beam moving direction for each of the corners $D_2$, $D_3$, $D_4$, $D_6$, $D_7$ and $D_8$ of the rectangular paths. In the above step (2) of moving the optical axis of the laser beam from $D_1$ to $D_5$, it is also required to suspend the irradiation of the laser beam and to make the intermittent control of the beam moving direction. On this occasion, by providing appropriate runways as indicated by loop-shaped broken lines in FIG. 30B so as to perform the intermittent control of the beam moving direction that includes deceleration and acceleration, the operation of turning the beam moving direction abruptly can be alleviated and the movement of the laser beam can be controlled in a relatively smooth and moderate manner. Note that, in FIG. 30B, runways are not shown for the path $d_1$.

In this embodiment, the number of times that the intermittent control of the beam moving direction is required to be repeated to form all the inner leads 1103 is given by;

$$4M=40$$

for both the X- and Y-directions as a whole. Stated otherwise, the number of times of repeating the intermittent control of the beam moving direction is only about 4 times the number of pulse laser shots required to form one inner lead 1103 and is much smaller than that required in the comparative example. It is also possible to smoothly and moderately control the movement of the laser beam by providing appropriate runways when the intermittent control of the beam moving direction is performed. Accordingly, as with the case explained in connection with FIG. 13B, position alignment of the driving mechanism system can be facilitated to improve a control ability, the system can be easily balanced to eliminate such inaccuracy as clearance, looseness and backlash, and a positioning error can be minimized. It is thus possible to obtain very good results in accuracy, reliability and reproducibility of the cut position.

In addition, this embodiment is also advantageous in that even if the XY-table 3060 is moved at a relatively low speed, the radial gaps can be easily cut at a high speed only by controlling the smooth and moderate motion of the laser beam.

Furthermore, since the laser cutting is performed along each of the rectangular paths successively outward from the central portion, the distal end portions of the inner leads 1103 are cut in a beginning period of the laser cutting process where the input heat is still small. Accordingly, thermal deformations of the distal end portions of the inner leads 1103 are suppressed so as to ensure good dimensional accuracy. On the other hand, at the time when portions near the outer leads 1104 are subject to the laser cutting, the substantial amount of heat is accumulated, but those portions are less apt to thermally deform because of having a large lead width, and hence are hardly affected by the heat. Additionally, since the outer portions of the inner leads have a relatively large margin for cutting errors as compared with the distal end portions and thereabout, cutting quality is less impaired.

Returning to FIG. 26, a description will be made of judgement in step S351 whether all the gaps are satisfactorily cut or not. This judgment is also made by using the CCD camera 3084, the monitor 3086, the cut portion monitoring device 3080, and the image determining unit 3071. If the result of laser cutting is good, the control flow goes to a next step (step S352). If the result of laser cutting is not good, the control flow goes to step S353 where the cutting is disrupted and the cutting conditions are reconsidered and set anew.

Next, it is judged in step S361 whether one metal plate is completely cut or not. If completed, the control flow goes to a next step (step S362) and, if not so, the metal plate is fed and fixed in place, followed by jumping to step S380 (in step S363). This operation of feeding and fixing the metal plate is performed by the feeder 3090 in accordance with a command from the feeder controller 3077. It is then judged in step S371 whether all the metal plates are completely cut or not. If completed, the laser cutting is totally ceased (in step S372) and, if not so, the metal plate is replaced by new one, followed by jumping to step S380 (in step S373).

After forming the inner leads by a the laser cutting, the outer leads are formed and the distal end portions of the inner leads are cut off in this embodiment as well. The processing method is similar to in the first embodiment.

Figure 31:
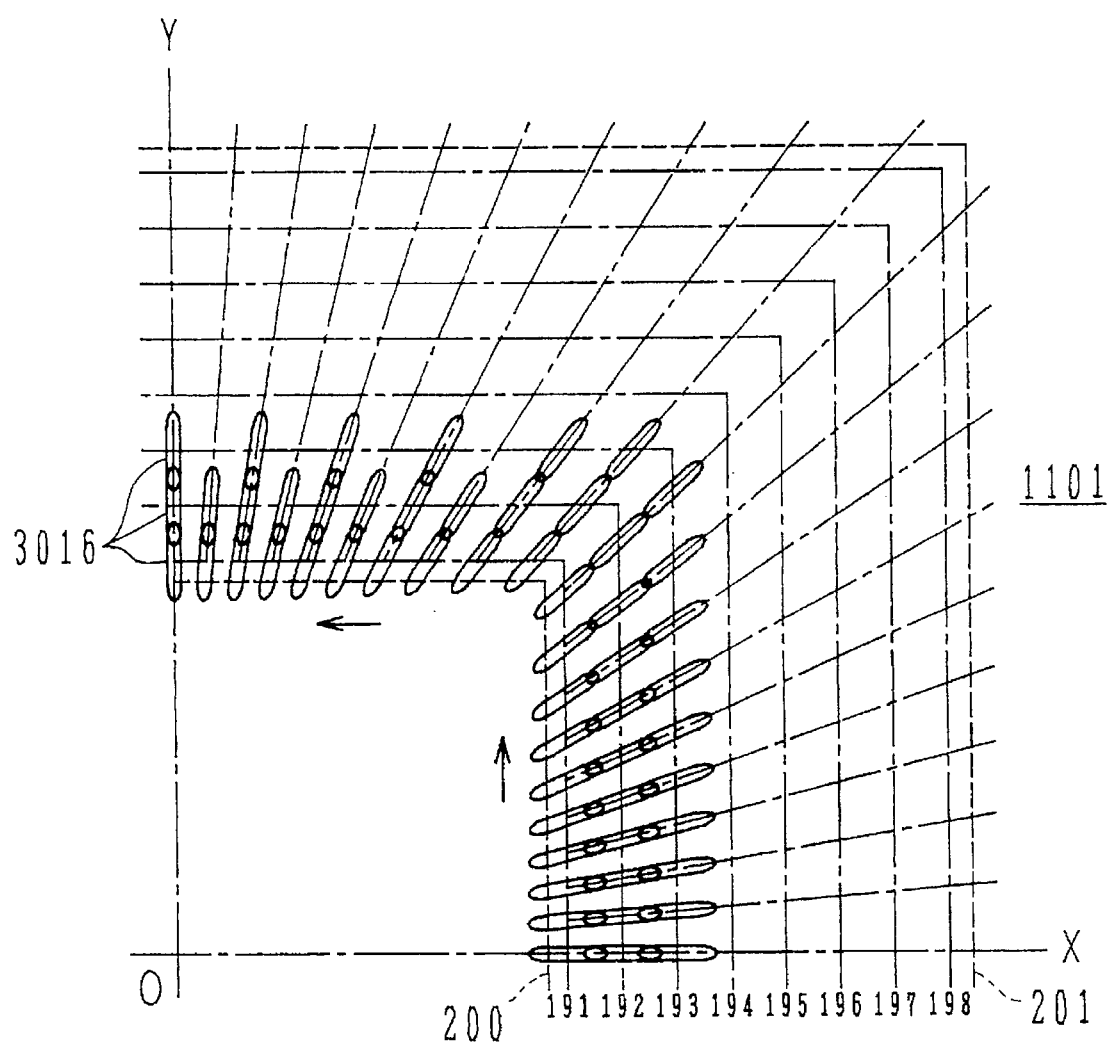
FIG. 31 is a view for explaining a modification in which gaps for separating the inner leads are alternately formed in the sixth embodiment.

As a modification of this embodiment shown in FIG. 31, the gaps separating the inner leads 1103 from each other lay be alternately formed. FIG. 31 shows a state that the laser beam is irradiated along the rectangular path 193 to alternately form the gaps separating the inner leads 1103 from each other, and the laser beam is then irradiated along the rectangular path 193 again to cut the other gaps remained uncut. The heat input upon the first irradiation of the laser beam along the path 193 abates by thermal conduction to other material portions of the metal plate 1101 and thermal dissipation into air, before the second irradiation of the laser beam along the path 193. By thereafter repeating the irradiation in the above-described manner, the inner leads 1103 are completely formed. Of course, the gaps separating the inner leads 1103 from each other may be formed every two or more radial lines rather than being alternately formed. Thus, the heat input upon irradiation of the laser beam will not be concentrated in the material of the metal plate 1101 to prevent the material of the metal plate 1101 from being ruptured by melting due to the excessive input heat.

In addition, as with the case shown in FIG. 22, a coolant may be supplied to flow in surrounding relation to the assist gas so that most of the heat input to the material of the metal plate 1101 with the laser cutting can be quickly removed immediately after the laser cutting to forcibly reduce the plate temperature. Furthermore, as with the case shown in FIGS. 23 and 24, the method of forming through holes discontinuously in line, e.g., in the broken-line form, by the laser cutting and then removing uncut portions by etching may be employed.

With this embodiment as described above, since the laser beam generated in the form of pulses and having a circular section is converted by the beam section transformer 3020 into a laser beam having an elongate elliptic section, the resultant laser beam is rotated on its optical axis by the beam rotating device 3030 so that the lengthwise direction of the laser beam is aligned with the direction pointing radially outward from the center of the metal plate, and the laser beam is irradiated to the metal plate 1101 while being moved by the XY-table 3060 along each of the plural rectangular paths, it is possible to form, in the metal plate 1101, a number of gaps which are extended radially and linearly. Then, by so forming the radial and linear gaps by the above laser cutting process, inner leads of a lead frame can be formed.

Furthermore, as with the first embodiment, the operation of reversing the direction of movement of the laser beam optical axis is not needed, controlling the smooth and moderate motion of the optical axis of the laser beam is only primarily required, and the required number of times of repeating intermittent control of the beam moving direction (stop and restart of the laser beam) is very small. Accordingly, position alignment of the driving mechanism system can be facilitated to improve a control ability, a positioning error due to clearance and loose can be minimized, and very good results are obtained in accuracy, reliability and reproducibility of the cut position. In addition, since the laser cutting can be progressed successively for each of short repetition periods, it is easily carried out and the cutting speed is increased.

Also, since the laser beam is irradiated in the form of pulses, i.e., intermittently, along each of the rectangular paths 191 to 198, the heat input with the laser cutting is apt to more easily disperse and an influence of the heat is alleviated. Accordingly, dimensional accuracy and quality after the laser cutting can be improved. Moreover, since the gaps are formed radially and linearly, deformation characteristics of all the leads, i.e., the directions and magnitudes of deformations, become almost analogous to one another and also uniform. Accordingly, if any deformation is caused, the adjacent leads are less likely to contact each other. Hence, a possibility of contact troubles between the adjacent leads is reduced even with the leads having a finer shape and a narrower pitch.

Since the size of the irradiation spot 3016 in the lengthwise direction is kept fixed, the laser cutting can be easily performed with no need of complicated control for the sectional shape and output power of the laser beam. In this respect, the overlapped portion between the adjacent irradiation areas covered by the irradiation spots 3016, i.e., the portion to which the laser pulse is repeatedly irradiated, is different in size between the corner portions of each rectangular path and the central portions of sides thereof. However, even if the laser beam is repeatedly irradiated to the gap which has been already penetrated, it only passes through the penetrated gap and takes no longer part in cutting the metal plate. Consequently, the cut shape of the leads will not be affected and its dimensional accuracy and quality are maintained.

Since the repetition period of the laser beam is kept constant and the moving speed of the XY-table 3060 is controlled in proportion to the length of sides of the rectangular paths 191 to 198, the moving speed of the laser beam on each path is changed in proportion to the length of sides of the rectangular paths 191 to 198, whereby the spacing between the adjacent irradiation areas on the same path is also increased in proportion to the length of sides of the rectangular paths. Accordingly, the irradiations areas are radially joined with each other in the linear form, and the gaps extending radially and linearly can be formed. Note that the similar result can also be obtained by not controlling the moving speed of the laser beam unlike the above case, but keeping it constant and controlling the repetition period of the laser beam in proportion to the length of sides of the rectangular paths 191 to 198.

Since the laser cutting is progressed from the central portion outward successively along each of the rectangular paths, the distal end portions of the inner leads 1103 are cut in a beginning period of the laser cutting process where the input heat is still small. Accordingly, thermal deformations of the distal end portions of the inner leads 1103 are suppressed so as to ensure good dimensional accuracy. On the other hand, at the time when portions near the outer leads 1104 are subject to the laser cutting, the substantial amount of heat is accumulated, but those portions are less apt to thermally deform because of having a large lead width, and hence are hardly affected by the heat. Additionally, since the outer portions of the inner leads have a relatively large margin for cutting errors as compared with the distal end portions and thereabout, cutting quality is less impaired.

While the laser beam having a circular section is employed and converted into a beam having an elongate elliptic section by the beam section transformer in the above first to sixth embodiments, the function of the beam section transformer may be added to the resonator itself. Alternatively, a laser beam emitted from a slab resonator and having a rectangular section may be used. In this case, the beam section transformer constitutes beam section changing means.

Seventh Embodiment

Figure 32:
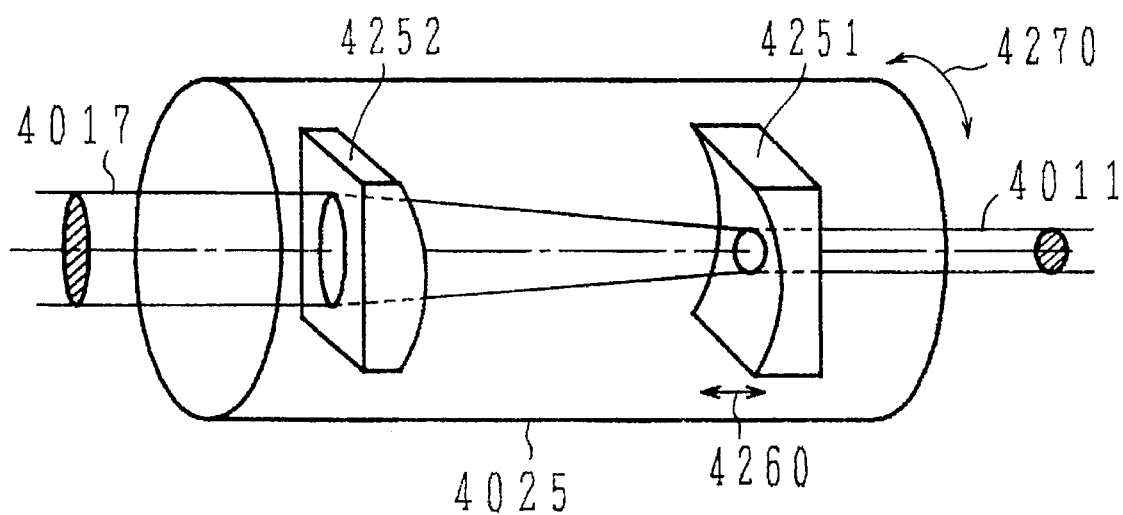
FIG. 32 is a block diagram schematically showing a construction of a beam expanding/contracting and rotating device in a lead frame fabricating apparatus according to a seventh embodiment of the present invention.

A seventh embodiment of the present invention will be described below with reference to FIG. 32. In this embodiment, a beam extending/contracting and rotating device 4025 as shown in FIG. 32 is provided instead of the beam section transformer and the beam rotating device in the first to sixth embodiments. The other construction is the same as in the first to sixth embodiments. Note that the beam extending/contracting and rotating device 4025 constitutes laser beam generating means in cooperation with a resonator and, simultaneously, double as beam rotating means. For simplification, FIG. 32 is shown in the schematic form.

In FIG. 32, the beam extending/contracting and rotating device 4025 comprises a concave cylindrical lens 4251 and a convex cylindrical lens 4252. With these two cylindrical lenses, a laser beam 4011 is converted into a laser beam 4017 whose section is elongated only in one direction to have an elliptic shape. The concave cylindrical lens 4251 is slid along the optical axis as indicated by an arrow 4260 with the similar structure to in FIG. 2, whereupon the ratio of major axis to minor axis of the elliptic section of the laser beam is changed. Further, the beam extending/contracting and rotating device 4025 is rotated in its entirety about the optical axis as indicated by an arrow 4270 while keeping the concave cylindrical lens 4251 and the convex cylindrical lens 4252 fixed in relative positions. This rotation causes the laser beam 4017 having an elongate elliptic section to be rotated on its optical axis. In other words, the beam extending/contracting and rotating device 4025 has both the functions of the beam section transformer 4020 and the beam rotating device 4030, and can simultaneously change the sectional shape of the laser beam and rotate the laser beam on its optical axis.

In this embodiment, however, the sectional shape of the laser beam before entering the beam extending/contracting and rotating device 4025 is required to be substantially circular. This is because, if the sectional shape of the laser beam before entering the beam extending/contracting and rotating device 4025 is not circular, the sectional shape of the laser beam emerging from the beam extending/contracting and rotating device 4025 would be changed depending on an angle of rotation of the beam extending/contracting and rotating device 4025.

As described above, in addition to the similar advantages as in the first or sixth embodiment, this embodiment also makes it possible to simultaneously change the sectional shape of the laser beam and rotate the laser beam on its optical axis by the beam extending/contracting and rotating device 4025 only, and to simplify the apparatus construction.

Eighth Embodiment

An eighth embodiment of the present invention will be described below with reference to FIGS. 33 to 35.

In this embodiment, one laser beam is branched into four laser beams having the same sectional shape and the same output power. These four laser beams are condensed onto a metal plate, and the condensed laser beams are simultaneously moved and rotated on their optical axes on the metal plate.

Figure 33:
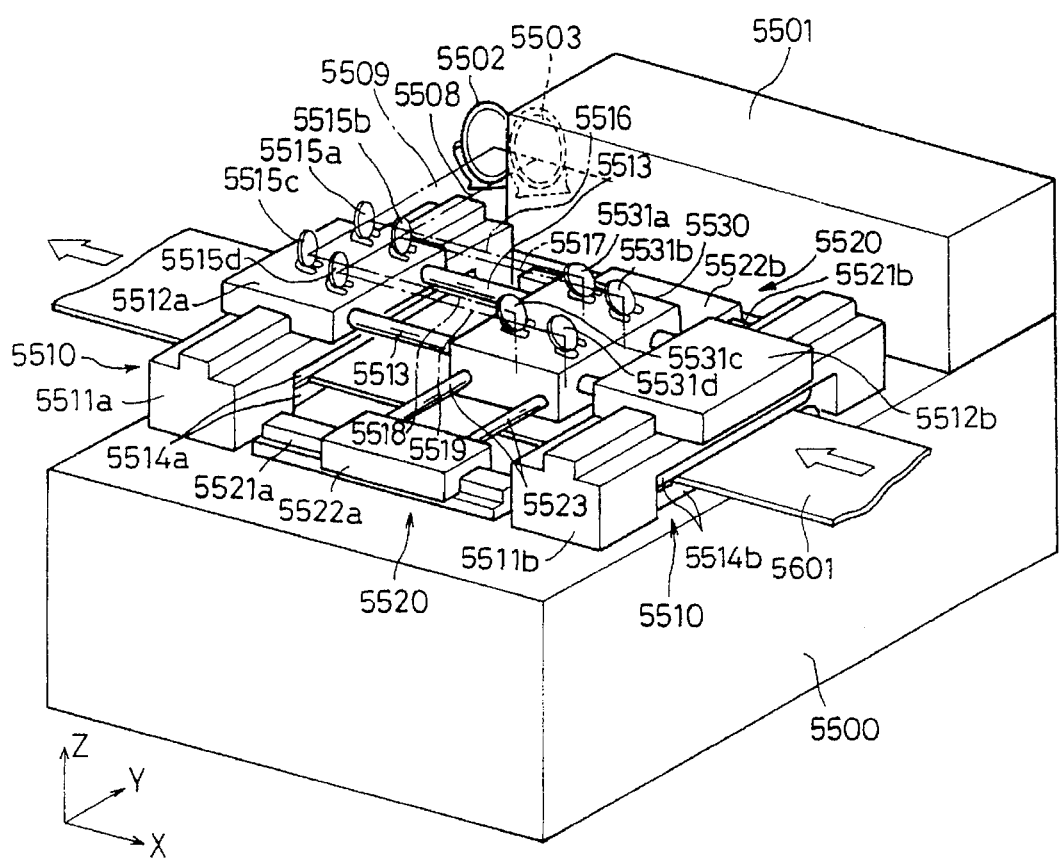
FIG. 33 is a perspective view showing a configuration of a lead frame fabricating apparatus according to a eighth embodiment of the present invention.
Figure 34:
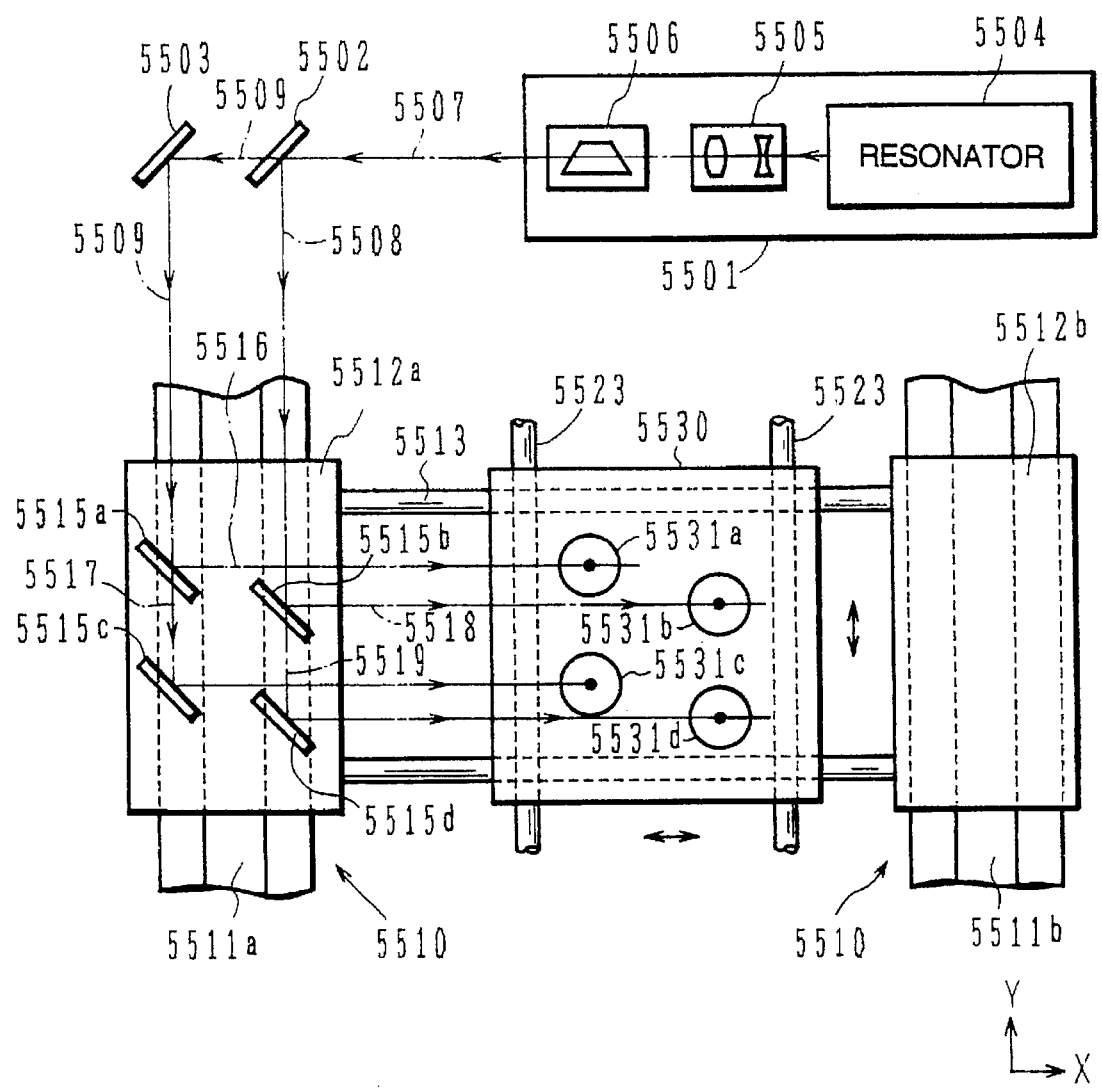
FIG. 34 is a plan view showing the configuration of the lead frame fabricating apparatus shown in FIG. 33.

As shown in FIGS. 33 and 34, a lead frame fabricating apparatus of this embodiment includes, on a stand 5500, a laser beam generating unit 5501, a half-reflecting mirror 5502, a totally reflecting mirror 5503, a Y-axis sliding device 5510, an X-axis sliding device 5520, and a carriage 5530. Here, X-, Y- and Z-axes are defined as ones orthogonal to each other, as shown in FIG. 33. The laser beam generating unit 5501 comprises a resonator 5504, a beam section transformer 5505 and a beam rotating device 5506 which have similar functions to those described above in connection with FIG. 25, and emits a laser beam having an elongate sectional shape in the negative direction of the X-axis. The half-reflecting mirror 5502 reflects about 50% of the laser beam, but transmits remaining about 50% of the laser beam therethrough. Thus, the half-reflecting mirror 5502 branches a laser beam 5507 from the laser beam generating unit 5501 into two laser beams 5508 and 5509 having the same sectional shape and the same output power, such that the laser beam 5508 is reflected in the negative direction of the Y-axis and the laser beam 5509 is introduced toward the totally reflecting mirror 5503. The totally reflecting mirror 5503 reflects about 100% of the laser beam and serves to reflect the laser beam 5509 from the half-reflecting mirror 5502 in the negative direction of the Y-axis.

The Y-axis sliding device 5510 comprises two guide rails 5511a, 5511b, Y-axis sliders 5512a, 5512b sliding respectively on the guide rails 5511a, 5511b, and guide bars 5513 coupling the Y-axis sliders 5512a, 5512b to each other. The X-axis sliding device 5520 comprises two guide rails 5521a, 5521b, X-axis sliders 5522a, 5522b sliding respectively on the guide rails 5521a, 5521b, and guide bars 5523 coupling the X-axis sliders 5522a, 5522b to each other. When the Y-axis sliders 5512a, 5512b and the X-axis sliders 5522a, 5522b slide, the carriage 5530 supported by the guide bars 5513, 5523 is moved respectively in the X- and Y-axis directions. Further, under the guide rails 5511a, 5511b, there are respectively provided pairs of drive rolls 5514a, 5514b for holding a strip of metal plate 5601 therebetween and feeding it. Note that the strip of metal plate 5601 used in this embodiment has a width sufficiently larger, i.e., about four times, than the width of one lead frame.

Half-reflecting mirrors 5515a, 5515b and totally reflecting mirrors 5515c, 5515d are fixed onto the Y-axis slider 5512a on the incident side of the laser beam. As with the half-reflecting mirror 5502, the half-reflecting mirrors 5515a, 5515b each reflect about 50% of the laser beam, but transmits remaining about 50% of the laser beam therethrough and, as with the totally reflecting mirror 5503, the totally reflecting mirrors 5515c, 5515d each reflect about 100% of the laser beam. The half-reflecting mirror 5515a further branches the laser beam 5509 into two laser beams 5516 and 5517 having the same sectional shape and the same output power, such that the laser beam 5516 is reflected in the positive direction of the X-axis and the laser beam 5517 is introduced toward the totally reflecting mirror 5515c. Also, the totally reflecting mirror 5515c reflects the laser beam 5517 from the half-reflecting mirror 5515a in the positive direction of the X-axis. The half-reflecting mirror 5515b further branches the laser beam 5508 into two laser beams 5518 and 5519 having the same sectional shape and the same output power, such that the laser beam 5518 is reflected in the positive direction of the X-axis and the laser beam 5519 is introduced toward the totally reflecting mirror 5515d. Also, the totally reflecting mirror 5515d reflects the laser beam 5519 from the half-reflecting mirror 5515b in the positive direction of the X-axis.

Totally reflecting mirrors 5531a, 5531b, 5531c, 5531d are fixed onto the carriage 5530 to respectively reflect the laser beams 5516, 5517, 5518, 5519 in the negative direction of the Z-axis. Moreover, though not shown, condensing lenses and nozzles for condensing and irradiating the respective laser beams reflected by the totally reflecting mirrors 5531a to 5531d are fixed inside and below the carriage 5530 in such a manner that their relative positions will not be changed. The totally reflecting mirrors 5531a to 5531d and the condensing lenses are mounted respectively corresponding to four different positions on the metal plate 5601 as shown. The other construction is the same as in FIG. 25.

Figure 35:
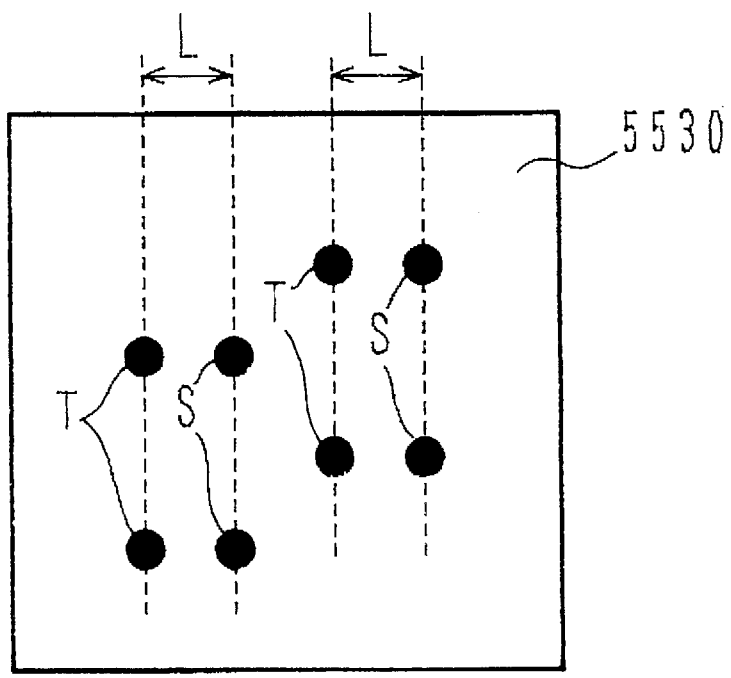
FIG. 35 is a view showing mount positions of sensors on a carriage shown in FIGS. 33 and 34, the view being viewed from the rear side of the carriage.

On the underside of the carriage 5530, sensors for detecting a cut state of the metal plate 5601 after being subject to laser cutting are mounted in positions as shown in FIG. 35. Specifically, sensors comprising CCD cameras, photosensors, line sensors or the like are mounted in positions which are denoted by S and spaced a length L corresponding to one lead frame downstream along the strip of metal plate 5601 from respective positions of the condensing lenses denoted by T in FIG. 35.

In the above construction, the laser beam 5507 having an elongate section and emitted from the laser beam generating unit 5501 advances in the negative direction of the X-axis and is branched by the half-reflecting mirror 5502 into the two laser beams 5508 and 5509 having the same sectional shape and the same output power. The laser beam 5508 reflected by the half-reflecting mirror 5502 advances in the negative direction of the Y-axis and the laser beam 5509 transmitted through the half-reflecting mirror 5502 is reflected by the totally reflecting mirror 5503 to advance in the negative direction of the Y-axis. The laser beam 5509 is further branched by the half-reflecting mirror 5515a into the two laser beams 5516 and 5517 having the same sectional shape and the same output power. The reflected laser beam 5516 advances in the positive direction of the X-axis and the transmitted laser beam 5517 is reflected by the totally reflecting mirror 5515c to advance in the positive direction of the X-axis. Likewise, the laser beam 5508 is further branched by the half-reflecting mirror 5515b into the two laser beams 5518 and 5519 having the same sectional shape and the same output power. The reflected laser beam 5518 advances in the positive direction of the X-axis and the transmitted laser beam 5519 is reflected by the totally reflecting mirror 5515d to advance in the positive direction of the X-axis.

The laser beams 5516, 5517, 5518, 5519 are reflected respectively by the totally reflecting mirrors 5531a, 5531b, 5531c, 5531d on the carriage 5530 to advance in the negative direction of the Z-axis, and are condensed by the condensing lenses (not shown). The metal plate 5601 is fed from the side of the drive rolls 5514b under the guide rail 5511b and is then fixed in place. After laser cutting is performed on the metal plate 5601 by the condensed laser beams, the metal plate 5601 is reeled-up from the side of the drive rolls 5514a under the guide rail 5511a. When one cycle of laser cutting is completed, the metal plate 5601 is moved from the drive rolls 5514b toward the drive rolls 5514a by a distance corresponding to one lead frame and is then fixed in place, followed by next cycle of laser cutting.

The condensed laser beams are each rotated on its optical axis by the beam rotating device 5506 in a like manner to in the foregoing embodiment, whereas the metal plate 5601 is moved by the carriage 5530 in the X- and Y-axis directions. The rotation angle and the moving speed are also controlled in a like manner to in the foregoing embodiment. Since the relative positions of the condensing lenses are surely maintained on the carriage 5530 during its movement, the relative positions of the laser beams are kept unchanged and four lead frames having the same configuration can be simultaneously laser-cut without any position offset. Also, since one set of control information such as the rotation angle and the moving speed is only required for the four lead frames in this embodiment, the control is facilitated. In the case of forming a number of lead frames having the same configuration, therefore, it is possible to manufacture the lead frames at a lower cost in a shorter period of time, and hence to realize mass-production.

Further, since the sensors on the underside of the carriage 5530 are mounted in the positions spaced downstream from the respective condensing lenses by the length L corresponding to one lead frame, i.e., in the positions denoted by S in FIG. 35, the cut state, such as configurations and surface conditions of the lead frame which have been subject to the laser cutting one cycle before, can be monitored immediately after the laser cutting. In other words, the result of laser cutting can be monitored in parallel to the progress of laser cutting, and this parallel monitoring contributes to preventing fluctuations in the cutting conditions and checking defects. The information detected by the sensors are sent, along with the information from the CCD camera 3084 shown in FIG. 25, to the cut portion monitoring unit 3080 and are processed likewise. Thus, two sets of detected information from both the systems are utilized in a combined manner.

With this embodiment as described above, the following advantages are also obtained in addition to the similar advantages as in the sixth embodiment. Since one laser beam 5507 is branched into the plurality of laser beams 5516 to 5519 having the same sectional shape and the same output power by using the half-reflecting mirror 5502, the totally reflecting mirror 5503, the half-reflecting mirrors 5515*a*, 5515*b*, and the totally reflecting mirrors 5515*c*, 5515*d*, and the branched laser beams are condensed to the respective positions on the metal plate 5601, four lead frames having the same configuration can be laser-cut at the same time. Also, since one set of control information such as the rotation angle and the moving speed is only required for the four lead frames in this embodiment, the control is facilitated. In the case of forming a number of lead frames having the same configuration, therefore, it is possible to manufacture the lead frames at a lower cost in a shorter period of time, and hence to realize mass production.

Since the four condensing lenses are mounted on the carriage 5530 which is movable in the X- and Y-axis directions, the relative positions of the condensing lenses are surely maintained and the irradiated positions of the laser beams are simultaneously moved on the metal plate. Accordingly, the lead frames having the same configuration can be accurately formed without any position offset.

Furthermore, with the sensors mounted to the carriage 5530, the cut portions of the metal plate 5601 can be easily monitored in parallel to the progress of laser cutting. Since the sensors are mounted in the positions spaced downstream along the strip of metal plate 5601 from the respective condensing lenses by the length L corresponding to one lead frame, the cut state, such as configurations and surface conditions of the lead frames which have been subject to the laser cutting one cycle before, can be monitored immediately after the laser cutting. The result of monitoring can contribute to preventing fluctuations in the cutting conditions and checking defects.

While the sensors are employed in this embodiment to monitor the cut state, such as configurations and surface conditions of the lead frames after the laser cutting, surface conditions, etc. of the metal plate immediately before the laser cutting may be also monitored in advance. In this case, sensors are mounted, for example, in positions spaced upstream along the strip of metal plate from the respective condensing lenses by the length L corresponding to one lead frame. With the presence of such sensors, positioning accuracy can be monitored. Additionally, similar sensors can also be used to, e.g., ensure alignment of the position to start the laser cutting and confirm the presence or absence of the workpiece (metal plate).

While one laser beam is branched into four laser beams which are simultaneously used to laser-cut the metal plate in this embodiment, it may be branched into any plural number of laser beams. As an alternative, a plurality of laser beams may be used as they are without being branched, or a plurality of laser beams may be each branched into plural ones.

Further, this embodiment may be modified such that the carriage 5530 is made movable only in one direction of two-axes orthogonal to each other on the metal plate 5601, and is moved in the other direction of the two-axes by a moving table or the like which is separately provided. This modification is advantageous in that the carriage and the moving table or the like are each moved only in the direction of one axis, and rigidity in the direction other than that of movement is increased so as to improve a response speed of the movement. It is thus possible to improve accuracy of both movement and positioning for each direction of the two-axes.

While the foregoing first to eighth embodiments have been described in connection with the case of primarily using a strip material as the metal plate material, a sheet material in the form of a flat plate may be used.

INDUSTRIAL APPLICABILITY

According to the present invention, by repeating a first step of aligning the lengthwise direction of a laser beam spot having an elongate section with the lengthwise direction of each of inner leads and moving an optical axis of the laser beam relatively in a direction crossing the inner leads, and a second step of moving the optical axis of the laser beam relatively in the lengthwise direction of each of the inner leads such that the laser beam spots are lined up in the radial direction, a number of leads extending radially can be formed in a metal plate.

Also, the operation of reversing the direction of movement of the laser beam optical axis is not needed, controlling the smooth and moderate motion of the optical axis of the laser beam is only primarily required, and the required number of times of repeating intermittent control of the beam moving direction is very small. Accordingly, position alignment of a driving mechanism system can be facilitated to improve a control ability, a positioning error due to clearance and loose can be minimized, and very good results are obtained in accuracy, reliability and reproducibility of the cut position. In addition, since the laser cutting can be progressed successively for each of short repetition periods, it is easily carried out and the cutting speed is increased.

Further, since one laser beam is branched into a plurality of laser beams having the same sectional shape and the same output power and the branched laser beams are condensed to respective positions on the metal plate while moving and rotating them on their optical axes simultaneously, a plurality of lead frames having the same configuration can be laser-cut at the same time. Also, since one set of control information such as the rotation angle and the moving speed is only required for the plurality of lead frames having the same configuration, the control is facilitated. In the case of forming a number of lead frames having the same configuration, therefore, it is possible to manufacture the lead frames at a lower cost in a shorter period of time, and hence to realize mass-production. In addition, the similar advantages can also be obtained by using a plurality of laser beams originally having the same elongate section and the same output power in synch with each other, or by branching each of a plurality of laser beams into plural ones having the same sectional shape and the same output power.

Since the laser beam is irradiated to such positions as defining gaps which separate the inner leads from each other at least alternately, heat concentration can be avoided to prevent a material of the metal plate from being ruptured by melting due to excessive input heat.

Since a coolant is supplied to flow in surrounding relation to an assist gas so that most of the heat input to the material of the metal plate with the laser cutting can be quickly removed to forcibly reduce the plate temperature.

Since through holes are formed discontinuously in line by the laser cutting, a thermal deformations is suppressed and will not be accumulated. Also, since the multiplicity of through holes are discontinuously present in line during the process, the metal plate is kept in a relatively rigid state, allowing the metal plate to be easily handled. This is also effective to prevent deformations and manufacturing errors occurred during the process. Moreover, since uncut portions are finally removed by etching as a non-thermal process, an influence of the heat is not produced and the finally remaining portions have a satisfactorily finished configuration and higher dimensional accuracy.

Additionally, according to the present invention, lead frames capable of reducing the size, enhancing the performance, and increasing the number of pins of a semiconductor device can be mass-produced at a high speed and a lower cost.

We claim:

1. A lead frame fabricating method wherein when fabricating a lead frame having leads made up by a number of inner leads (1103) radially arranged and outer leads (1104) positioned outwardly of said inner leads (1103) in continuous relation, a pulse-like laser beam (1015, 3014) having an elongate section is irradiated to appropriately cut a thin metal plate (1101) to thereby form at least said inner leads (1103), said method comprising:

a first step of irradiating said laser beam (1015, 3014) to said metal plate (1101) while an optical axis of said laser beam (1015, 3014) is moved relatively in a direction crossing said inner leads to be formed and also rotating a spot (1016, 3016) of said laser beam (1015, 3014) irradiated to said metal plate (1101) so that a lengthwise direction of the spot is aligned with a lengthwise direction of each of said inner leads (1103) to be formed regardless of the relative relation between the position of said spot (1016, 3016) and the position of said thin metal plate (1101), and a second step of moving the optical axis of said laser beam (1015, 3014) relatively in the lengthwise direction of each of said inner leads (1103) to be formed such that the spots (1016, 3016) of said laser beams (1015, 3014) are lined up in the radial direction of inner leads (1103) to be formed, said inner leads (1103) being formed by repeating said first step and said second step.

2. A lead frame fabricating method according to claim 1, wherein said first step is a step of rotating the spot (1016) of said laser beam (1015) on its optical axis so that the lengthwise direction of the spot (1016) of said laser beam (1015) is aligned with the lengthwise direction of each of said inner leads (1103), and revolving the optical axis of said laser beam (1015) along each of concentric or spiral paths (161–174) around an optical axis given when said laser beam (1012) is emitted.

3. A lead frame fabricating method according to claim 2, wherein an angular speed at which the optical axis of said laser beam (1015) is revolving is substantially constant.

4. A lead frame fabricating method according to claim 2, wherein said optical axis given when said laser beam (1012) is emitted is positioned substantially at the center of said lead frame.

5. A lead frame fabricating method according to claim 2, wherein an angle of rotation of the spot (1016) of said laser beam (1015) and an angle and a radius of revolution of the optical axis of said laser beam (1015) are detected, and whether to irradiate said laser beam (1012) or not is determined and controlled in accordance with detected values such that said metal plate (1101) is laser-cut only in a predetermined region.

6. A lead frame fabricating method according to claim 5, wherein whether to irradiate said laser beam (1015) or not is controlled such that lines interconnecting inner distal ends of gaps (1108) separating said inner leads (1103) from each other define a substantially rectangular shape.

7. A lead frame fabricating method according to claim 2, wherein said laser beam (1015) is generated in plural number at the timings shifted a predetermined delay time from each other, and said plurality of laser beams (1015) emitted with the predetermined delay time therebetween are condensed to lie in the same straight line on said metal plate (1101), thereby forming said inner leads (1103).

8. A lead frame fabricating method according to claim 1, wherein said first step is a step of rotating the spot (3016) of said laser beam (3014) on its optical axis so that the lengthwise direction of the spot (3016) of said laser beam (3014) is aligned with the lengthwise direction of each of said inner leads (1103), and moving an optical axis of said laser beam (3014) along each of a multiplicity of rectangular paths (191–198) whose diagonal lines intersect at a common point and whose corresponding sides are parallel to each other.

9. A lead frame fabricating method according to claim 8, wherein a size of the spot (3016) of said laser beam (3014) in the lengthwise direction is fixed and has such a length that inner and outer irradiation areas covered by said spots (3016) along adjacent twos of said rectangular paths (191–198) can be overlapped with each other regardless of angles by which said spots (3016) are rotated on their optical axes.

10. A lead frame fabricating method according to claim 8, wherein an repetition period of said pulse-like laser beam (3014) is set to be constant, and a moving speed of the optical axis of said laser beam (3014) on said rectangular paths (191–198) is controlled to be proportional to lengths of sides of said rectangular paths which are positioned parallel to each other on the inner and outer sides.

11. A lead frame fabricating method according to claim 8, wherein a moving speed of the optical axis of said laser beam (3014) on said rectangular paths (191–198) is set to be constant, and an repetition period of said laser beam (3014) is controlled to be proportional to lengths of sides of said rectangular paths which are positioned parallel to each other on the inner and outer sides.

12. A lead frame fabricating method according to claim 1, wherein the motion of said second step is progressed from inner portions to outer portions of said inner leads (1103).

13. A lead frame fabricating method according to claim 12, wherein an assist gas is ejected near an irradiated position of said laser beam (1015, 3014) in a direction outward from said optical axis given when said laser beam (1015, 3014) is emitted.

14. A lead frame fabricating method according to claim 12, wherein outer leads (1104) are formed by pressing or etching beforehand, and said inner leads (1103) are formed successively from the inner portions to the outer portions by repeating said first step and said second step such that gaps separating said inner leads (1103) from each other are joined with gaps separating said outer leads (1103) from each other.

15. A lead frame fabricating method according to claim 8, wherein one laser beam (5507) is branched into a plurality of laser beams (508, 509) having the same elongate section and the same output power, said branched laser beams (508, 509) are condensed to respective positions on said metal plate (5061), said spots of said laser beams (508, 509) condensed onto said metal plate (5601) are simultaneously rotated on their optical axes on said metal plate (5601), and the optical axes of said laser beams (508, 509) are simultaneously moved on said metal plate (5601), whereby a plurality of lead frames having the same configuration are laser-cut at the same time.

16. A lead frame fabricating method according to claim 1, wherein during the motion of said first step, said laser beam (1015, 3014) is irradiated to such positions as defining gaps which separate said inner leads (1103) from each other at least alternately.

17. A lead frame fabricating method according to claim 1, wherein an assist gas (2000) is ejected near an irradiated position of said laser beam (1015, 3014) and, simultaneously, a coolant (2010) is supplied to flow in surrounding relation to said assist gas (2000).

18. A lead frame fabricating method according to claim 1, wherein said first step and said second step are repeated to form through holes (2501) discontinuously in line in said metal plate (1101), and said method further comprises a third step of coating resist films (2502) for etching on both sides of said metal plate (1101) before or after forming said through holes (2501) discontinuously in line in said metal plate (1101), and a fourth step of supplying an etchant to said metal plate (1101) to remove uncut portions (2504) between the adjacent through holes (2501) thereby coupling said adjacent through holes (2501) to each other.

19. A lead frame fabricating apparatus in which, when fabricating a lead frame having leads made up by a number of inner leads (1103) radially arranged and outer leads (1104) positioned outwardly of said inner leads (1103) in continuous relation, a laser beam (1015) is irradiated to appropriately cut a thin metal plate (1101) to thereby form at least said inner leads (1103), wherein:

said apparatus comprises laser beam generating means (1010, 1020) for generating a pulse-like laser beam (1015) having an elongate section, rotating means (1030) for rotating a spot (1016) of said laser beam (1015) to be irrradiated to said thin plate (1101) on an optical axis given when said laser beam (1012) is emitted, revolving means (1050) for revolving an optical axis of said laser beam (1015) around said optical axis given when said laser beam (1012) originally generated is emitted, the first said laser beam (1075) for controlling said rotating means (1030) so that a lengthwise direction of said spot (1016) is aligned with a lengthwise direction of each of said inner leads (1103) to be formed regardless of the relative relation between the position of said spot (1016) and the position of said thin metal plate (1101) when said optical axis of said laser beam (1015) is revolved by said revolving means (1050) revolution radius changing means (1060) for changing a radius of revolution of the optical axis of said laser beam (1015), and condensing means (1552) for condensing said laser beam (1015) from said revolution radius changing means (1060) onto said metal plate (1101).

20. A lead frame fabricating apparatus according to claim 19, further comprising first detection means (1030a) for detecting an angle of rotation of said rotating means (1030), second detection means (1050a) for detecting an angle of rotation of said revolving means (1050), third detection means (1060a) for detecting the radius of revolution of said revolution radius changing means (1060), and control means (1075) for determining and controlling, based on detected values of said detection means (1030a, 1050a, 1060a), whether said laser beam (1015) should be emitted or not from said laser beam generating means (1010, 1020), so as to laser-cut said metal plate (1101) in a predetermined region.

21. A lead frame fabricating apparatus according to claim 19, wherein a plurality of laser beam generating means (1010A, 1020A, 1010B, 1020B, 1010C, 1020C) are provided as said laser beam generating means, focus position changing means (1041) for causing laser beams from said plurality of laser beam generating means (1010A, 1020A, 1010B, 1020B, 1010C, 1020C) to enter said rotating means (1030) parallel to each other is disposed between said laser beam generating means (1010A, 1020A, 1010B, 1020B, 1010C, 1020C) and said rotating means (1030), and said plurality of laser beam generating means (1010A, 1020A, 1010B, 1020B, 1010C, 1020C) emit the laser beams at the timings shifted a predetermined delay time from each other and are arranged such that said laser beams are condensed to lie in the same straight line on said metal plate (1101).

22. A lead frame fabricating apparatus according to 19, wherein said laser beam generating means (1010, 1020, 3010, 3020, 5504, 5505) includes beam section changing means (1201, 1202, 3021, 3022) for changing a ratio of lengthwise size to widthwise size of the section of said laser beam (1015, 3014, 5507).

23. A lead frame fabricating apparatus according to claim 19, wherein said laser beam generating means (1010, 1020, 3010, 3020, 5504, 5505) includes a resonator (1010, 3010) for generating a laser beam of which section is substantially circular, and beam section extending/contacting means (4025) for extending and contracting the section of said laser beam (1015, 3014) in at least one direction, said beam section extending/contracting means (4025) doubling as said rotating means (1030, 3030).

24. A lead frame fabricating apparatus in which, when fabricating a lead frame having leads made up by a number of inner leads (1103) radially arranged and outer leads (1104) positioned outwardly of said inner leads (1103) in continuous relation, a laser beam (1012) is irradiated to appropriately cut a thin metal plate (1101) to thereby form at least said inner leads (1103), wherein:

said apparatus comprises laser beam generating means (3010, 3020) for generating a pulse-like laser beam (3014) having an elongate section, rotating means (3030) for rotating a spot (3016) of said laser beam (3014) to be irradiated to said thin plate (1101) on an optical axis given when said laser beam (3014) is emitted, condensing means (3050) for condensing said laser beam (3014) from said rotating means (3030) onto said metal plate (1101), and moving means (3060) for moving an optical axis of said laser beam (3014) condensed onto said metal plate (1101) relatively in a direction crossing said inner leads (1103) to be formed and moving said optical axis of said laser beam (3014) relatively in the lengthwise direction of each of said inner leads (1103) to be formed, and control means (3075) for controlling said rotating means (3030) so that a lengthwise direction of said spot (3016) is aligned with the lengthwise direction of each of said inner leads (1103) to be formed in spite of the relative relation between the position of said spot (3016) and the position of said thin metal plate (1101) when said optical axis of said laser beam (3014) is moved by said moving means (3060) relatively in a direction crossing said inner leads (1103) to be formed.

25. A lead frame fabricating apparatus according to claim 24, wherein said laser beam generating means (1010, 1020, 3010, 3020, 5504, 5505) includes beam section changing means (1201, 1202, 3021, 3022) for changing a ratio of lengthwise size to widthwise size of the section of said laser beam (1015, 3014, 5507).

26. A lead frame fabricating apparatus according to claim 24, wherein said laser beam generating means (1010, 1020, 3010, 3020, 5504, 5505) includes a resonator (1010, 3010) for generating a laser beam of which section is substantially circular, and beam section extending/contacting means (4025) for extending and contracting the section of said laser beam (1015, 3014) in at least one direction, said beam section extending/contracting means (4025) doubling as said rotating means (1030, 3030).

27. A lead frame fabricating apparatus in which, when fabricating a lead frame having leads made up by a number of inner leads (1103) radially arranged and outer leads (1104) positioned outwardly of said inner leads (1103) in continuous relation, a laser beam (3014) is irradiated to appropriately cut a thin metal plate (1101) to thereby form at least said inner leads (1103), wherein:

said apparatus comprises one laser beam generating means (5504, 5505) for generating a pulse-like laser beam (5507) having an elongate section, rotating means (5506) for rotating a spot of said laser beam (5507) to be irradiated to said thin metal plate (1101) on an optical axis given when said laser beam (1012) is emitted, branching means (5502, 5503, 5515a, 5515b, 5515c, 5515d) for branching said laser beam 95507) from said rotating means (5506) into a plurality of laser beams (5516, 5517, 5518, 5519) having the same sectional shape and the same output power, a plurality of condensing means (5531a, 5531b, 5531c, 5531d) for condensing said laser beams (5516, 5517, 5518, 5519) from said branching means (5502, 5503, 5515a, 5515b, 5515c, 5515d) onto said metal plate (5601), and moving means (5511a, 5511b, 5512a, 5512b, 5513, 5523, 5530) for simultaneously moving an optical axis of said laser beam (3014) condensed onto said thin metal plate (1101) relatively in a direction crossing said inner leads (1103) to be formed and moving said optical axis of said laser beam (3014) relatively in a lengthwise direction of each of said inner leads (1103) to be formed, and a third control means (3075) for controlling said rotating means (5506) so that a lengthwise direction of said spot is aligned with the lengthwise direction of each of said inner leads (1103) to be formed regardless of the relation between the position of said spot and the position of said thin metal plate (1101) when said optical axis of said laser beam (5507) is moved by said moving means (5511a, 5511b, 5512a, 5512b, 5513, 5523, 5530) relatively in a direction crossing said inner leads (1103) to be formed.

28. A lead frame fabricating apparatus according to claim 23, wherein said moving means includes a carriage (5530) mounting said condensing means (5531a, 5531b, 5531c, 5531d) thereon and moving said metal plate (5601) in directions of two axes orthogonal to each other.

29. A lead frame fabricating apparatus according to claim 24, wherein sensor means (S) for monitoring laser-cut portions of said metal plate (5601) are mounted on said carriage (5530).

30. A lead frame fabricating apparatus according to claim 27, wherein said laser beam generating means (1010, 1020, 3010, 3020, 5504, 5505) includes beam section changing means (1201, 1202, 3021, 3022) for changing a ratio of lengthwise size to widthwise size of the section of said laser beam (1015, 3014, 5507).

31. A lead frame fabricating apparatus according to claim 27, wherein said laser beam generating means (1010, 1020, 3010, 3020, 5504, 5505) includes a resonator (1010, 3010) for generating a laser beam of which section is substantially circular, and beam section extending/contacting means (4025) for extending and contracting the section of said laser beam (1015, 3014) in at least one direction, said beam section extending/contracting means (4025) doubling as said rotating means (1030, 3030).

* * * * *